US012572737B2

(12) United States Patent
Baruch et al.

(10) Patent No.: US 12,572,737 B2
(45) Date of Patent: Mar. 10, 2026

(54) GENERATIVE THOUGHT STARTERS

(71) Applicant: Microsoft Technology Licensing, LLC, Redmond, WA (US)

(72) Inventors: Keren Kochava Baruch, West Orange, NJ (US); Kevin Michael Arcara, Brooklyn, NY (US); Adam Jason Kaplan, Brooklyn, NY (US); Emilie Marie Andréa De Longueau Saint Michel, Paris (FR); Faizaan Shafiq Charania, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 18/341,681

(22) Filed: Jun. 26, 2023

(65) Prior Publication Data

US 2024/0354503 A1    Oct. 24, 2024

(30) Foreign Application Priority Data

Apr. 21, 2023    (FR) ...................................... 2304014

(51) Int. Cl.
*G06F 40/253* (2020.01)
*G06F 16/34* (2025.01)

(52) U.S. Cl.
CPC .......... *G06F 40/253* (2020.01); *G06F 16/345* (2019.01)

(58) Field of Classification Search
CPC ............................. G06F 40/253; G06F 16/345
See application file for complete search history.

(56) References Cited

U.S. PATENT DOCUMENTS

| | | | | |
|---|---|---|---|---|
| 2019/0213465 A1* | 7/2019 | Avrahami | ............. | G10L 15/197 |
| 2022/0075929 A1* | 3/2022 | Booth | ................... | G06F 40/284 |
| 2022/0237368 A1* | 7/2022 | Tran | ....................... | G06N 3/045 |
| 2023/0259705 A1* | 8/2023 | Tunstall-Pedoe | .... | G06N 3/0499 |
| | | | | 704/9 |
| 2023/0325725 A1* | 10/2023 | Lester | .................. | G06N 3/0455 |
| 2024/0249081 A1* | 7/2024 | UzZaman | .............. | G06F 40/40 |
| 2024/0354503 A1* | 10/2024 | Baruch | ................. | G06F 16/345 |
| 2024/0378198 A1* | 11/2024 | Latendresse | ........ | G06F 16/2425 |

OTHER PUBLICATIONS

International Search Report and Written Opinion received for PCT Application No. PCT/US2024/024168, Jul. 17, 2024, 11 pages.

* cited by examiner

*Primary Examiner* — Fariba Sirjani

(74) *Attorney, Agent, or Firm* — Nicholson De Vos Webster & Elliott LLP

(57) ABSTRACT

Embodiments of the described technologies determine input signals, where the input signals are specific to a user of the user network. The input signals are input to a set of artificial intelligence (AI) models. In response to the input signals, the first set of AI models output a first set of AI-derived signals relating to the input signals. At least one prompt template is applied to the first set of AI-derived signals to create at least one prompt. The at least one prompt is input to at least one generative AI model. In response to the at least one prompt, the at least one generative AI model outputs at least one thought starter machine-generated by the at least one generative AI model. The at least one thought starter includes digital content configured to be distributed via the user network.

20 Claims, 39 Drawing Sheets

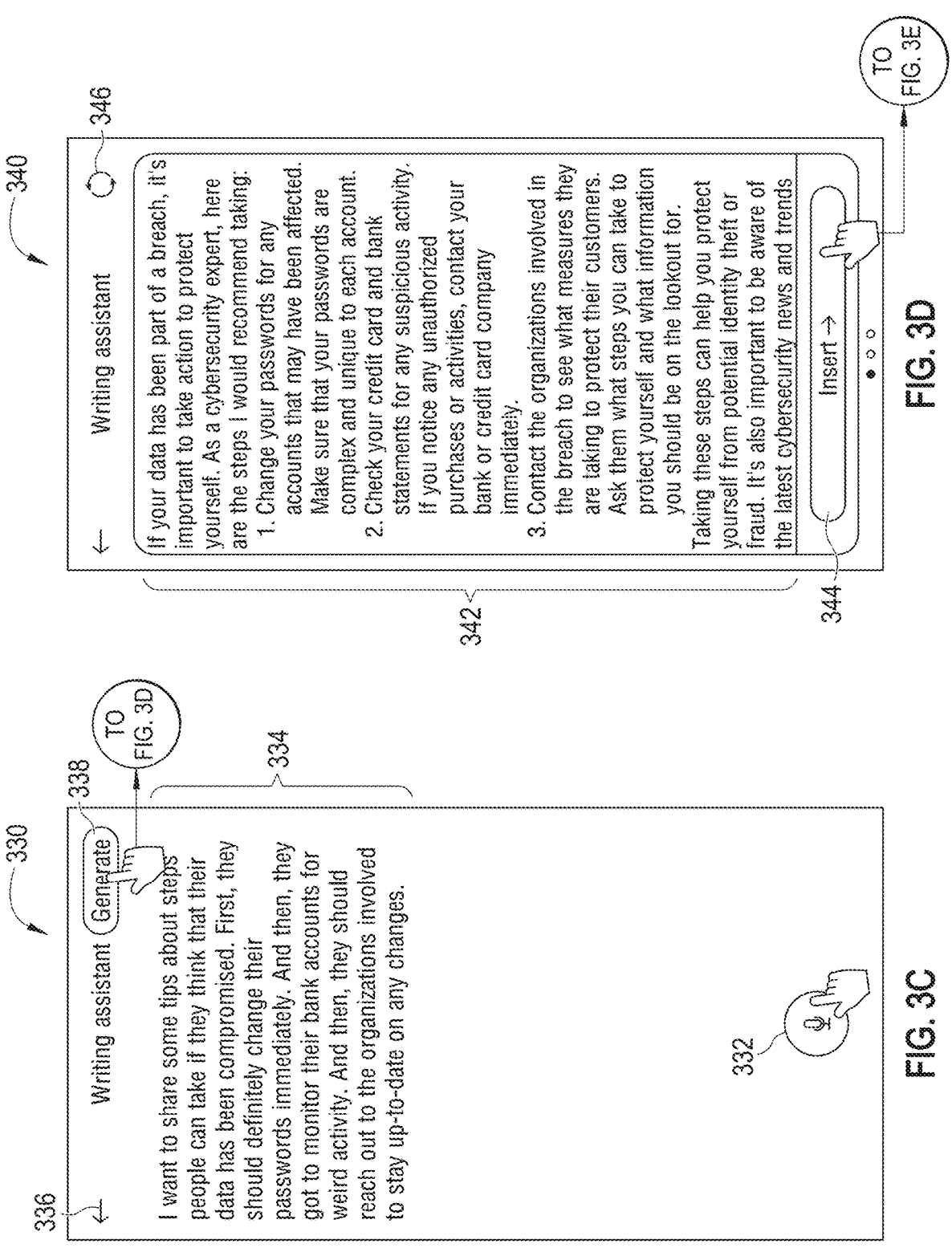

Writing assistant

If your data has been part of a breach, it's important to take action to protect yourself. As a cybersecurity expert, here are the steps I would recommend taking:

1. Change your passwords for any accounts that may have been affected. Make sure that your passwords are complex and unique to each account.

2. Check your credit card and bank statements for any suspicious activity. If you notice any unauthorized purchases or activities, contact your bank or credit card company immediately.

3. Contact the organizations involved in the breach to see what measures they are taking to protect their customers. Ask them what steps you can take to protect yourself and what information you should be on the lookout for.

Taking these steps can help you protect yourself from potential identity theft or fraud. It's also important to be aware of the latest cybersecurity news and trends Insert →

Writing assistant   Generate

I want to share some tips about steps people can take if they think that their data has been compromised. First, they should definitely change their passwords immediately. And then, they got to monitor their bank accounts for weird activity. And then, they should reach out to the organizations involved to stay up-to-date on any changes.

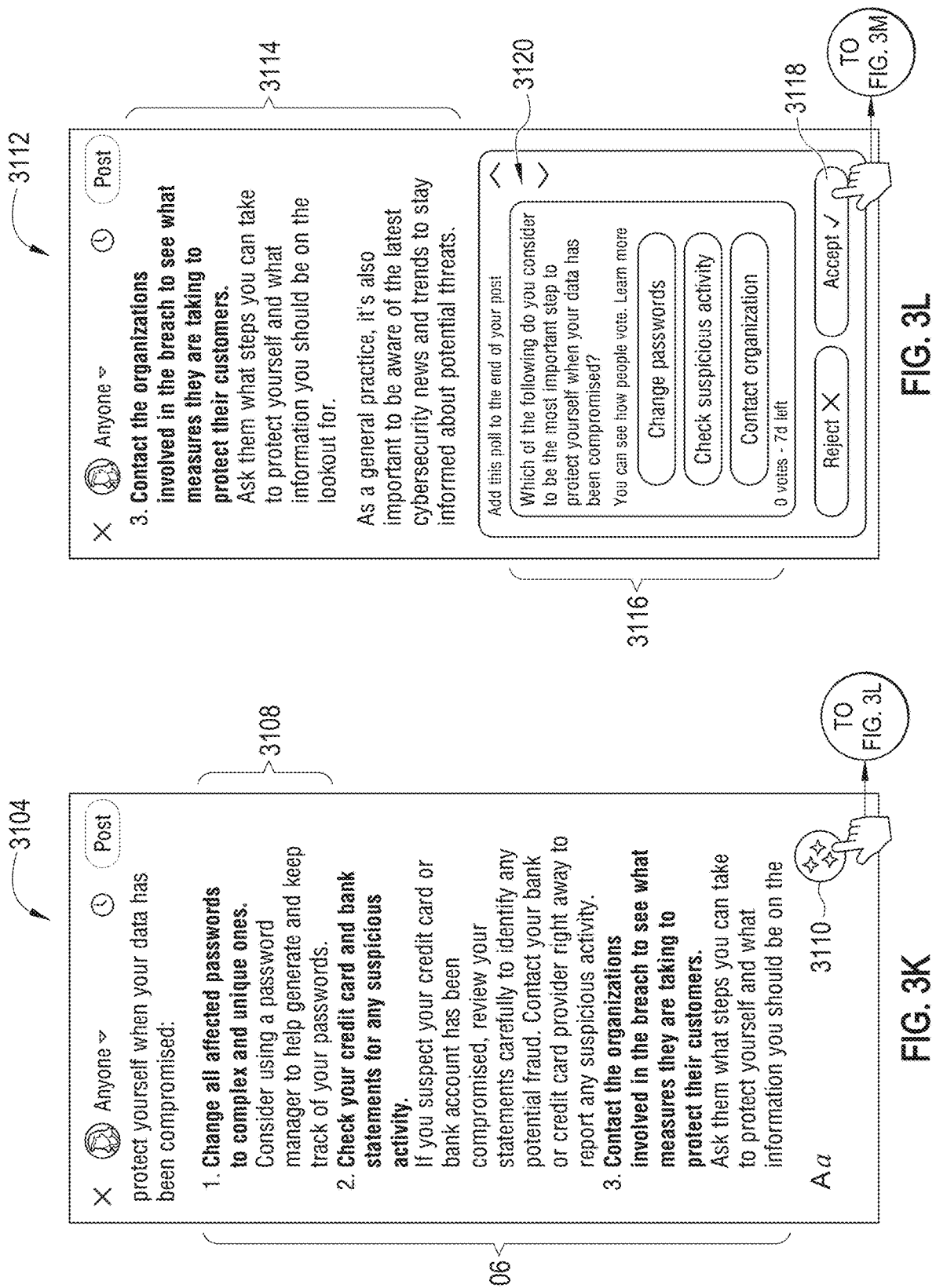

×    ⊙ Anyone ▾    Post

3. Contact the organizations involved in the breach to see what measures they are taking to protect their customers. Ask them what steps you can take to protect yourself and what information you should be on the lookout for.

As a general practice, it's also important to be aware of the latest cybersecurity news and trends to stay informed about potential threats.

Add this poll to the end of your post

Which of the following do you consider to be the most important step to protect yourself when your data has been compromised?

You can see how people vote. Learn more

Change passwords

Check suspicious activity

Contact organization 0 votes · 7d left

⟨ ⟩

Reject ✕    Accept ✓

×    ⊙ Anyone ▾    Post protect yourself when your data has been compromised:

1. Change all affected passwords to complex and unique ones. Consider using a password manager to help generate and keep track of your passwords.

2. Check your credit card and bank statements for any suspicious activity. If you suspect your credit card or bank account has been compromised, review your statements carefully to identify any potential fraud. Contact your bank or credit card provider right away to report any suspicious activity.

3. Contact the organizations involved in the breach to see what measures they are taking to protect their customers. Ask them what steps you can take to protect yourself and what information you should be on the

A𝑎

3106

506

502

Search

FirstName1 LastName1
JobTitle1 @ Employer1
2d

...

If your data has been compromised, it's important to take the proper steps to protect yourself. As a cybersecurity expert, here are the key ste... See more

Which of the following do you consider to be the most important step to protect yourself when your data has been compromised?

You can see how people vote. Learn more

Change passwords

Check suspicious activity

Contact organization 0 votes · 7d left 44     4 comments · 2 reposts

Like     Comment     Repost     Send

FirstName2 LastName2
JobTitle2 @ Employer1
30m

Hey FirstName3

FirstName3 LastName3
JobTitle3

FirstName3 is an IT manager for a medium-sized real estate agency headquartered in City1 State1. As an IT manager, they work on many aspects of the company's IT. Lately, they have taken an interest in cybersecurity - the real estate agency they work for has both company data and client data which presents some challenges that are interesting & novel to them.

They use Website1 mainly to keep up to date with their professional network, and would like to use it to help build their reputation in IT & cybersecurity, but doesn't really know how.

Start story →

FIG. 5A

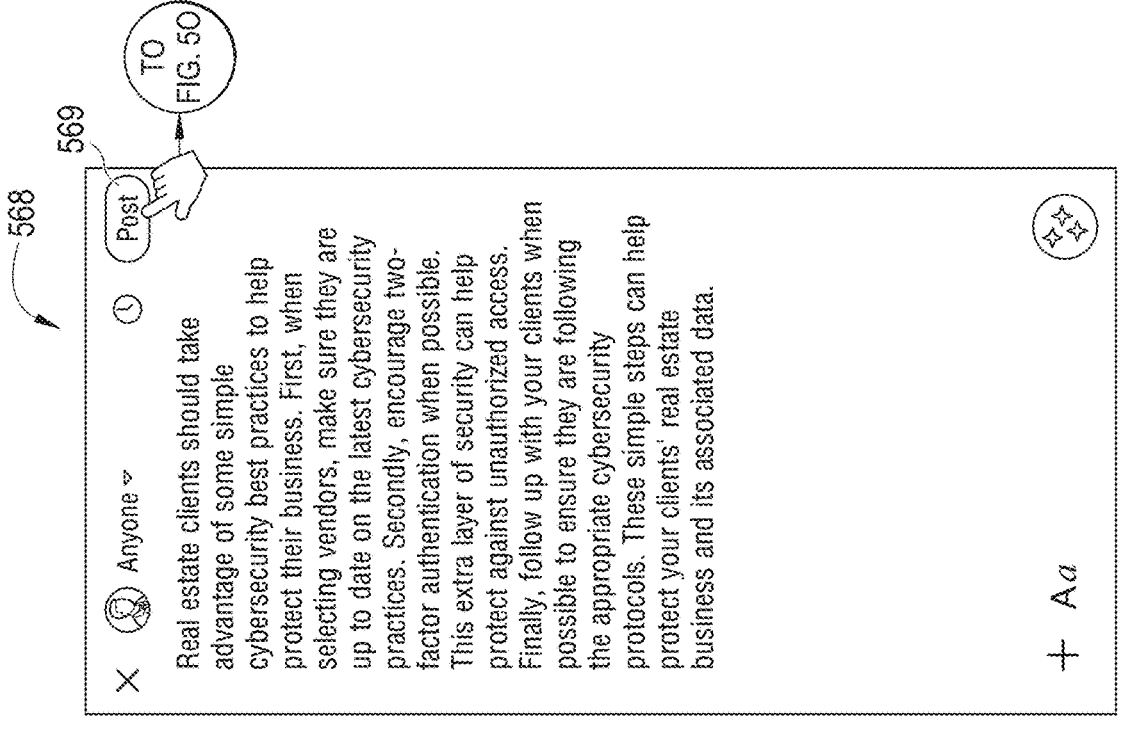

Post

Anyone ▾

✕

Real estate clients should take advantage of some simple cybersecurity best practices to help protect their business. First, when selecting vendors, make sure they are up to date on the latest cybersecurity practices. Secondly, encourage two-factor authentication when possible. This extra layer of security can help protect against unauthorized access. Finally, follow up with your clients when possible to ensure they are following the appropriate cybersecurity protocols. These simple steps can help protect your clients' real estate business and its associated data.

Writing assistant

←

Real estate clients should take advantage of some simple cybersecurity best practices to help protect their business. First, when selecting vendors, make sure they are up to date on the latest cybersecurity practices. Secondly, encourage two-factor authentication when possible. This extra layer of security can help protect against unauthorized access. Finally, follow up with your clients when possible to ensure they are following the appropriate cybersecurity protocols. These simple steps can help protect your clients' real estate business and its associated data.

566

Insert →

Published in UX Collective

FirstName9 LastName9 (Follow)
Yesterday - 6 min read - ✦

What is cybersecurity: everything
you need to know

It's important to update your passwords every
few months to ensure that they remain secure.

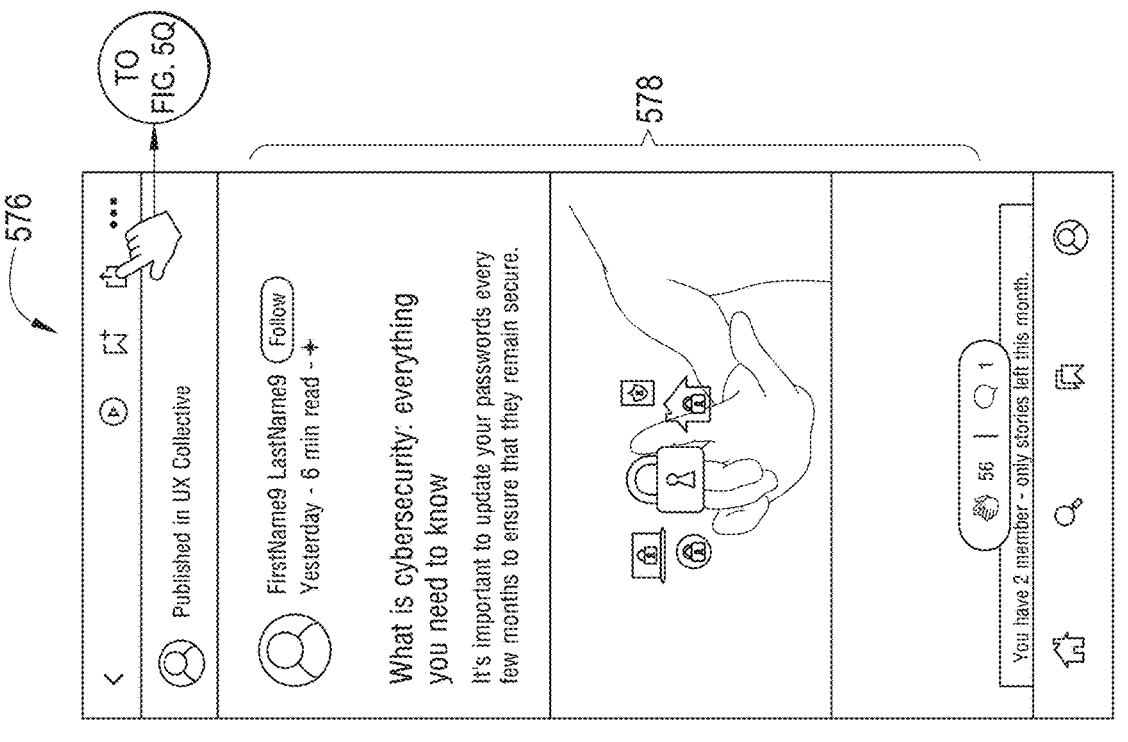

56 | 1

You have 2 member - only stories left this month.

Search

FirstName3 LastName3
JobTitle3 @ Employer2
2d

Real estate clients should take advantage of some
simple cybersecurity best practices to help protect
their business. First, when selecting vendors, make
sure they are up to date on the latest cybersecurity
practices. Secondly, encourage two-facto...See more 44      4 comments - 2 reposts Like    Comment    Repost    Send FirstName2 LastName2
JobTitle2 @ Employer1
30m I'm #hiring for an open role. Know anyone who would
be a good fit? If you are interested, apply below.

JobTitle5
Job by Employer1
City2, State2, Country1 - Remote
Est. $150-$190K/year 3 connections work here (View job)

18      2 comments

Like    Comment    Repost    Send

Home   Discover   Create   Notifications   Jobs

596
Post
Anyone ▾
Share your thoughts about this article
or excited points ✎
598
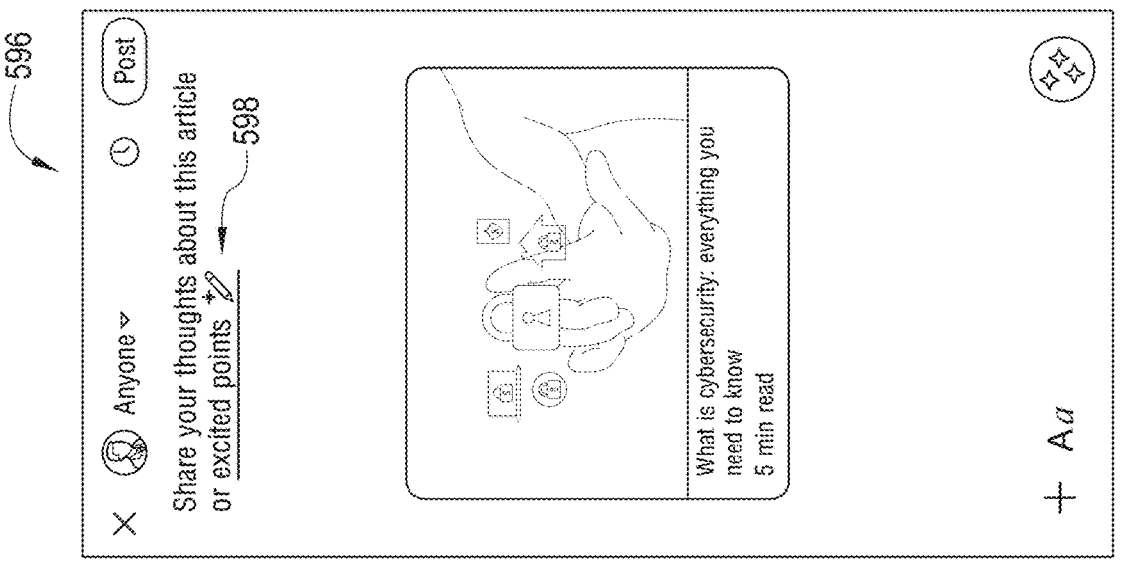
What is cybersecurity: everything you
need to know
5 min read
+ Aa
FIG. 5T
588
Post
594
Anyone ▾
Share your thoughts about this article
or generate introduction ✎
TO
FIG. 5V
590
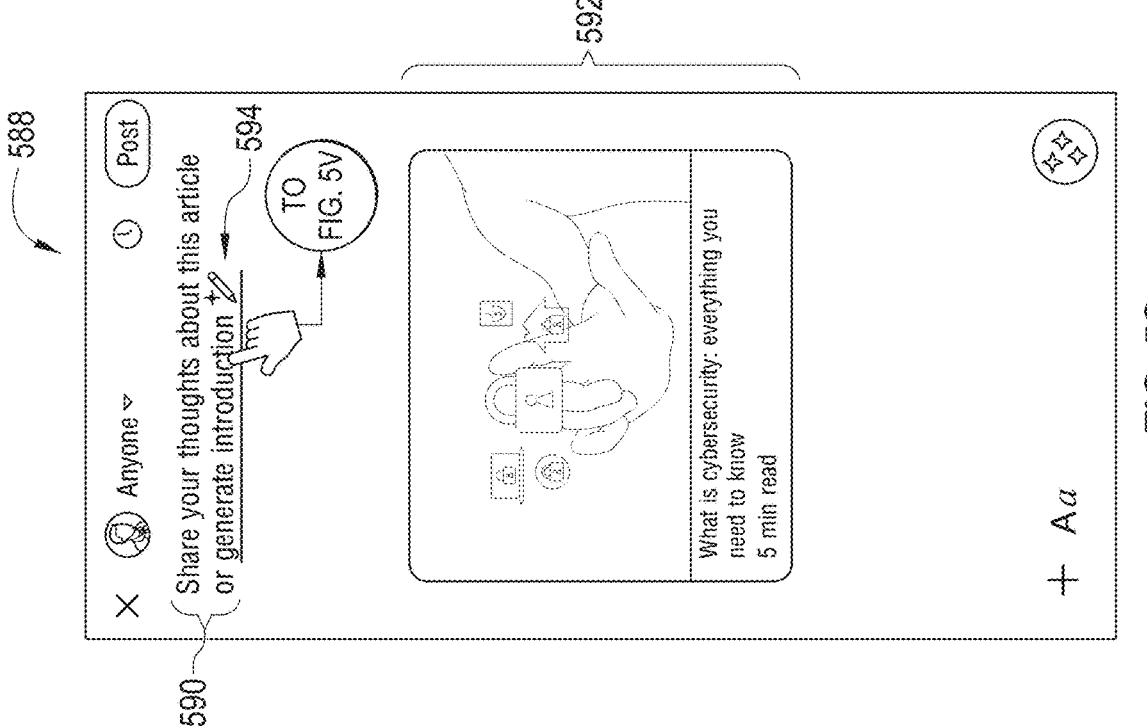
592
What is cybersecurity: everything you
need to know
5 min read
+ Aa
FIG. 5S

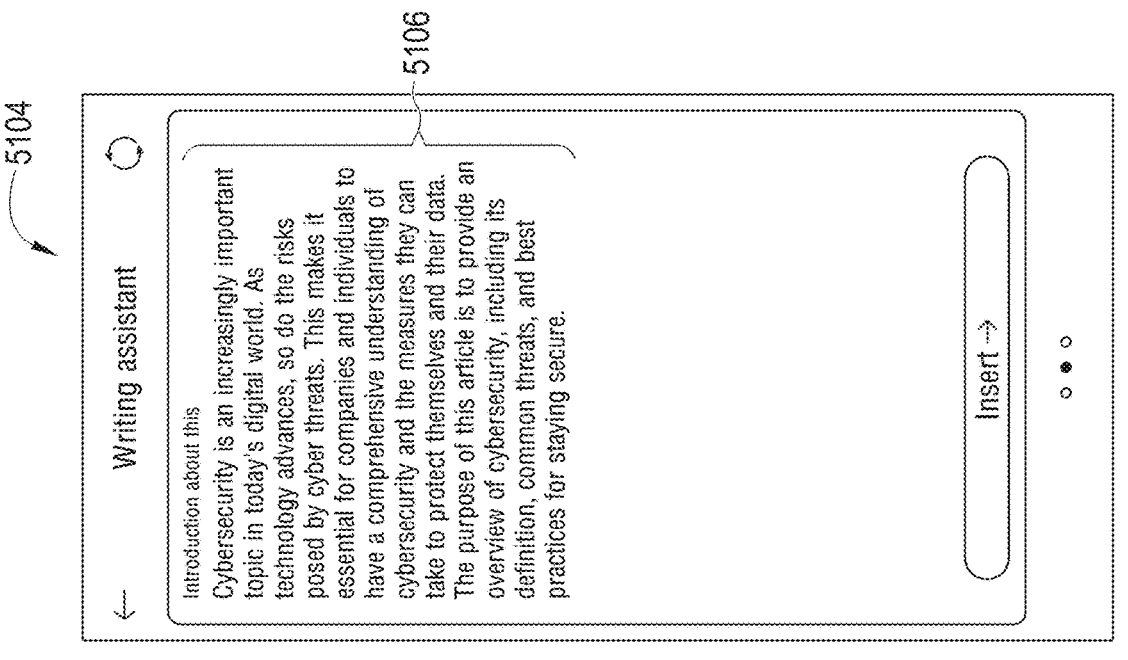

5104

5106

Writing assistant

Introduction about this
Cybersecurity is an increasingly important topic in today's digital world. As technology advances, so do the risks posed by cyber threats. This makes it essential for companies and individuals to have a comprehensive understanding of cybersecurity and the measures they can take to protect themselves and their data. The purpose of this article is to provide an overview of cybersecurity, including its definition, common threats, and best practices for staying secure.

Insert →

Writing assistant

Compelling summary
Cybersecurity is important because it protects against cyber-attacks, data breaches, and other malicious activities that can compromise the security, privacy, and integrity of systems, networks, and data. It is essential for organizations to invest in robust cyber security measures to protect their data, systems, and networks from attack, theft, and other malicious activity. Additionally, strong cybersecurity practices can help organizations comply with industry regulations and standards.

Insert →

PROMPT TEMPLATE
__1202__

PROMPT

PLACEHOLDER(S) FOR FIRST SELECTED SIGNAL — CLASSIFICATION DATA

PLACEHOLDER(S) FOR SECOND SELECTED SIGNAL — EMBEDDING DATA

PLACEHOLDER(S) FOR THIRD SELECTED SIGNAL — SCORE DATA

INSTRUCTIONS /EXAMPLES/ QUESTIONS

TONE

STYLE

LENGTH

FILTER CRITERIA

THOUGHT STARTER GENERATION SUBSYSTEM
1216

Prompt-Feedback Pairs
1212
and/or Output-
Feedback Pairs
1214

MODEL TRAINER
1202

Training Prompt-Output Pairs 1204

GENERATIVE MODEL
1206

FEEDBACK PROCESSOR
1210

Prompt-Output Pairs
1208

Figure 13:
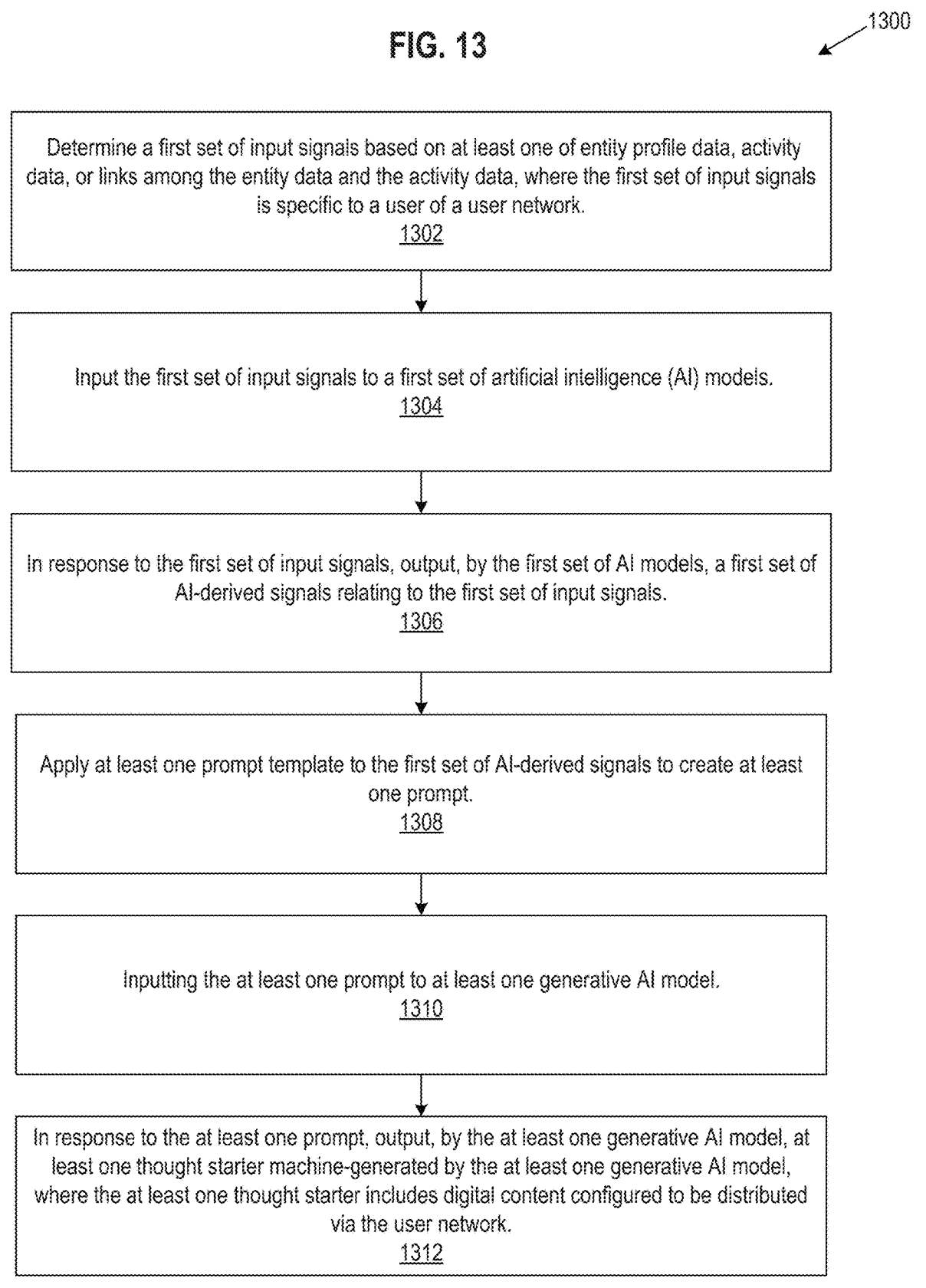

Determine a first set of input signals based on at least one of entity profile data, activity data, or links among the entity data and the activity data, where the first set of input signals is specific to a user of a user network.
1302

Input the first set of input signals to a first set of artificial intelligence (AI) models.
1304

In response to the first set of input signals, output, by the first set of AI models, a first set of AI-derived signals relating to the first set of input signals.
1306

Apply at least one prompt template to the first set of AI-derived signals to create at least one prompt.
1308

Inputting the at least one prompt to at least one generative AI model.
1310

In response to the at least one prompt, output, by the at least one generative AI model, at least one thought starter machine-generated by the at least one generative AI model, where the at least one thought starter includes digital content configured to be distributed via the user network.
1312

GENERATIVE THOUGHT STARTERS

CROSS-REFERENCE TO RELATED APPLICATIONS

The present application claims priority under 35 U.S.C. § 119(a) to French Provisional Patent Application No. 2304014 filed Apr. 21, 2023, which is incorporated herein by this reference in its entirety.

TECHNICAL FIELD

A technical field to which the present disclosure relates is the generation of digital content, such as posts to a user network, for distribution through online systems. Another technical field to which the present disclosure relates is automated content generation using artificial intelligence.

COPYRIGHT NOTICE

BACKGROUND

Software applications can use computer networks to distribute digital content among computing devices on a very large scale. Online systems can regularly receive and distribute millions of content items to hundreds of millions of user devices worldwide, every day. The content items received and distributed by online systems can include text, images, audio, video, and combinations of different forms of digital content. These content items include user-generated content.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, and FIG. 3N illustrate an example of at least one flow including screen captures of user interface screens configured to create and post digital content based on at least one AI-generated thought starter in accordance with some embodiments of the present disclosure.

FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 5L, FIG. 5M, FIG. 5N, FIG. 5O, FIG. 5P, FIG. 5Q, FIG. 5R, FIG. 5S, FIG. 5T, FIG. 5U, FIG. 5V, and FIG. 5W illustrate an example of at least one flow including screen captures of user interface screens configured to use feedback received in response to digital content created and posted based on at least one AI-generated thought starter to AI-generate at least one subsequent thought starter in accordance with some embodiments of the present disclosure.

FIG. 9 is a timing diagram showing examples of scenarios in which feedback is incorporated into an automated thought starter generation system in accordance with some embodiments of the present disclosure.

FIG. 13 is a flow diagram of an example method for automated thought starter generation in accordance with some embodiments of the present disclosure.

DETAILED DESCRIPTION

Figure 1:
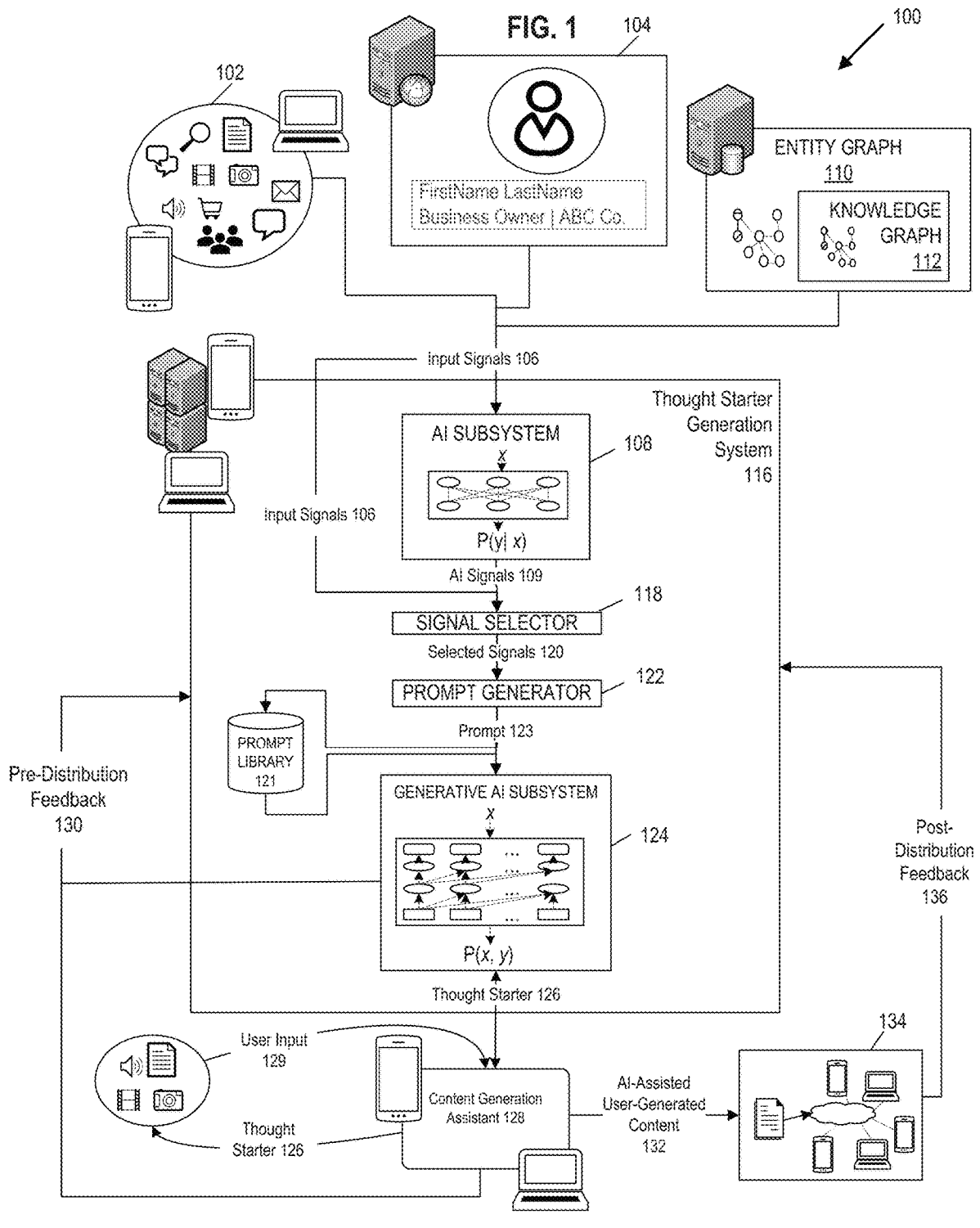
FIG. 1 is a flow diagram of an example method for automated thought starter generation using components of a thought starter generation system in accordance with some embodiments of the present disclosure.

Many people create and distribute digital content over the Internet. User networks, for example graph-based user networks such as social network services, have enabled people to create and distribute digital content both to smaller, targeted audiences and to larger, more diverse audiences. Digital content as used herein may refer to content that is configured for distribution via a user network. As such, examples of digital content as used herein include social media posts, comments on social media posts, articles distributed via a user network, and share text, e.g., content included by a user as an introduction to summary of another content item that is being shared by the user with the network. Digital content as used herein includes text and/or multimedia content, such as text, audio, and digital imagery, e.g., a video, an audio recording, or an article that includes a digital image. Digital content as used herein can include embedded links, such as uniform resource locators (URLs) of other content items, e.g., web pages, on a network.

The availability of portable computing devices such as smart phones, wearable devices, tablet computers, and laptops, has facilitated the creation and distribution of digital content to many users across user networks. However, the conventional input mechanisms provided by portable computing devices are not ideal for creating new content, particularly when the content is intended to be of a quality that is suitable for being posted to a user network for distribution to an online audience. Conventional input mechanisms are also suboptimal for users with physical disabilities and sometimes even for users without disabilities who simply struggle with typing or with manipulating a small device to begin with.

Smaller form factor touch-based keypads make typing error prone and conventional auto-correct mechanisms are often inaccurate. As a result, content creators are often required to make several rounds of revisions and corrections via typing before their content is ready to be distributed to the network. Speech-based input mechanisms can facilitate the input of longer text by enabling the creator to use their voice to generate the content, but conventional speech-to-text and speech-to-image technologies still produce transcription errors that need to be manually corrected using the keypad. As a result of these and other limitations of conventional devices and systems, creators are often required to perform labor-intensive reviews and revisions of the digital content they create before the content is ready to be distributed via the user network.

Another problem that content creators frequently face is the length of time it takes to mentally convert their thinking and ideas to a distributable form of digital expression. "Writer's block" is a common condition among creators and, even when creators have an idea, the amount of time required to perform the mental process of transforming the idea into a form of digital content that is suitable for consumption by users of an application or network can be a barrier to content creation, especially when the available input mechanisms are difficult to use efficiently.

A problem encountered by digital content distribution systems is how to incentivize content creators to create and distribute valuable content items. For example, many content creators may not be aware of the types of content or topics that other users may find most engaging, interesting, or valuable.

As described in more detail below, the disclosed technologies leverage artificial intelligence technologies including generative models, such as large language models, to address these and other challenges of conventional content creation technologies.

A generative model uses artificial intelligence technology to machine-generate new digital content based on model inputs and the previously existing data with which the model has been trained. Whereas discriminative models are based on conditional probabilities $P(y|x)$, that is, the probability of an output y given an input x (e.g., is this a photo of a dog?), generative models capture joint probabilities $P(x, y)$, that is, the likelihood of x and y occurring together (e.g., given this photo of a dog and an unknown person, what is the likelihood that the person is the dog's owner, Sam?).

A generative language model is a particular type of generative model that generates new text in response to model input. The model input includes a task description, also referred to as a prompt. The task description can include instructions and/or examples of digital content. A task description can be in the form of natural language text, such as a question or a statement, and can include non-text forms of content, such as digital imagery and/or digital audio. In some implementations, an input layer of the generative language model converts the task description to an embedding or a set of embeddings. In other implementations, the embedding or embeddings are generated based on the task description by a pre-processor, and then the embeddings are input to the generative language model.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of?; this is a picture of a dog playing with a young boy near a lake; 0.9], [what is this a picture of?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer that represents the desired number of pairs to be returned for a particular design or implementation of the generative model. For example, the model could discard the lower-scoring pairs and only output the top-scoring pair as its final output.

Generative language models have many potential uses. However, there are shortcomings that present technical challenges to the widespread use of the conventional generative language models for generating highly customized content, such as user-generated content, and more specifically, user-generated content that is configured for distribution to a network. Conventional generative language models require a significant amount of human intervention for many reasons. Human review of the output of the conventional generative language models is necessary to ensure that model output does not diverge from a given task description in a way that introduces irrelevant or inconsistent information. Further, the output of the conventional generative language models needs substantial human revision to avoid sounding robotic and instead sound more like human-generated writing. Given these and other shortcomings, the conventional generative language models rely heavily on human labor to generate task descriptions in a highly manual, trial-and-error manner.

Additionally, some generative models have limits on the length or size of the inputs (e.g., data included in the task description) that the models can receive or otherwise constrain the input parameter values. These limits can impact the quality of the model output, particularly if the task description is not well-designed. Quality as used herein may refer to an objective determination such as a machine-determined difference between an expected model output and an actual model output, which also may be referred to as loss. In conventional generative language model systems, determining what constitutes a well-designed task description is a trial-and-error process that involves a human engineer formulating task descriptions, observing model outputs, and modifying the task descriptions based on the model outputs. Further, training a generative model is a resource intensive process that involves time-consuming experimentation conducted by human engineers to generate training data and requires subject matter expertise to configure the model architecture and hyperparameters to produce reliable output for real world tasks.

Conventional generative language models have not performed well when tasked with generating a highly customized output, such as personalized user-generated content. Further, conventional generative language models have struggled to generate output in a format that can be readily presented to human users in an easily consumable way, e.g., so that the writing reflects the intentions of the human creator, presents the creator's content in an appealing way, is written in a tone, style, or structure that reflects the creator's personality or intentions, and flows according to the user's typical way of communicating ideas.

Additionally, training a conventional generative language model for a specific task is a technical challenge. Conventional generative language models limit or cap the size or length of the task description. For example, conventional generative language models can only receive a limited number of parameters in the task description and/or set a maximum length for the task description. As a result, the inputs used as the parameter values in the task description should be carefully selected and other portions of the task description should be carefully constructed in order for the models to produce user-personalized machine-generated output with minimal need for human modification of the output.

In the specific context of facilitating the generation of personalized user-generated content, the above-described limitations of generative models present a technical challenge of how to configure a task description for a generative language model so that the generative model outputs a thought starter that is customized to the specific interests and intentions of the content creator, especially in cases where no or only minimal user input is available or the required amount of user input is sought to be minimized.

Automated thought starter generation technologies described herein include a number of different components that alone or in combination address the above and other shortcomings of the conventional content creation technologies. For example, aspects of the disclosed technologies can machine-generate thought starters based on a holistic representation of a prospective content creator's knowledge, background, interests, and related user communities, where the holistic representation is based on a combination of real-time input signals and artificial intelligence (AI)-derived signals. Aspects of the disclosed technologies machine-generate thought starters that are specific to a content creator even if the content creator hasn't yet begun to create a piece of content. For example, in cases where the content creator wants to create an article or post but is suffering from "writer's block" or doesn't know how to start the article or post, the disclosed technologies automatically machine-generate thought starters that can get the creative juices flowing or articulate the content creator's ideas or interests in a way that matches the content creator's preferences, e.g., the creator's desired style or tone.

Some embodiments configure large language generative AI models to machine-generate "thought starters" based on a minimal amount of user input (e.g., a "seed"). In some embodiments, the seed is not explicitly input by the user but rather derived by an intermediate layer of artificial intelligence (AI) models. For example, the intermediate layer of AI models generates a set of AI-derived signals based on a set of input signals, where the input signals represent the creating user's personal interests, style, and preferences.

Examples of thought starters that can be machine-generated using the disclosed technologies include questions, titles for articles or posts, summaries, and outlines. The creator can further develop or modify the thought starter to create a distributable piece of digital content, such as a post, a comment, share text, or an article. Another example of a thought starter is a sequence of thought starters, for example a progression of questions and answers that help the creator develop or refine an idea through an iterative process of interactions between the creator and the thought starter generation system.

Embodiments configure generative models to personalize the thought starters to each specific creator based on the holistic representation of the creator, based on raw input signals, including real-time input signals, the AI-derived signals, or a combination of raw input signals and AI-derived signals. For example, the AI-derived signals include derived information, such as scores, labels, and predictive data, which are computed by an AI subsystem based on collections of input signals that relate to the creator's experiences, interests, tone, previously-created content, and interaction history. The AI signals and/or input signals are used to formulate a creator-specific version of a prompt, which is input to the generative model. In response to the creator-specific version of the prompt, the generative model outputs a creator-specific thought starter. In some embodiments, the input signals and/or AI-derived signals include information about the creator's broader ecosystem and knowledge marketplace, such as information about the creator's first-degree connections, followers, subscribers, etc. and/or information about currently trending topics and content items.

As an illustrative example, a thought starter created without the use of the disclosed technologies could be a generic thought starter based on static user profile information such as "What did you learn as a product manager?" (where the user's profile indicates that the user's current job title is product manager). In contrast, the disclosed technologies can produce a dynamic, user-specific thought starter using input signals and/or AI-derived signals that include recent previous activities of or related to the creator, such as "Given you worked at both Company A and Company B, and were responsible for launching Product X, what are some predictions that you have about the future of creators who create work-related content?" In this way, the use of input signals and/or AI-derived signals that are specifically related to the creator, the creator's eccosystem and knowledge marketplace, facilitates the machine-generation of thought starters that stimulate the creator's thinking in a personalized way. This in turn facilitates the content creation process, increasing the likelihood that the creator will produce a content item, while reducing the need for the creator to interact with cumbersome input mechanisms and reducing the time from content creation to distribution on the network.

As described in more detail below, embodiments of a thought starter generation system include one or more of the following components: an input signal collection subsystem, an AI signal generation subsystem, a signal selection subsystem, a prompt generation subsystem, a thought starter generation subsystem, a content creation interface, a content distribution service, a pre-distribution feedback subsystem, and a post-distribution feedback subsystem. In some implementations, embodiments of the thought starter generation system include a thought starter selection and/or filtering subsystem that is capable of, for example, removing very similar thought starters from a pool of thought starters generated by the thought starter generation system and/or select particular thought starters that top matches for specific creators.

The input signal collection subsystem is capable of collecting and outputting input signals associated with a creator. The input signals are used by an intermediate layer of AI models to generate the AI-derived signals. The input signals and the AI-derived signals are modulated by the signal selection subsystem, in some embodiments. The signal selection subsystem outputs selected signals, which include input signals, AI-derived signals, or a combination of input signals and AI derived signals. The selected signals are used by the prompt generation subsystem to configure one or more prompts specific to the creator, such that the one or more creator-specific prompts can be input to a thought starter generation subsystem. The thought starter generation subsystem is capable of using a trained generative AI subsystem to machine-generate and output one or more thought starters based on the one or more creator-specific prompts. One or more of the machine-generated creator-specific thought starters are presented to the creator via, e.g., a content creation interface. In response to one or more of the presented thought starters, the creator may create a digital content item, such as a post, a comment, share text, or an article. The content distribution service is capable of distributing creator content to users of web sites, social network services, and/or other application software systems.

The content creation interface can communicate user feedback signals to the pre-distribution feedback subsystem. The content distribution service can communicate network feedback signals to a post-distribution feedback subsystem. The pre-distribution feedback subsystem and the post-distribution feedback subsystem each are capable of generating output that can act as proxies for the expected output of the generative AI subsystem or as labels or scores for the actual output of the generative AI subsystem. Pre-distribution feedback and/or post-distribution feedback can be used to measure the quality of machine-generated thought starters output by the generative AI subsystem and to improve the quality of subsequent output of the generative AI subsystem. For instance, some or all of the output of the pre-distribution feedback subsystem and/or the feedback generated by the post-distribution feedback subsystem are returned to the prompt generation subsystem to refine prompts to improve subsequent output of the generative AI subsystem based on the refined prompts.

Additionally or alternatively, feedback generated by the pre-distribution feedback subsystem and/or the post-distribution feedback subsystem are provided to the thought starter generation subsystem to fine tune one or more models of the generative AI subsystem. For example, the thought starter generation system can use the pre-distribution feedback and/or the post-distribution feedback to generate training data on the fly, in an automated way, and use that training data to further improve the prompts and/or to fine tune one or more models of the generative AI subsystem. As a result of these and other aspects of the described thought starter generation system, at least some of the thought starters produced by the generative AI subsystem can facilitate the creation and distribution of creator content by an application software system, e.g., an online system, while minimizing laborious tasks like typing with a keypad.

These components of the disclosed thought starter generation system are configured in a way that makes personalized thought starter generation scalable. For example, previous attempts at generating thought starters have not been successful because they were not scalable due to the amount of human labor required to manually engineer the thought starter content. In contrast, the disclosed technologies include an arrangement of AI-based components that includes an intermediary AI layer that feeds output to a prompt generation layer, which supplies the personalized prompts used by the generative AI layer to generate the thought starters. The arrangement is scalable because, for example, the intermediary AI layer can interpret the raw input signals and filter out signals that are not likely to be useful for generating personalized prompts. Also, the prompt generation layer can generate prompts that instruct the generative AI layer to generate multiple different or alternative thought starters simultaneously. When multiple different thought starters are machine-generated simultaneously for each user, the number of available thought starters scales quickly. These thought starters can be stored in a thought starter library for future use, reuse, or modification and reuse. For example, when a group of thought starters is machine-generated for a particular user, the currently unused thought starters can be stored in a real-time data store or nearline data store, for example, so that they are readily available to be suggested in real time in response to a subsequent online user interaction.

Certain aspects of the disclosed technologies are described in the context of generative language models that output pieces of writing, i.e., natural language text. However, the disclosed technologies are not limited to uses in connection with text output. For example, aspects of the disclosed technologies can be used in connection with non-text forms of machine-generated output, such as digital imagery, videos, and/or audio output by one or more generative models.

Aspects of the disclosed technologies are described in the context of content items distributed via a user network, user connection network, or application software system, such as a social network service. However, aspects of the disclosed technologies are not limited to social network services, but can be used to improve the user generation of content for other types of software applications. Any network-based application software system can act as user network or application software system to which the disclosed technologies can be applied. For example, news, entertainment, and e-commerce apps installed on mobile devices, enterprise systems, messaging systems, search engines, document management systems, collaboration tools, and social graph-based applications can all function as user networks or application software systems with which the disclosed technologies can be used.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components can apply to other components with the same name, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments.

FIG. 1 illustrates an example of a system that is capable of generating personalized thought starters for a specific user of an application software system or user network, FIG. 1 is a flow diagram of an example method for automated thought starter generation using components of a computing system 100 in accordance with some embodiments of the present disclosure. The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of thought starter generation system 600 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 1, a computing system 100 includes an AI subsystem 108, a thought starter generation system 116, a signal selector 118, a prompt library 121, a prompt generator 122, a generative AI subsystem 124, a content generation assistant 128, and a user network 134 operating an application software system in communication with content generation assistant 128. As indicated in FIG. 1, components of computing system 100 are distributed across multiple different computing devices, e.g., one or more client devices, application servers, web servers, and/or database servers, connected via a network, in some implementations. In other implementations, at least some of the components of computing system 100 are implemented on a single computing device such as a client device. For example, some or all of thought starter generation system 116 is implemented directly on the user's client device in some implementations, thereby avoiding the need to communicate with servers over a network such as the Internet.

The AI subsystem 1108 receives input signals 106 from potentially a variety of different data sources including user interfaces, databases and other types of data stores, including online, real-time, and/or offline data sources. In the example of FIG. 1, input signals 106 include user input signals 102, user profile signals 104, and graph-based signals 110, 112. In the illustrative example of FIG. 1, user input signals 102 are received via one or more user devices or systems, such as portable user devices like smartphones, wearable devices, tablet computers, or laptops; user profile signals 104 re received via one or more web servers; and graph-based signals 110, 112 are received via one or more database servers; however, any of the different types of input signals 106 can be received by thought starter generation system 100 via any type of electronic machine, device or system.

Examples of input signals 106 include user-created inputs 102 that previously have been posted to and distributed via the user network 134 (e.g., a user connection network) or input to an application software system operating via the user network 134, such as a social network service. Examples of user-created inputs 102 include documents, messages, posts, articles, images, video files, audio files, multimedia files, digital reactions (e.g., likes, comments, shares, etc.), requests (e.g., follow requests, connection requests, etc.), search histories, and transaction histories (e.g., online submissions of job applications, ecommerce transactions, etc.).

User-created inputs 102 can include current, previous, or supplemental user inputs to the thought starter generation system 100, such as responses to previously-generated thought starters, inputs to online forms, images and/or video content that can be used to supplement other inputs and/or the thought starter content. The user-created inputs 102 can include image or video content. The user-created inputs 102 containing text, image, audio, and/or video content, can be user-created or machine-generated, e.g., by a generative model based upon other input signals 106 and/or AI signals 109. User-created inputs 102 can be obtained by the thought starter generation system 100 via a user interface and/or retrieved from one or more data stores, such as searchable databases that store historical information about the use of the application software system or user network 134. User-created inputs 102 can include structured data, such as data entered by the user into an online form that enforces one or more input rules that constrain the values and/or format of the input, and/or unstructured data, such as natural language text, audio, or transcriptions.

Alternatively or in addition, input signals 106 include user profile data 104. Examples of user profile data 104 include user experience, interests, areas of expertise, educational history, job titles, skills, job history, etc. User profile data 104 can be obtained by the thought starter generation system 100 by, for example, querying one or more data stores that store user profile data for the application software system or user network 134.

Figure 7:
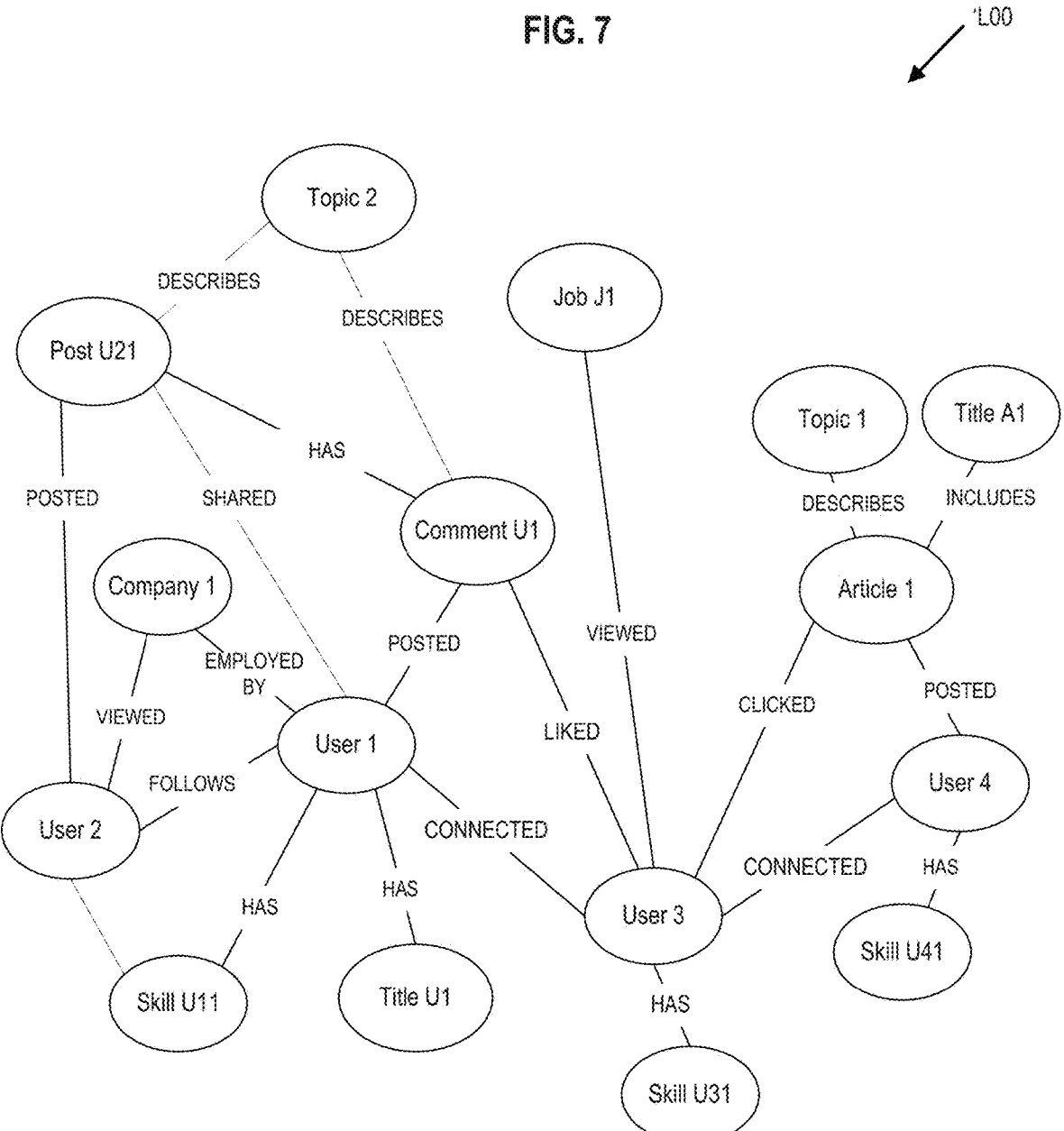
FIG. 7 is an example of an entity graph in accordance with some embodiments of the present disclosure.

Input signals 106 alternatively or additionally include data extracted from entity graph 110 and/or knowledge graph 112. The entity graph 110 includes entity data arranged according to a connection graph, e.g., a graph of connections and relationships between users of the user connection network and between users and other entities. For example, the entity graph 110 represents entities as nodes and relationships between entities as edges between the nodes. In some implementations, entity graph 110 includes a cross-application knowledge graph 112. The cross-application knowledge graph 112 is a subset of the entity graph 110 or a superset of the entity graph 110 (e.g., a combination of multiple entity graphs) that links data from the user connection network with data from other application software systems, such as a user connection network or a search engine. An example of an entity graph or cross-application knowledge graph is shown in FIG. 7, described herein.

Entity as used herein may refer to a user of the application software system or user network 134 or another type of entity, such as a company, organization, or institution, or a digital content item, such as an article, post, comment, share, or job posting. For example, in a user connection network, an entity can include or reference a web page with which a user of the user connection network can interact, where the web page is configured to display a digital content item, such as an article, post, another user's profile, or profile data relating to a company, organization, institution, or a job posting. In some implementations of the entity graph 110, 112, an activity is represented as an entity. Activity as used herein may refer to network activity, such as digital communications between computing devices and systems. Examples of network activity include initiating a session with an application software system by, e.g., logging in to an application, initiating a page load to load a web page into a browser, uploading, downloading, creating, and sharing digital content items on the network, inputting or executing a search query, and executing social actions, such as sending messages, adding comments, and/or inputting social reactions to articles or posts on the network.

Input signals 106 are extracted from an application software system or user network 134 by, for example, traversing the entity graph 110 or knowledge graph 112, e.g., by executing one or more queries on one or more data stores that store data associated with the nodes and edges of the entity graph 110 or knowledge graph 112.

Alternatively or in addition, input signals 106 and/or AI signals 109 can include search engine optimization data. An example of search engine optimization data is statistical data indicating whether views of or engagement with particular digital content items or topics is upwardly or downwardly trending in the application software system or user network 134. For instance, in some implementations, a set of topics derived by AI subsystem 108 and/or a set of potential thought starters generated by the generative model subsystem 124 are sent to a search engine optimization system such as search engine optimization system 690 before being passed to a downstream process or component such as generative AI subsystem 124 or content generation assistant 128. The search engine optimization system can be configured to generate and output a respective search engine optimization score for each topic or prospective thought starter. The search engine optimization score indicates, for example, the frequency of occurrence of the topic or prospective thought starter in a set of search queries executed by one or more online search engines over a specified time period, such as the preceding 24 hours, the preceding 10 days, or the preceding three months. In some implementations, the search engine optimization scores are used to filter out topics or thought starters that do not have a search engine optimization score greater than a search engine optimization score threshold value, where the threshold value is determined based on the requirements of a particular design or implementation of the thought starter generation system 100.

Using the input signals 106, the AI subsystem 108 generates AI signals 109. In some implementations, the AI subsystem 108 generates AI signals 109 by computing statistics and determining statistical correlations between input signals 106. In one approach, AI subsystem 108 computes statistics, such as the frequency of occurrence of searches by particular users that contain specific keywords or the frequency of views of content items posted by users having particular profile data, e.g., job titles, skills, or experiences.

Alternatively or in addition, AI subsystem 108 generates one or more embeddings for a particular user based on input signals 106. Embedding as used herein may refer to or include a numerical representation of input signals 106, such as a vector or matrix, which is computed using, e.g., a mathematical function, algorithm, or machine learning-based model such as a neural network. For example, given a data set that includes a particular user's historical profile data and activity data, AI subsystem 108 can generate and output a user embedding that holistically represents the interests and/or experiences of that particular user contained in the data set. In some implementations, the numerical member embedding may not be directly added as input to the text prompt used to query the generative model, but can be used in a post-processing system, for example to select the best thought starters for a specific user, if thought starter embeddings are generated in the same embedding space as the user embeddings. Alternatively, or in addition, the member embeddings can be used in a pre-processing system, for example to select the best input signals to use in the prompt for a specific user.

Alternatively or in addition, AI subsystem 108 inputs pairs of input signals 106 into a trained machine learning-based classifier and uses the output of the trained machine learning-based classifier to determine a strength of relationship between the input signals in the pair. For example, a machine learning-based classifier is trained on ground-truth examples of article topic-job title pairs or topic-skill pairs or topic-activity pairs or topic-embedding pairs, using, e.g., supervised machine learning applied to a machine learning algorithm such as logistic regression or linear regression. AI subsystem 108 uses the trained machine learning-based classifier (e.g., a binary classifier) to determine a strength of relationship between the data values in a respective pair, e.g., particular article topics and particular job titles, skills, activities, or embeddings. The strength of relationship between the data values in a given pair is indicated by a score or label output by the machine learning-based classifier. For example, for a given topic-embedding pair input to the machine learning-based classifier, if the output of the machine learning-based classifier is 0, the AI subsystem 108 determines that there is no relationship between the article topic and the embedding, but if the output of the machine learning-based classifier is 1, the AI subsystem 108 determines that there is a relationship between the article topic and the embedding.

AI subsystem 108 alternatively or additionally applies a graph neural network to entity graph 110 or knowledge graph 112 to infer relationships between different input signals 106. For example, a modified version of a Bidirectional Encoder Representation with Transformers (BERT) neural network is specifically configured for entity inference, e.g., to infer relationships between entities that are not explicitly linked in the entity graph 110. For instance, given a particular content item (e.g., a content item that the user has previously commented upon in the user network), the modified BERT is used to infer topics or keywords that are not explicitly linked with that particular content item or user in the entity graph 110. In some implementations, the modified BERT is trained with self-supervision, e.g., by masking some portions of the input data so that the BERT learns to predict the masked data. During scoring/inference, a masked entity is associated with a portion of the input data and the model outputs a topic at the position of the masked entity based on the input data.

The resulting output of AI subsystem 108, e.g., AI signals 109, includes user-specific information that is derived by one or more components of AI subsystem 108 based on one or more of the input signals 106. Illustrative examples of components of an AI subsystem 108 are described in more detail herein with reference to FIG. 2.

In some implementations, a signal selector 118 selects from or modulates between or among the input signals 106 and AI signals 109 and outputs particular selected signals 120 to be used by prompt generator 122 to generate one or more prompts 123. For example, signal selector 118 weighs or balances the inputs to prompt generator 122 from among the various input signals 102 and AI-derived signals 109 by adjusting weight values assigned to the various different signals, e.g., based on the requirements or design of the particular implementation of the thought starter generation system 100. In some instances, signal selector 118 determines whether to continue, increase, decrease, or stop receiving certain AI signals 109 and correspondingly discontinue, decrease, increase, or continue receiving input signals 106 during a particular iteration of thought starter generation system 100. In other instances, signal selector 118 determines whether to continue, increase, decrease, or stop receiving certain input signals 106 and correspondingly discontinue, decrease, increase, or continue receiving AI signals 109, during a particular iteration of thought starter generation system 100. In still other instances, signal selector 118 continues receiving input signals 106 and AI signals 109 but filters or modulates the received signals such that the selected signals 120 received by prompt generator 122 include a subset or modified version of the input signals 106 and/or AI signals 109 received by signal selector 118, during a particular iteration of thought starter generation system 100.

In some instances, signal selector 118 applies different weight values to different portions of the input signals 106 and/or the AI signals 109, during a particular iteration of thought starter generation system 100. The different weight values for the different portions of the input signals 106 and/or the AI signals 109 are used, for example, by the prompt generator 122 to formulate one or more prompts 123 and/or by the generative AI subsystem 124 to auto-generate and output one or more thought starters 126. For example, a lower weight value can be assigned to the input signals 106 and a higher weight value assigned to the AI signals 109 if the AI signals 109 have a high confidence value or the input signals 106 are not current, such that the prompt generator 122 and/or generative AI subsystem 124 assigns a higher priority to the AI signals 109 than the input signals 106 when generating a prompt or thought starter, as the case may be. As another example, a lower weight value can be assigned to the AI signals 109 and a higher weight value assigned to the input signals 106 if the input signals 106 are more current than the AI signals 109 or the AI signals 109 have a low confidence value. As another example, different weight values can be assigned to different portions of the AI signals 109. For instance if a confidence value associated with a certain portion of the AI signals 109 does not satisfy a confidence threshold, that portion of the AI signals 109 is assigned a lower weight value while another portion of the AI signals 109 that satisfies the confidence threshold is assigned a higher weight value.

The prompt generator 122 formulates a prompt 123 based on the selected signals 120 generated and output by the signal selector 118. The prompt 123 is configured for input to generative AI subsystem 124. The prompt generator 122 formulates the prompt 123 by, for example, applying a prompt template to the selected signals 120. For example, the prompt generator 122 maps portions of the selected signals 120 to respective placeholders (e.g., parameters) contained in the prompt template. An example of a structure of a prompt is shown in FIG. 11, described herein. A specific example of a prompt configured to cause a generative language model to output a thought starter is provided in Table 1, shown and described herein. An example of a prompt generation subsystem that can be used to implement prompt generator 122 is described in more detail below with reference to FIG. 10.

The prompt 123 output by the prompt generator 122 is sent to generative AI subsystem 124. In some implementations, sending the prompt 123 to the generative AI subsystem 124 includes incorporating the prompt 123 into an API (application programming interface) call using an API specified by a generative model of the generative AI subsystem 124. The generative AI subsystem 124 includes at least one generative language model that is configured using artificial intelligence-based technologies to machine-generate digital content, such as natural language text, digital audio, digital images, and/or digital video. In some embodiments, generative AI subsystem 124 includes one or more generative models that are each configured to machine-generate a specific form of digital content, such as natural language text, images, audio, video, etc. Thus, terminology such as generative AI subsystem, generative model, and generative language model can be used to refer to generative models that machine-generate text and/or non-text output, or a combination of text and non-text output.

In some implementations, the generative AI subsystem 124 is constructed using a neural network-based machine learning model architecture. In some implementations, the neural network-based architecture includes one or more input layers that receive task descriptions (or prompts), generate one or more embeddings based on the task descriptions, and pass the one or more embeddings to one or more other layers of the neural network. In other implementations, the one or more embedding are generated based on the task description by a pre-processor, the embeddings are input to the generative language model, and the generative language model outputs digital content, e.g., natural language text or a combination of natural language text and non-text output, based on the embeddings.

In some implementations, the neural network-based machine learning model architecture includes one or more self-attention layers that allow the model to assign different weights to different words or phrases included in the model input. Alternatively or in addition, the neural network architecture includes feed-forward layers and residual connections that allow the model to machine-learn complex data patterns including relationships between different words or phrases in multiple different contexts. In some implementations, the generative AI subsystem 124 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the thought starter generation system 100.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on textual input. Accordingly, in some examples, a multimodal neural network of the thought starter generation system 100 is capable of outputting digital content that includes a combination of two or more of text, images, video or audio.

In some implementations, the generative AI subsystem 124 is trained on a large dataset of digital content such as natural language text, images, videos, audio files, or multimodal data sets. For example, training samples of digital content such as natural language text extracted from publicly available data sources are used to train one or more generative models of generative AI subsystem 124. The size and composition of the datasets used to train the one or more generative models of generative AI subsystem 124 can vary according to the requirements of a particular design or implementation of the thought starter generation system 100. In some implementations, one or more of the datasets used to train one or more generative models of the generative AI subsystem 124 includes hundreds of thousands to millions or more different training samples.

In some embodiments, generative AI subsystem 124 includes multiple generative language models trained on differently sized datasets. For example, generative AI subsystem 124 can include a comprehensive but low capacity model that is trained on a large data set and used for generating examples, and the same generative language model also can include a less comprehensive but high capacity model that is trained on a smaller data set, where the high capacity model is used to generate outputs based on examples obtained from the low capacity model. In some implementations, reinforcement learning is used to further improve the output of one or more generative models of the generative AI subsystem 124. In reinforcement learning, ground-truth examples of desired model output are paired with respective prompts, and these prompt-output pairs are used to train or fine tune one or more generative models of generative AI subsystem 124.

At the generative AI subsystem 124, one or more model inputs, x, are formulated based on the prompt 123. For example, the generative AI subsystem 124 maps the prompt 123 to a model input x. For each prompt, e.g., x, the generative AI subsystem 124 produces one or more outputs y and, for each output y, a score P(x, y) that indicates a likelihood of the prompt x and the respective output y occurring together. Using the output(s) y and corresponding score(s) P (x, y), the generative AI subsystem 124 generates a thought starter 126. In some examples, the thought starter 126 includes at least one piece of writing that has been machine-generated by the generative AI subsystem 124. In some cases, the thought starter 126 that has been machine-generated by the generative AI subsystem 124 includes, alone or in combination with one or more pieces of writing, one or more images, videos and/or audio items that also have been machine-generated by the generative AI subsystem 124. Implementations of the disclosed prompt and thought starter generation technologies are described in more detail below.

Output of the generative AI subsystem 124 includes one or more thought starters 126. In some implementations, outputting a thought starter 126 includes receiving the thought starter 126 from a generative model of the generative AI subsystem 124 via an API call using an API specified by the generative model. In the example of FIG. 1, a thought starter 126 output by the generative AI subsystem 124 can be forwarded directly to content generation assistant 128 for presentation to a user of the application software system or user network 134. For example, previously-performed prompt refinements and/or model fine tuning performed by one or more pre-distribution and/or post-distribution feedback mechanisms on thought starters previously output by the generative AI subsystem 124 can improve the quality of the generative AI subsystem 124 output to the extent that no pre-distribution review or filtering of the thought starters 126 is needed, such that the thought starters 126 produced by the generative AI subsystem 124 can be presented to the user directly by the content generation assistant 128.

While not specifically shown in FIG. 1, thought starters 126 that are not directly routed from the generative AI subsystem 124 to the content generation assistant 128 are sent to one or more review or filtering mechanisms, such as spam filters or content moderation systems. For instance, one or more filtering mechanisms can be implemented as a component of generative AI subsystem 124. Examples of filters that can be applied to a thought starter 126 include discriminative machine learning models that have been trained to label content items based on a probabilistic or statistical likelihood of the content items containing particular types of content (e.g., spam filters, inappropriate content filters, etc.) and discriminative models that have been trained to score content items based on a mathematical similarity to one or more particular scoring criteria (e.g., relevance filters, ranking models, etc.). Other examples of filters that can be applied to the thought starter 126 include discriminative models that have been trained on feedback that has been previously received on output of the generative AI subsystem 124. For example, a discriminative model is trained on generative model output-feedback pairs such as thought starter output by generative AI subsystem 124 and corresponding rating values assigned to the thought starters by human reviewers. Once trained, the discriminative model can be used to automatically score newly generated thought starters output by generative AI subsystem 124 that haven't been rated by human reviewers. The discriminative model trained in this manner functions as a filter when a threshold rating value is specified, such that output of the generative language model that is assigned a rating by the discriminative model that falls below the threshold rating value is not presented to the user via content generation assistant 128 but rather is redirected to a feedback subsystem or another component of the thought starter generation system. In some implementations, generative models are configured to perform discriminative tasks. Thus, a generative model can be used as an alternative to a discriminative model or in addition to a discriminative model, in some implementations. For example, by configuring a prompt with instructions to exclude certain words or phrases, a generative language model can be used to filter out, for instance, certain topics that are inappropriate or not current.

Output of a filtering mechanism can be used to generate pre-distribution filter feedback 130, which is returned to thought starter generation system 116, e.g., to the generative AI subsystem 124 and/or to the prompt generator 122, to be used to refine prompts and/or fine tune one or more of the generative models of the generative AI subsystem 124. The pre-distribution filter feedback 130 is used, for example, to refine one or more model inputs x, e.g., by modifying at least a portion of a prompt based on the pre-distribution filter feedback 130. Alternatively or in addition, the pre-distribution filter feedback 130 is used to fine tune one or more of the generative models of generative AI subsystem 124, e.g., by modifying one or more parameters of one or more generative models of the generative AI subsystem 124 or by modifying the architecture of one or more generative models of the generative AI subsystem 124, based on the pre-distribution feedback 130.

Thought starters 126 that successfully pass through any and all applicable filtering mechanisms are forwarded to content generation assistant 128. At content generation assistant 128, a though starter 126 is presented to a user via a user interface, such as a graphical, tactile, audio, or virtual user interface. Example presentations of thought starters via graphical user interfaces are shown in the screen captures that follow FIG. 2, described herein.

At content generation assistant 128, the user, e.g., a prospective content creator, interacts with the presented though starter 126 via a user device, such as a portable computing device, to generate user input 129. The user input 129 is received by the content generation assistant 128 in response to the thought starter 126. For example, the user rejects or ignores the thought starter 126, or inputs a response to the thought starter 126, or modifies the thought starter 126, or requests a new thought starter 126, or incorporates the thought starter into a new piece of content, such as an article, post, share text, or comment. As shown in FIG. 1, either or both of the thought starter 126 or the user input 129 received by content generation assistant 128 can include one or more forms of digital content, e.g., text, audio, image, or video content, or a combination of any two or more of text, audio, image, or video content.

The user input 129 can be used to generate pre-distribution filter feedback 130, which is returned to thought starter generation system 116, e.g., to the generative AI subsystem 124 and/or to the prompt generator 122, to be used to refine prompts and/or fine tune one or more of the generative models of the generative AI subsystem 124. The pre-distribution filter feedback 130 is used, for example, to refine one or more model inputs x, e.g., by modifying at least a portion of a prompt based on the pre-distribution filter feedback 130. Alternatively or in addition, the pre-distribution filter feedback 130 is used to fine tune one or more of the generative models of generative AI subsystem 124, e.g., by modifying one or more parameters of one or more generative models of the generative AI subsystem 124 or by modifying the architecture of one or more generative models of the generative AI subsystem 124, based on the pre-distribution feedback 130. For example, if the user input 129 indicates that the user ignored a thought starter, or requested a new thought starter, these interactions can be used to formulate pre-distribution filter feedback 130, which can be used by prompt generator 122 to reconfigure a prompt or select a new prompt, or by generative AI subsystem 124 to fine tune one or more generative models.

If the user creates a new piece of content based on a thought starter 126, the user can cause the new thought starter-based piece of content, e.g., AI-assisted user-generated content 132, to be distributed to other users via the application software system or user network 134. In some implementations, the application software system or user network 134 uses a content distribution service, such as content distribution service 634, described herein with reference to FIG. 6, to determine how to route the user's newly created piece of content through the application software system or user network 134, e.g., to determine whether to place the user's newly created thought starter-based content, e.g., AI-assisted user-generated content 132, in a particular slot of a particular user's news feed or search result set during a particular login session.

After an AI-assisted user-generated content 132 is distributed by the application software system or user network 134, post-distribution feedback 136 is generated as a result of distribution of AI-assisted user-generated content 132 by application software system or user network 134. For example, after an AI-assisted user-generated content 132 is distributed to a set of users by the application software system or user network 134, one or more of those users can generate network activity data that is linked with the AI-assisted user-generated content 132. For instance, views, likes, comments, and social reactions on AI-assisted user-generated content 132 can be returned to generative AI subsystem 124 and/or prompt generator 122 as post-distribution feedback 136. The post-distribution feedback 136 is used to refine the prompt x, e.g., by modifying at least a portion of the prompt to generate a subsequent thought starter based on the post-distribution feedback 136. Alternatively or in addition, post-distribution feedback 136 is used to fine tune one or more generative models of generative AI subsystem 124, e.g., by modifying one or more parameters of one or more generative models of the generative AI subsystem 124 or by modifying the architecture of one or more generative models of the generative AI subsystem 124, based on the post-distribution feedback 136. For example, user interaction data and/or search engine optimization data collected by application software system or user network 134 for an AI-assisted user-generated content 132 can be used by prompt generator 122 to reconfigure a prompt or to select a new prompt, or by generative AI subsystem 124 to fine tune one or more generative models of the generative AI subsystem 124.

The examples shown in FIG. 1 and the accompanying description, above, are provided for illustration purposes. This disclosure is not limited to the described examples. Additional or alternative details and implementations are described herein.

Figure 2:
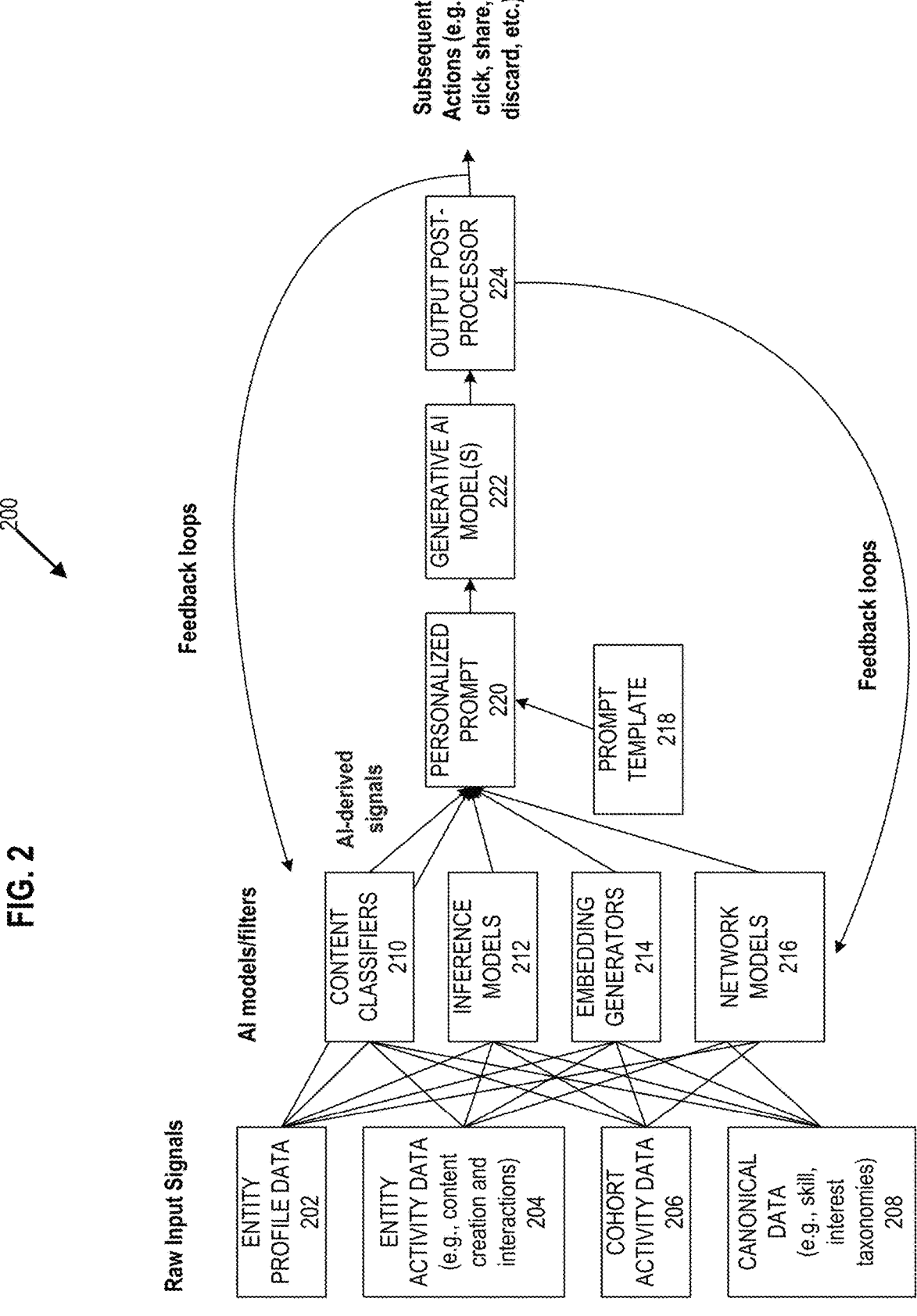
FIG. 2 is a flow diagram of an example method for automated thought starter generation using components of a thought starter generation system in accordance with some embodiments of the present disclosure.

FIG. 2 illustrates a process for generating personalized thought starters for a specific user or group of users of an application software system or user network, FIG. 2 is a flow diagram of an example method 200 for automated thought starter generation using components of a thought starter generation system in accordance with some embodiments of the present disclosure. The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by components of thought starter generation system 100 of FIG. 1 and/or components of thought starter generation system 600 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 2, raw input signals are collected that are related to an entity, such as a user of an application software system or user network who is a potential content creator. At least some of the raw input signals are real-time inputs, such as user interactions within the application software system or user network, such as interactions with content items, updates to the user's profile, and new additions to the entity graph 110 and/or knowledge graph 112 that are added to the broader system in real time (e.g., new users are added, users create and distribute new content items, users add new reactions to content items, etc.).

Examples of raw input signals include entity profile data 202, entity activity data 204, cohort activity data 206, and canonical data 206. Examples of entity profile data 202 include attribute data, e.g., data about the entity for which a thought starter is to be generated, e.g., a prospective content creator. Examples of attribute data include job titles, skills, experiences, interests, geographic regions, work history, educational history and other information associated with the entity. For instance, attribute data includes information that is presented when a user's profile is displayed, e.g., as a web page or document, in a user interface.

Examples of entity activity data include historical information about an entity's network activity within the application software system or user network that is to produce the thought starter. Network activity includes, for example, recent and/or historical data about a user's use of the application software system, including previous content creation activities and other types of interactions, such as views, reactions, comments, and shares of other content items, responses to job postings, and search queries. Examples of cohort activity data 206 include entity activity data for entities that are determined to be cohorts of the user for which a thought starter is to be generated. Examples of cohorts include n-degree connections or followers of the user as determined by traversing a social graph, where n is a positive integer having a value of, e.g., 1, 2, or 3; entities that are identified in the user's profile data, such as companies at which the user has worked, schools the user has attended, other users who have worked at a company at which the user has worked or attended a school that the user has attended, and entities associated with content items with which the user has interacted, such as companies and other users who are the authors or distributors of content items that the user has viewed, reacted to, reshared, or commented upon within the application software system.

Examples of canonical data include standardized versions of entity data, such as standardized versions of company names, skills, or job titles. In some instances, canonical data is maintained using one or more taxonomies, vocabularies, and/or ontologies. Canonical data and mappings among canonical data and non-canonical data are included in an entity graph such as entity graph 110, 112, in some implementations. Use of canonical data is enforced, for example, upon data entry; for instance, when a user inputs a company name to be added to a profile or to a search query, the user is prompted to select the canonical version of the company name from a pull-down list. Use of canonical data is also enforced at search time, e.g., during query processing. For instance, if a user inputs a non-canonical version of a search time, query processing maps the non-canonical version of the search term to a canonical version of the search term using, e.g., an indexed taxonomy and/or an entity recognition algorithm.

The raw input signals are pre-processed by an intermediary set or layer of AI models or filters. Positioning the intermediary set or layer of AI models or filters prior to the prompt generation reduces the likelihood of the prompt generator producing low-quality prompts for the generative model, where low quality may refer to prompts that diverge from an objective, such as irrelevant or illogical prompts. In turn, the increased effectiveness of the prompt generator improves the scalability of the prompt generation system because the need for additional computing resources, including complicated prompt selection, prompt engineering, and prompt filtering components, is reduced.

Because the positioning of the intermediary layer or set of AI models or filters reduces the need for highly engineered prompt templates, the disclosed thought generation technologies can utilize a potentially smaller library of more standardized prompts that are populated with output of the intermediary layer of AI models or filters. For example, instead of modifying prompt templates based on individual user feedback or hand generating customized prompt templates for each user, the disclosed technologies can utilize prompt templates that can be applied to broader groups of users in combination with the user-specific output of the intermediary layer. Additionally, the positioning of the intermediary layer prior to prompt generation enables valuable real-time signals to be incorporated into prompts, such as dynamically changing trends in social activity, professional activity, current events, newsworthy content, etc.

In the example of FIG. 2, the set or layer of AI models or filters includes one or more content classifiers 210, one or more inference models 212, one or more embedding generators 214, and one or more network models 216. In the illustrative example of FIG. 2, each of the AI models or filters receives each of the raw input signals. In some instances, however, one or more of the AI models or filters receives only a subset of the raw input signals. In some instances, each of the AI models or filter receives a different set of the raw input signals. Whether a given AI model or filter receives certain raw input signals is determined by the particular AI model or filter's input specifications. For example, each AI model or filter requests specific inputs that it expects to receive, for example in an API call, and in response to the API call, only the specified raw inputs are provided to the requesting model or filter.

Examples of content classifiers 210 include classification models. A classification model includes a machine learning model that has been trained to classify an input by assigning one or more labels to the input based on a statistical or probabilistic similarly of the input to previously-labeled data used to train the model. A classification model is created by applying a machine learning algorithm, such as linear regression or logistic regression, or a neural network, to a set of training data using, for example, a supervised machine learning technique. In supervised machine learning, the set of training data includes ground-truth labeled data samples. In some implementations, a classification model is created by applying a clustering algorithm to a set of training data that includes unlabeled data samples, using an unsupervised machine learning technique. An example of a classification model is a binary classifier that identifies a model input as either related to a particular skill or not related to the particular skill. Another example of a content classification model is a topic model that assigns a model input to one topic or category, or to multiple topics or categories, based on similarities between the input and the unlabeled data used to train the model using unsupervised or semi-supervised machine learning.

In some implementations, a classification model is used to assign labels to user profiles or interaction data. For example, in a thought starter generation system, a classification model can be used to label a set of user profile data or interaction data based on a computed similarity (e.g., statistical or probabilistic similarity) or relevance to a particular topic, category, skill set, company name, job title, or prompt parameter. For instance, a content classification model can be used to label a set of user profile data pertaining to a user's current work experience as relevant or not relevant to a particular "seed" or "topic" prompt parameter. For instance, if a user's set of profile data includes a current job title of Software Engineer and skill of artificial intelligence, a content classification model could label the set of user profile data as relevant to the topic of large language models, where the topic of large language models can be used to formulate a prompt for a generative model to generate a thought starter that stimulates the user to create a post or article about large language models.

As another example, a content classification model can be used to label a set of user activity data and/or cohort activity data as relevant or not relevant to a particular "seed" or "topic" prompt parameter. For example, if the user has not recently posted any articles on cybersecurity but the user's cohorts have recently liked articles that talk about international cybersecurity, a content classification model can be used to label the set of user activity data as relevant to the topic of international cybersecurity, where the topic of international cybersecurity can be used to formulate a prompt for a generative model.

As another example, a classification model can be configured to categorize previous user posts based on particular categories. For instance, if a post intent classifier classifies a previous user post as "sharing knowledge," then the previous post may be weighted more highly for inclusion in a prompt than another post that the post intent classifier classifies as "promotional" or "political." In other words, classification models can be used to up weight or down weight particular examples of the user's previously created content for inclusion in a prompt. In a similar way, other users' posts that the user has interacted with can be classified according to post intent and the user's interactions with those posts can be upweighted or downweighted accordingly.

Examples of inference models 212 include content scoring models. A content scoring model includes a machine learning model that is trained to generate a score for a pair of inputs, where the score statistically or probabilistically quantifies a relationship, association, strength of relationship, correlation, or affinity between the inputs in the pair. For example, a content scoring model can compute a score for a user activity-topic pair or a user profile-topic pair, or a cohort activity-topic pair, and that score can be used to determine a user's profile, activity, or cohort's relevance to a particular topic. A content scoring model includes, for example, a neural network model that is trained on training data that includes ground-truth sets of data pairs. Examples of content scoring models include ranking models that rank entities for receiving content items related to a particular topic, or that rank content items for distribution to a particular user or user group, such as for inclusion in a user or user group's news feed, where the ranking is based on training examples of the user's or user group's history of clicking or not clicking on similar content items in the application software system.

Examples of embedding generators 214 include algorithms, functions, or trained models that convert raw data or digital content to a numerical representation of the raw data such as an embedding, e.g., a vector or matrix. In the example of FIG. 2, embedding generators 214 can be used to generate user embeddings, such as embeddings based on entity profile data or entity activity data, or to generate cohort embeddings, such as embeddings based on cohort activity data, or to generate content embeddings that summarize the content of a raw content item (such as a long text document, image or video), or embeddings that represent a combination of one or more of entity profile data or entity activity data, and cohort activity data. In this way, embedding generators 214 can be configured to adjust the degree to which the subsequently-generated thought starters are personalized to a specific user and/or the user's related ecosystem or cohort. For example, a first embedding that represents a combination of the user's data and cohort data could result in generation of a first thought starter that is personalized based on the first embedding, and if the user rejects the first thought starter, a second thought starter can be generated that is personalized based on an embedding that only represents the user profile data and/or the user's activity data, e.g., without the cohort data.

Examples of network models 216 include supply and demand models, search engine optimization models, content classifiers, inference models, and other models that have been trained or configured based on a broader data set, such as aggregate user activity data. For example, a network model 216 can be trained to output predictive data for a particular segment of the user population of the application software system. As an example, a network model 216 can be created that models the aggregate content viewing activity for the group of users worldwide who have the job title of software engineer or who work in a particular geographic region or who have identified a particular primary language. In this way, network models 216 can be used to adjust the degree to which the subsequently-generated thought starters are likely to be engaged with by other users of the application software system. By incorporating the output of network models 216 into the AI-derived signals, the thought generation system can increase the likelihood that a subsequently-generated thought starter will help the user create content that other users will engage with through the application software system. In some instances, supply and demand models are configured to model the supply and demand of various topics to identify high-demand topics. Output of supply and demand models can be used to adjusts weight values assigned to the various topics. For example, a high-demand topic can be upweighted and thus more likely to be included in a prompt than a lower-demand topic.

The AI models and/or filters output signals, such as labels, scores, embeddings, and predictive data. A prompt template 218 is applied to one or more of these outputs to generate a personalized prompt 220. The personalized prompt 220 includes a combination of user-specific AI-derived signals and a generalized prompt template. For example, the prompt template 218 includes placeholders or parameters that are configured to receive certain portions of the AI-derived signals. An example of a prompt including a prompt template is shown in FIG. 11, described herein. While not specifically shown in FIG. 2, in some instances, raw input signals are also or alternatively used as inputs to the personalized prompt 220.

The personalized prompt 220, including one or more AI-derived signals and/or raw input signals, is input to one or more generative models 222. The one or more generative models 222 can be configured, for example, as described herein with reference to generative AI subsystem 124. The one or more generative models 222 machine-generate and output one or more prospective thought starters. The one or more prospective thought starters are input to an output post-processor 224. Output post-processor 224 includes one or more filtering mechanisms such as the filtering mechanisms described herein with reference to FIG. 1. For example, output post-processor 224 discards any thought starters that contain spam or inappropriate content. Output post-processor 224 also or alternatively ranks thought starters based on, for example, relevance to one or more of the AI-derived signals or raw input signals, and selects the top k thought starters to present to the user, where k is a positive integer. After presentation of a thought starter to the user, e.g., via content generation assistant 128, the response of the user for which the thought starter was generated, e.g., the prospective content creator, is logged, e.g., by event logging service 670, described herein with reference to FIG. 6. For example, the prospective content creator's reactions to the thought starter, e.g., clicks, discards, shares, etc. are logged for potential use as pre-publication feedback (e.g., as pre-publication feedback 130, discussed above).

The method includes feedback loops that enable both output generated by output post-processor 224 (e.g., filter results) and responses of the prospective content creator (e.g., clicks, discard, share, etc.) to be formulated into feedback that can be incorporated into one or more of the AI models and/or filters used to pre-process the raw input signals.

Embodiments of the method 200 can machine-generate thought starters that can improve the usage of the content creation tools that are available via the application software system or user network, which, in some cases, may be operating at a fraction of their total capacity, by reducing the friction for creators to create distributable, engaging content.

In some instances, the thought starters can help users brainstorm ideas for knowledge sharing based on the user's professional identity and audience interests. Knowledge creators, while they have the expertise to generate an article or post on a given topic, often mention struggling to come up with ideas for content, especially good quality content. In these instances, the thought starters can present idea nuggets that help solve this cold start problem in a scalable way. In other instances, the thought starter generation system uses existing content that the prospective creator user has already provided (e.g., the user has started typing a sentence or adding content to a share box or input box, but has paused for a time interval that exceeds a threshold amount of time, e.g., two seconds), as an input to the thought starter generation process. In this case, the thought starter generation system can machine generate and output thought starters that include suggestions for how to revise, make more concise, or reformat the content item that the user has already started but left unfinished, based on the user's inputs so far. In this case, the machine-generated thought starters can include suggestions for adjusting tone, length, style, and/or language, or for restructuring the content item based on the user's intent as determined based on one or more of the AI-derived signals and/or raw input signals, or for adding more additional details to the content item.

In some instances, the thought starter generation system can machine generate and output thought starters that include suggestions for summarizing long form text e.g., by reducing the text or replacing text with a visual such as an image, video, graph, or poll, or by including an audio or video preview of the longer text article. For example, the thought starter generation system can machine generate output that is configured to augment user- or machine-supplied text content with automatically AI-generated supporting media that identifies highlights, top takeaways, or summarizes the most important information in the content. For example, the thought starter generation system can configure prompts to cause one or more generative models to convert long-form text content into shorter components that are more easily distributable via the application software system or user network.

In some implementations, the generative models 222 of the thought starter generation system include a summarization engine that generates a summary of long-form text for the user's consideration. For instance, a string of long-form text (source text) is passed to the summarization engine with a set of output descriptors such as length (X words), formatting (e.g. bullets), and quantity (Y lines), where X and Y are numerical values, and the summarization engine returns an appropriate text summary based on the source text and output descriptors. The user can then choose to place the summary onto, for example, a standardized, templated media item that includes, e.g., a related slideshow, post, images etc.

To generate a personalized prompt for a prospective creator user, the thought starter generation system can create a customized prompt on the fly, considering the most current contextual data (e.g., the most recently received or generated raw input signals and/or AI-derived signals) and/or the system can match the user to one or more relevant prompt templates retrieve from, e.g., a prompt template library. For example, users can be periodically matched to prompt templates based on collected input signals and/or AI-derived signals such as user embeddings and user activity embeddings, and the subset of matching prompt templates can be loaded into, e.g., a serving store for use at runtime.

Examples of user feedback from the prospective content creator that can be used to update the AI models and/or filters include implicit user feedback (e.g., "show me another one") and/or explicit user feedback (e.g., input of a specific rating, such as thumbs up, thumbs down, a numerical value on a scale of values, etc.).

Examples of signals that are used to create a user-personalized thought starter include user profile data (e.g., skills, experience summary, job titles and experiences, etc.), content previously created by the user (e.g., user-generated content, first-party content, comments, etc.), content of the post currently being authored by the user (e.g., text or other content that the user has input into a post without finishing and posting the post), and standardization data such as ontologies and taxonomies.

Examples of ways the thought starter generation system can personalize thought starters include personalization based on a holistic understanding of the user (e.g., based on a combination of raw input signals and AI-derived signals), including the user's profile data (e.g., summary, experience, explicit skills, title, industry, etc.), the user's previous activity while using the application software system (e.g., the user's previously-created original posts, comments, contributions, interactions, etc.), and standardized data (e.g., taxonomies for skills, interests, job titles, etc.).

Other examples of ways the thought starter generation system can personalize thought starters include personalization based on a holistic understanding of a broader ecosystem and marketplace including other users of the application software system whose interactions with the application software system indicate that they are knowledge seekers (e.g., based on raw input signals and/or AI-derived signals) such as activities of the member's cohorts (where a cohort can include any combination of the user's connection network, industry, country, skill, interest, etc., and cohort activities can include posts, interactions, comments, etc. made by users in the cohort, aggregate or generalized activities across the application software system, e.g., trending content, supply of content items related to particular topics, demand for content items relating to particular topics (measured by, e.g., search queries), and entity taxonomies (e.g., standardized categories of skills, interests, job titles, etc.).

Examples of AI models and/or filters that can be used to generate the AI-derived signals include content classifiers that categorize the text of media content associated with a user, such as previously created, viewed, or reacted-to content items, content classifiers that categorize the intent of a post created by a user, content classifiers that categorize the tone, sentiment, topic(s), or skills to which a content item relates, content classifiers that categorize content items by genre, such as promotional, political, professional, etc.

An example of AI models that can be used to implement aspects of the disclosed technologies include models that have been trained to personalize the tone and style of generative model output for each individual user (or for a group of users that share a similar trait, or another type of entity) so that the generative model can automatically generate new content in the respective tone and/or style of a user, group, or other type of entity (e.g., a company or institution). The tone and/or style personalization of the new content can be independent of the desired output type or specific to the particular output type, e.g., different tones and/or styles for messaging, social media posts, comments, or other forms of digital content. Tone and style personalization models are trained on past writing samples of a particular user, group of users, or other entity type, such that each user, group of users, or entity will have its own trained version of the tone and style model. In some implementations, a style transfer model is used to transform the content output by the generative model to match the user's writing style, one or more conditional language models are used to generate training data by outputting a style classification based on an input style and associated content, and a multi-task learning model is trained on both text generation and style. Examples of aspects of tone and style that a machine learning model can be trained to recognize and classify in a user's historical content include: sentence structure types, tone, preferred language, use of slang, narrative style, etc.

In some implementations, before text generation by a generative AI model, training data is generated by (i) embedding past writing samples from the author into the prompt that contains the instructions for the generative model to generate a post that matches the required style; and/or (ii) extracting the style-defining attributes from the author's historical writing samples and including the extracted style-defining attributes in the instructions to the generative model used to generate the written content.

In some implementations, after text generation by a generative AI model, a neutral style transfer model and/or a conditional style transfer model can be used. For instance, a neutral style transfer model can be used to transform the generated content to match the author's writing style, and/or a conditional language model can be used to output a style based on the input style and associated content. In some implementations, a single multi-task learning model is trained to perform both text generation and style transfer to match a certain writing style such as a particular user's preferred writing style.

Additional examples of AI models and/or filters include models that rank certain attributes of a user based on relevance to the user, including, for example, skills that are relevant to the user's career in which the user has high proficiency, top topics of interest based on past the user's previous interaction and/or content creation signals. Additional examples of AI models and/or filters include models that predict industries that are relevant to the user based on the user's profile data and/or activity (e.g. historical online job search and online job application activity, etc.). Additional examples of AI models and/or filters include embedding models that map high-dimensional user signals into a low-dimensional space (e.g., create a condensed or compressed version of a signal).

Additional examples of AI models and/or filters include AI models that represent aspects of the broader user community, marketplace, or ecosystem of the application software system, such as supply/demand models that output predictive data relating to the current supply or demand for certain skills, interests, countries, etc., and trending content models that output predictive data relating to short or long term trends of topics or content items (e.g., is interest in a particular content item or topic waning or growing?).

In some implementations, raw input signals and/or AI-derived signals can be precomputed, for example by offline classifiers that generate output based on historical data, and pushed to a data store that is easily accessible at runtime as needed. Other signals are not or do not need to be precomputed but can be accessed directly; for example raw input signals such as the content of posts previously made by the user.

In some implementations, user feedback signals (such as whether the user clicked on a thought starter or requested a different thought starter) are used to uprank, downrank, or rerank raw input signals, AI-derived signals, or thought starters. For example, machine-generated thought starters that are not selected by the user can be stored and reused on a subsequent iteration with an updated ranking based on the fact that they were not selected. As another example, machine-generated thought starters that are selected and used by the user to create can be stored with an updated ranking based on the fact that they were selected so that they are not re-presented to the user again.

As another example, raw input signals and/or AI-derived signals can be ranked and reranked based on the user's feedback, e.g., the user's interactions with the resulting thought starters, so that the same or similar signal types are not reused for a subsequent thought starter or if the same signal is reused, it will be reused with a different value to reduce the likelihood of the system producing duplicative thought starter suggestions.

Subsequent feedback signals from a particular user community, such as a set of users who have one or more similar characteristics to the content creator, such as reactions to content the user created based on a thought starter, are logged and used to update one or more of the AI models and/or filters, in some instances.

Additionally or alternatively, AI models and/or filters are updated based on feedback signals and other subsequently-occurring signals, such as signals related to changes in current events. For example, an embedding generator 214 may generate embeddings early in the day but later in the day a newsworthy event or announcement occurs that is relevant to the prospective content creator user (as determined based on, e.g., the user's profile data and/or activity data). In such a scenario, the inputs to the AI models and/or filters are updated to include the earlier-generated embeddings and also the later-occurring event signals. Alternatively or in addition, the more recently-occurring (e.g., real-time contextual) signals are input directly into the personalized prompt 220.

Based on a selection of one or more raw input signals and/or one or more AI-derived signals and a selected prompt template 218, the personalized prompt 220 is generated for the prospective content creator user. The personalized prompt can include, for example, one or more of the following elements: instructions, questions, input data, or examples of desired output.

The selected one or more raw input signals and/or one or more AI-derived signals are included directly in the personalized prompt 220, in some instances. A first example of a prompt includes, "Given someone with the following skills <skill1, skill2, skill3> and interests <interest1, interest2>, give me 3 idea nuggets of things I should talk about next." In the first example prompt, skill1, skill2, skill3, interest1, and interest2 are parameters or placeholders that are replaced with input signals and/or AI-derived signals that are added to the prompt. A second example of a prompt includes, "Based on examples of content I have posted in the past <post non-promotional with post intent X, post non-political with quality score >Y>, give me 3 idea nuggets of things I should talk about next." In the second example, X and Y are parameters or placeholders that are replaced with input signals and/or AI-derived signals that filter the examples that are included in the prompt.

Output post-processor 224 processes the output of the generative model(s) 222, for example by ranking instances of the output based on relevance to the prompt, filtering out instances of the output, rephrasing the output, etc.

Examples of mechanisms for implementing feedback loops that can be included in the method 200 include direct feedback from users (e.g., surveys, discarded thought starters). Direct feedback signals can be formulated as, for example, input signals to the personalized prompt (e.g., discarded interests). Other examples of feedback mechanisms include event tracking mechanisms that monitor the performance of a thought starter based on a set of performance metrics (e.g., clicks, time spent to create a post, quantity of content shared, quality of content shared, etc.) measured for a piece of content created and distributed by a user based on the thought starter. Other examples of feedback mechanisms include real-time performance monitoring of the thought starter generation system to detect anomalies or performance drops (e.g, a decrease in click through rate or increase in latency due to infrastructure issues.

In some implementations, the AI layer and/or filters create groups of users based on common attributes such as common sets of skills, job titles, interactions with similar content items, etc. In this case, the output of the AI layer and/or filters relates to a user group such that the prompt generator generates prompts that pertain more broadly to the user group. As a result, in response to the group-specific prompts, the generative AI layer machine-generates and outputs group-specific thought starters. These thought starters can be periodically generated and stored for real-time access. For example, group-specific thought starters can be retrieved in response to determinations that users associated with the particular group are engaging with the application software system or user network.

Personalized as used herein may refer to the machine-generation and output of a thought starter that is based on a holistic representation of a specific user or user group, such that upon perceiving the thought starter, a prospective content creator user feels like they are being spoken to directly based on their unique background and/or experiences. In some instances, the personalization is achieved by including examples of the user's own previously created content items (e.g., most recently created posts, or most recently shared, liked, or commented upon posts) in the prompts that are input to the generative AI layer. For example, a prompt can include an instruction to the generative AI layer to "write a few sentences about the topic contained in these examples using the tone and phrasing contained in those examples" where the "examples" include the user's previously created content or summaries thereof. In some instances, rather than passing the full content of the user's previous posts to the prompt generator, an intermediary AI model is used to summarize the content of the previous posts and then the summary is passed to the prompt generator.

As another example, a topic model can extract specific topics from the user's previously created posts or a tone model can determine the tone of the previously created posts and pass this topic and/or tone information to the prompt generator, or a syntax model or phrasing model can determine the syntax or phrasing of the previously created posts and pass the syntax and/or phrasing information to the prompt generator. The user's previously created content can be filtered so that, for example, only the most recently-created previous content or only content related to a currently trending topic is passed to the content generator. In some instances, if the prospective content creator is an infrequent poster or new user, for example, such that few or no examples of the user's previous content are available, examples of the user's previous interactions with other users' posts (e.g., comments, reshares, reactions) to create the personalized prompts.

The examples shown in FIG. 2 and the accompanying description, above, are provided for illustration purposes. This disclosure is not limited to the described examples. Additional or alternative details and implementations are described herein.

The figures FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, and FIG. 3N illustrate a user interface flow or sequence of user interface views that can be presented to a prospective content creator user to assist the user by machine-generating and outputting a thought starter configured to stimulate the user's thinking during the creation of a new content item, such as a post. Each of the figures FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, and FIG. 3N illustrates an example of a user interface screen that can be used to facilitate digital content creation using automated thought starter generation technologies described herein, for example to create a post, comment, or article for distribution via a user network.

In the user interfaces shown in FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, and FIG. 3N, certain data that normally would be displayed may be anonymized for the purpose of this disclosure. For instance, in a live example, the actual data and not the anonymized version would be displayed. For instance, in a live example, the text "JobTitle" would be replaced with an actual job title (e.g., software engineer) and "FirstName LastName" would be replaced with a user's actual name.

The user interfaces shown in FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M are presented by an application software system, such as a user network and/or content distribution system, to a user who wants to create a digital content item for distribution via a user network. In some implementations, the user interfaces are each implemented as a web page that is stored. e.g., at a server or in a cache of a user device, and then loaded into a display of a user device via the user device sending a page load request to the server. The icons and the selection and arrangement of elements shown in the user interfaces are copyright 2023 LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language audio received via a microphone embedded in a computing device.

Figure 3B:
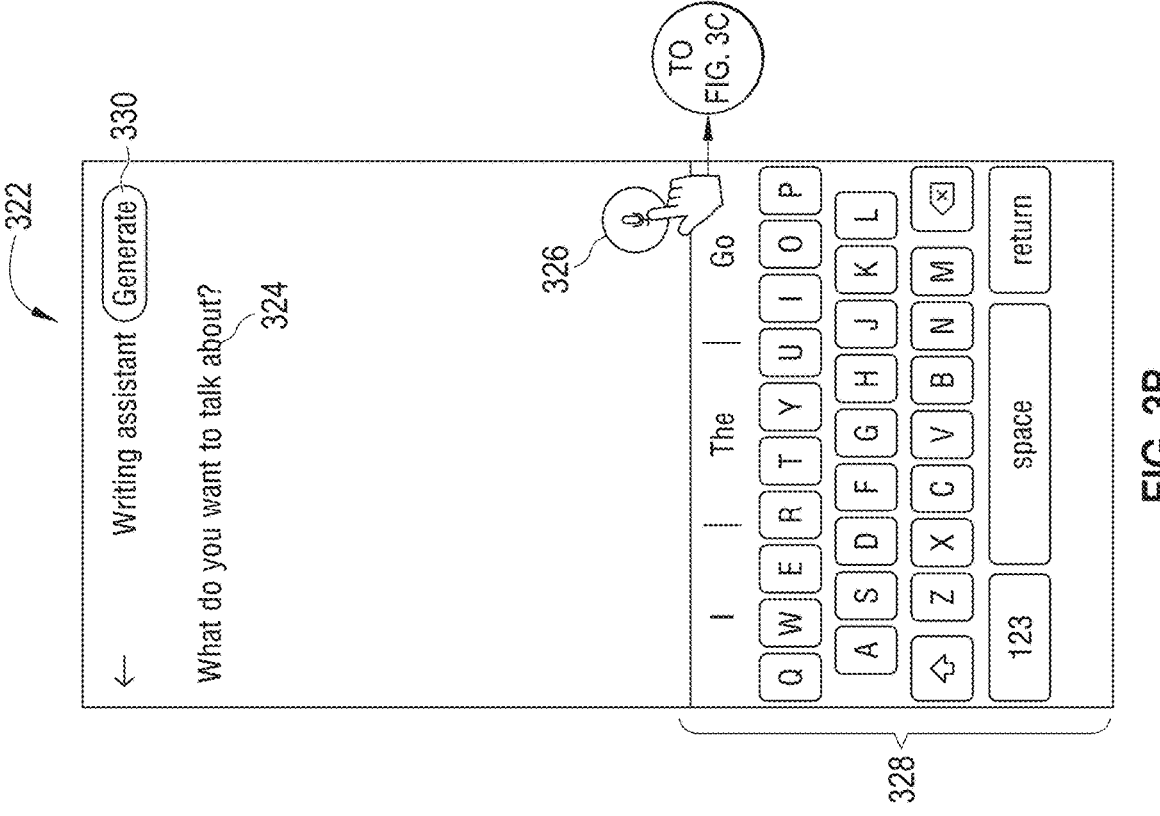
Figure 3A:
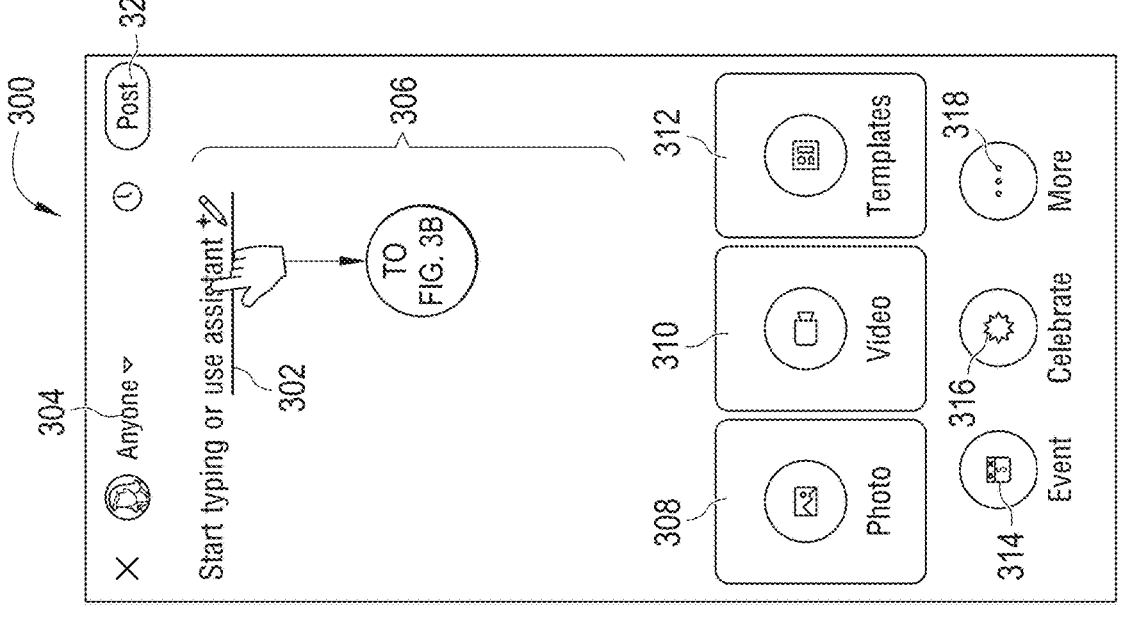

FIG. 3A illustrates an example of a screen capture of a user interface to create a new content item in accordance with some embodiments of the present disclosure. The user interface 300 of FIG. 3A enables a user to create a digital content item that can be distributed by the application software system or user network to one or more other users of the application software system or user network. The user can select the recipients of the content item at graphical user interface (GUI) element 304 (e.g., "Anyone"). For example, after creating the content item, the user selects the "Post" button 320 to cause the content item to be distributed to the user or group of users selected at element 304.

The interface 300 includes an input box 306 into which the user can input text, e.g., by typing, and a number of GUI control elements configured to facilitate the input of content by the user. Element 302 includes a "use assistant" mechanism (e.g., a hyperlink) that, if selected by the user, launches a content creation assistant such as a thought starter generation system described herein. Elements 308, 310, 312, 314, 316, 318 if selected by the user, enable the user to include various non-text types of content in or as attachments to the content item, e.g., a digital image (photo 308), a digital video (video 310), a template 312 (e.g., a specific format or "aesthetic" for the content item), a calendar event (event 314), an announcement (celebrate 316) or other options (more 318).

As described herein, the "use assistant" mechanism can be used whether or not the user enters any content in the input box 306 or includes or attaches any non-text content. For example, after perceiving user interface 300, the user can simply select the use assistant mechanism 302 to launch the thought starter generation system without performing any other interactions with the user interface 300 prior to selecting the mechanism 302.

In the example of FIG. 3A, user selection of the use assistant mechanism 302 causes a transition from user interface 300 to user interface 322 shown in FIG. 3B.

FIG. 3B illustrates an example of a screen capture of a user interface to create a new content item using a content creation assistant, e.g., a writing assistant, that includes a thought starter generation system, in accordance with some embodiments of the present disclosure. FIG. 3B includes a system-generated message 324 (e.g., what do you want to talk about?) configured to stimulate the user to provide input, FIG. 3B also includes input mechanisms 326 (microphone) and 328 (keypad), either or both of which the user can use to provide input in response to the message 324. In the example of FIG. 3A, user selection of the microphone mechanism 326 causes a transition from user interface 322 to user interface 330 shown in FIG. 3C.

In FIG. 3C, after the user selects the microphone 332, the user's speech is captured by the microphone 332 and transcribed by a speech-to-text mechanism of the application software system. The transcription of the user's speech is output and displayed in the text input box 334. User interface 330 also includes a back mechanism 336 which, if selected by the user, causes a transition back to user interface 322. After the user reviews the text displayed in text box 334, the user selects a generate mechanism 338. Selection of the generate mechanism 338 causes a transition from user interface 330 to user interface 340 of FIG. 3D.

In FIG. 3D, in response to the user selection of the generate button 336, the thought starter generation system formulates a prompt based on the transcribed user input in box 334, inputs the prompt to a generative language model, receives machine-generated natural language text output by the generative language model and displays the text created and output by the generative language model in text box 342. User interface 340 also includes a "redo" mechanism 346 which, if selected by the user, causes the thought starter generation system to reformulate the prompt or create a new prompt, input the reformulated or new prompt to the generative language model, receive a second version of machine-generated natural language text output by the generative language model and display the second version of the text in text box 342. User interface 340 also includes an insert button 344 which, if selected by the user, causes a transition from user interface 340 to user interface 348 of FIG. 3E.

Figures 3E, 3F:
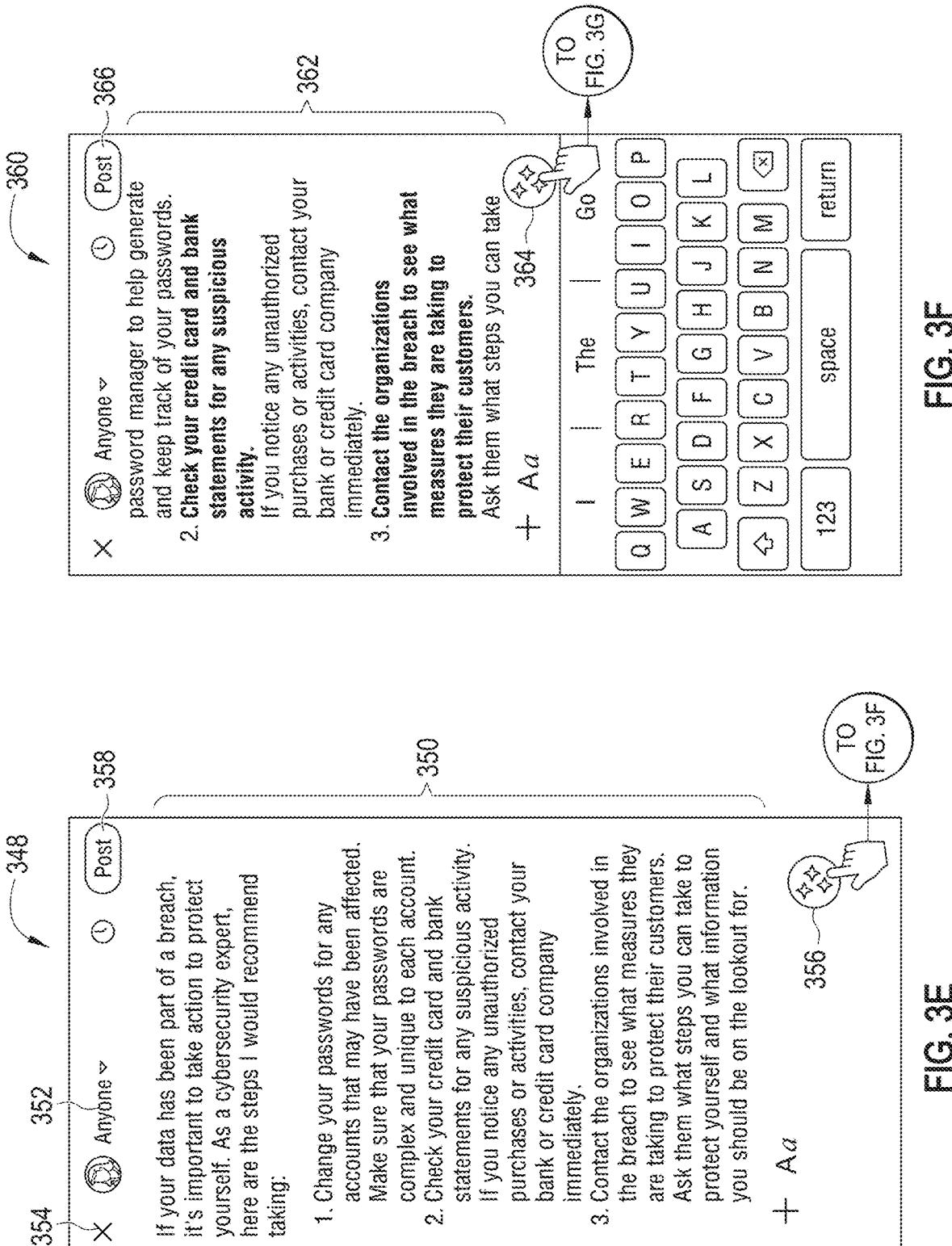

In FIG. 3E, in response to selection by the user of the insert button 344, the application software system generates a distributable content item (e.g., a post) containing the generative language model output 350 and presents the distributable content item to the user as shown in user interface 348. User interface 348 also includes a cancel mechanism 354, a magic post improve mechanism 356, and a post mechanism 358. The cancel mechanism 354, if selected by the user, causes a transition back to user interface 340, e.g., without saving the post. Post mechanism 358, if selected by the user, causes the application software system to initiation distribution of the content item containing content output by the generative language model to one or more other users of the application software system or user network. Magic post improve mechanism 356, if selected by the user, causes a transition to user interface 360 of FIG. 3F.

In response to user selection of magic post improve mechanism 356, the thought starter generation system communicates a new prompt or a revised version of the original prompt to the generative language model; e.g., a second prompt containing an instruction to the generative language model (GLM) to, e.g., "reformat the GLM's previous output to make the content easier to read." The re-formatted output of the GLM in response to the second prompt is presented in the user interface 360 of FIG. 3F. User interface 360 also includes a post mechanism 366, similar to post mechanism 358, and magic post improve mechanism 364, similar to magic post improve mechanism 356. Thus, as shown by FIG. 3E and FIG. 3F, the generative language model can be invoked by the thought starter generation system multiple times, e.g., iteratively, in order to refine, reformat, expand, or otherwise modify the previous output of the GLM.

Magic post improve mechanism 356 enables creators with a draft of a post in a sharebox to polish and improve the draft post by presenting options for writing assistance. For example, if selected, magic post improve mechanism 356 can: generate text suggestions for the creator based on what the creator has already written (including any previously-generated GLM output); generate media assets to supplement the written text; edit the tone/or and language of the written text (e.g., convert technical jargon into commonly understood terms); change the structure and/or format of the written text, e.g., from paragraph to bullet points, lists, or an essay format; auto-generate and write text for them using the GLM based on prompts that reflect the creator's intent as determined based on one or more AI signals and/or one or more input signals as described herein, auto-generate and insert hyperlink @mention entities based on the written text; edit the tone and style of the written text based on the user's history of previous written posts; auto-generate titles for the creator's posts based on the content contained in the post; auto-suggest links to source content based on other similar posts that have been distributed in the application software system; suggest relevant hash tags related to the post or title, etc. A user selection of magic post mechanism 364 causes a transition from user interface 360 to user interface 368 of FIG. 3G.

Figures 3G, 3H:
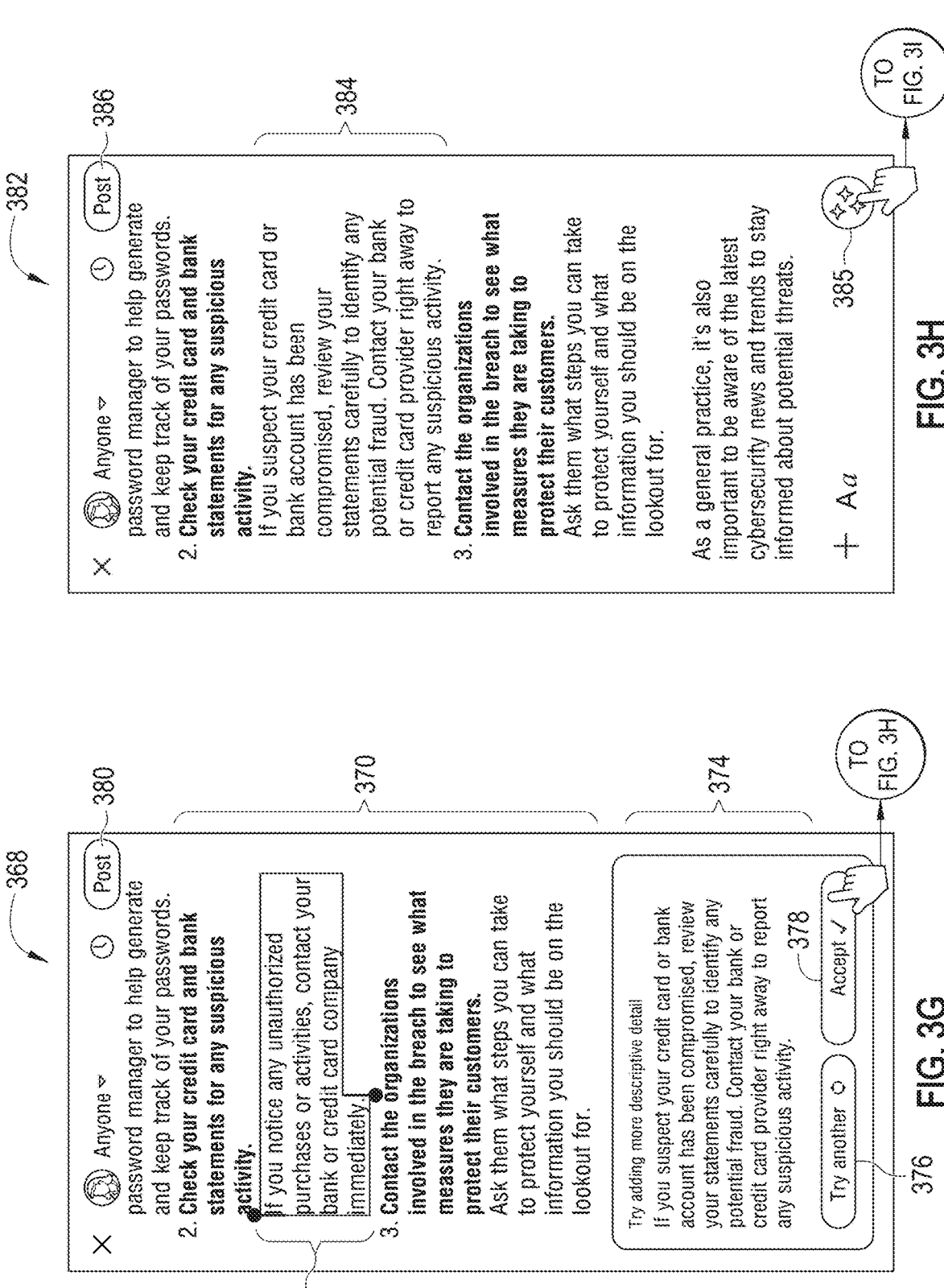

In FIG. 3G, user interface 368 displays the content output by the GLM on the most recent previous iteration along with any edits made by the user to the GLM output, in box 370. In response to reviewing the GLM-generated content presented in box 370, the user selects subpart 372 of the content, e.g., by tapping on the user interface screen at the location of the subpart 372. In response to the user selection of subpart 372, the thought starter generation system generates and outputs a new thought starter 374. The new thought starter 374 includes a suggestion to "try adding more descriptive detail" to the subpart 372 and contains a new version of subpart 372 that has more descriptive detail, where the new version is output by the GLM, e.g., in response to a third prompt that contains an instruction to the GLM to "rewrite the subpart 372 with more descriptive detail." The user interface 368 also includes a try another mechanism 376, an accept mechanism 378, and a post mechanism 380. The try another mechanism 376, if selected by the user, causes the thought starter generation system to generate a new version of thought starter 374, e.g., to regenerate the suggested revision to the subpart 372 using a new or modified prompt. Thus, as shown in FIG. 3G, the generative language model can be invoked by the thought starter generation system multiple times, e.g., iteratively, in order to refine, reformat, expand, or otherwise modify specific user-selected subparts of the previous output of the GLM such as subpart 372. The accept mechanism 378 if selected by the user causes the GLM-generated suggested revision to the subpart 372 to be incorporated into the content of box 370 and causes a transition to user interface 382 of FIG. 3H. The post mechanism 380, if selected by the user, operates in a similar manner as other post mechanisms described herein. For example, if the user does not want to accept any GLM-generated suggested modifications, the user can proceed to post the content item via post mechanism 380.

In FIG. 3H, the user interface 382 presents the content of box 370 except that, at subsection 384, the content of subpart 372 of FIG. 3G has been replaced with the content of the GLM-generated suggested modification 374. In response to user selection of magic post mechanism 385, the application software system transitions to user interface 388 of FIG. 3I.

Figure 3J:
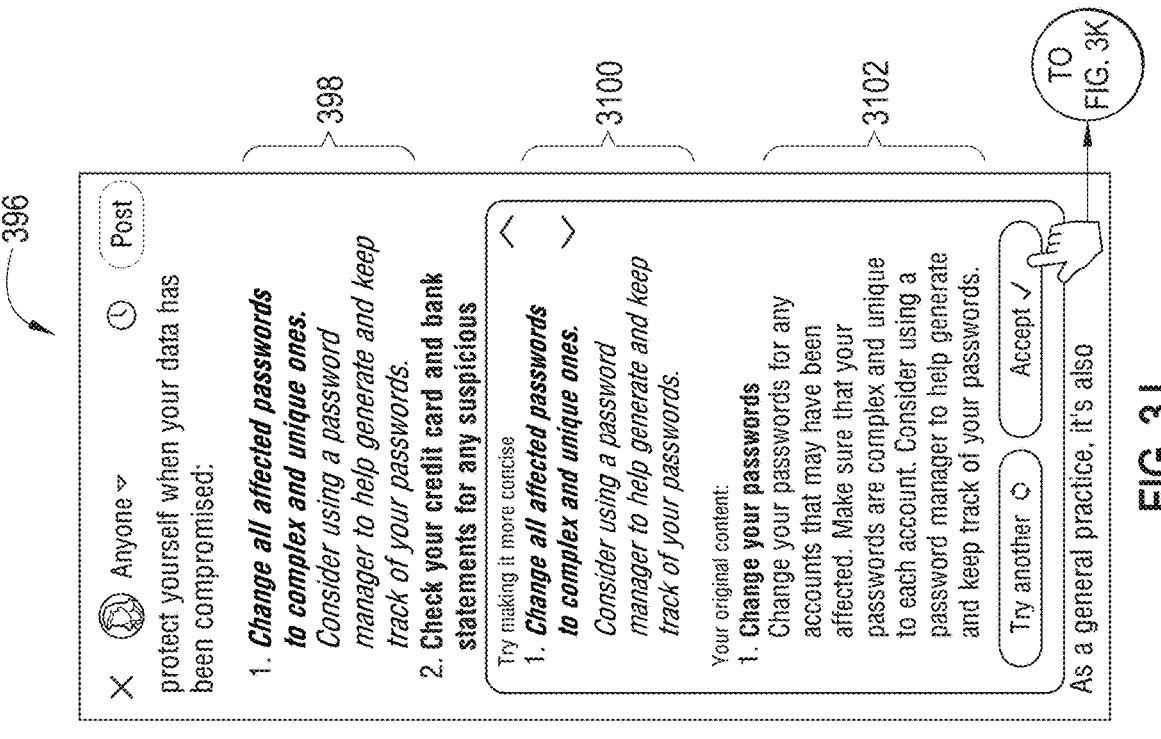
Figure 3I:
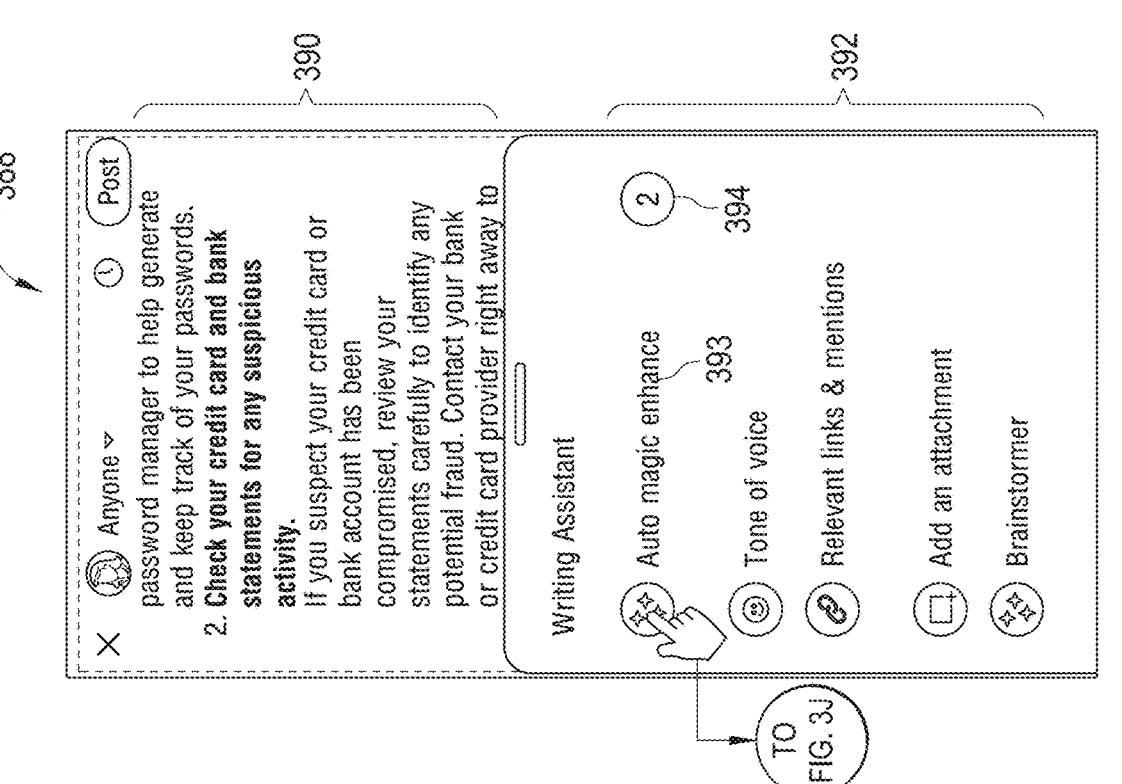

In FIG. 3I, user interface 388 presents an overlay of the draft post 390 which includes writing assistant options 392. Each of the options 392 if selected, utilizes the GLM to auto-modify the draft post 390. For instance, selecting the tone of voice option causes the thought starter generation system to generate a new prompt or a modified version of a previous prompt that includes instructions to the GLM to rewrite the post using a different tone. Selection of the relevant links & mentions option causes the thought starter generation system to generate a new prompt or a modified version of a previous prompt that includes instructions to the GLM to identify an appropriate link or mention based on the content of the draft post 390 such that the GLM creates a new or modified version of the draft post 390 that includes the identified link or mention. Selection of the add an attachment option causes the thought starter generation system to generate a new prompt or a modified version of a previous prompt that includes instructions to the GLM to identify an appropriate pre-existing content item to include as an attachment to the post, based on the content of the draft post 390.

Selection of the brainstormer option causes the thought starter generation system to generate a new prompt or a modified version of a previous prompt that includes instructions to the GLM to auto-generate and output an outline for a post that is based on a seed of an idea provided by the creator, where the seed can be the previously-generated draft post 390 or other input, such as the creator's reply to a question presented by the thought generation system. In some instances, the brainstormer option causes the thought starter generation system to enable a conversational dialog between the creator and the GLM to, for example, generate an initial outline of an idea and then refine the idea over multiple iterations into a final version of a post.

While not specifically shown in FIG. 3I, another option that can be provided by the writing assistant 392 is a summarize my feed option. A feed is a user interface mechanism for presenting content items to users for review and interaction, typically presented in a scrollable format. Often, when users review their feed updates, most users may only read a fraction of all of the content items available in the feed. However, there may be many posts in the feed or excluded from the feed due to screen real estate and/or scroll depth limitations, which are not interacted with by the user but may still contain information that is relevant to the user. The summarize my feed option causes the GLM to summarize and identify highlights across several posts which fall beyond the limit of what the user is likely to scroll or consume while viewing the feed. For example, the thought starter generation system formulates a prompt that includes instructions to the GLM to summarize the posts in the user's feed in a way that accounts for currently trending topics and/or deduplicates similar content items in the feed. For instance, suppose a user's post feed includes the following posts: Post 1—expresses concern about a wave of layoffs in tech; post 2—a manager celebrating a team outing; post 3—solidarity post with laid off engineers; Post 4—shock at layoff announcement by Company Z. If the user selects the summarize my feed option, the thought starter generation system can generate and output the following summary, where brackets indicate links to specific posts in the user's feed: "3 people in your network posted about layoffs, including [at Microsoft], and somebody else shared [a picture] from a team activity."

Using one or more of the AI signals and/or input signals as discussed herein, the thought starter generation system uses the output of the GLM to create a user-personalized overview of the user's feed. In a social network use case, the user's feed may typically include posts distributed to the network by other users with whom the user is connected in the social network, e.g., posts by first and second degree connections of the user. Thus, in social network implementations, the output of the summarize my feed option can include an overview of the user's personal subset of the social network, i.e., the user's connections.

In user interface 388, the writing assistant indicates that the auto magic enhance option has two available suggestions, which have been auto-generated using the GLM, at indicator 394. In response to user selection of the auto magic enhance option 393, the application software system transitions to user interface 396 of FIG. 3J.

Selection of the auto magic enhance option 393 causes the thought starter generation system to formulate a new or revised prompt to apply one or more enhancements, such as reformatting, rewording, summarizing or expanding, to the draft post 390, to input the new or revised prompt to the GLM, and to receive output generated by the GLM in response to the new or revised prompt. In FIG. 3J, output of the GLM generated by the GLM in response to selection of the auto magic enhance option 393 is shown in user interface 396. The GLM-output auto-enhancements options produced by the GLM include a suggestion 3100 to make the subpart 398 of the draft post 390 more concise. The user interface 396 shows a revised version of the subpart 398 that includes the suggestion 3100 and shows the previous version of the subpart 398 at box 3102. In response to a user selection of the accept mechanism of user interface 396, the application software system transitions to user interface 3104 of FIG. 3K.

In FIG. 3K, user interface 3104 presents a revised version of the draft post 3106 that includes the accepted suggestion 3100 in the subpart 3108. In response to user selection of the auto magic enhance mechanism 3110, the application software system transitions to user interface 3112 of FIG. CL.

In response to selection of the auto magic enhance mechanism 3110, the thought starter generation system generates a new or revised prompt, inputs the new or revised prompt to the GLM, and presents output generated by the GLM in response to the new or revised prompt to the user in user interface 3112. In FIG. 3L, the GLM output includes a suggestion to include a poll 3116 in the post 3114. User interface 3112 includes a scroll mechanism 3120 that enables the user to scroll through multiple GLM-generated suggestions. User selection of accept mechanism 3118 causes the suggested poll 3116 to be added to the draft post 3114 and causes the application software system to transition to user interface 3122 of FIG. 3M.

Figures 3M, 3N:
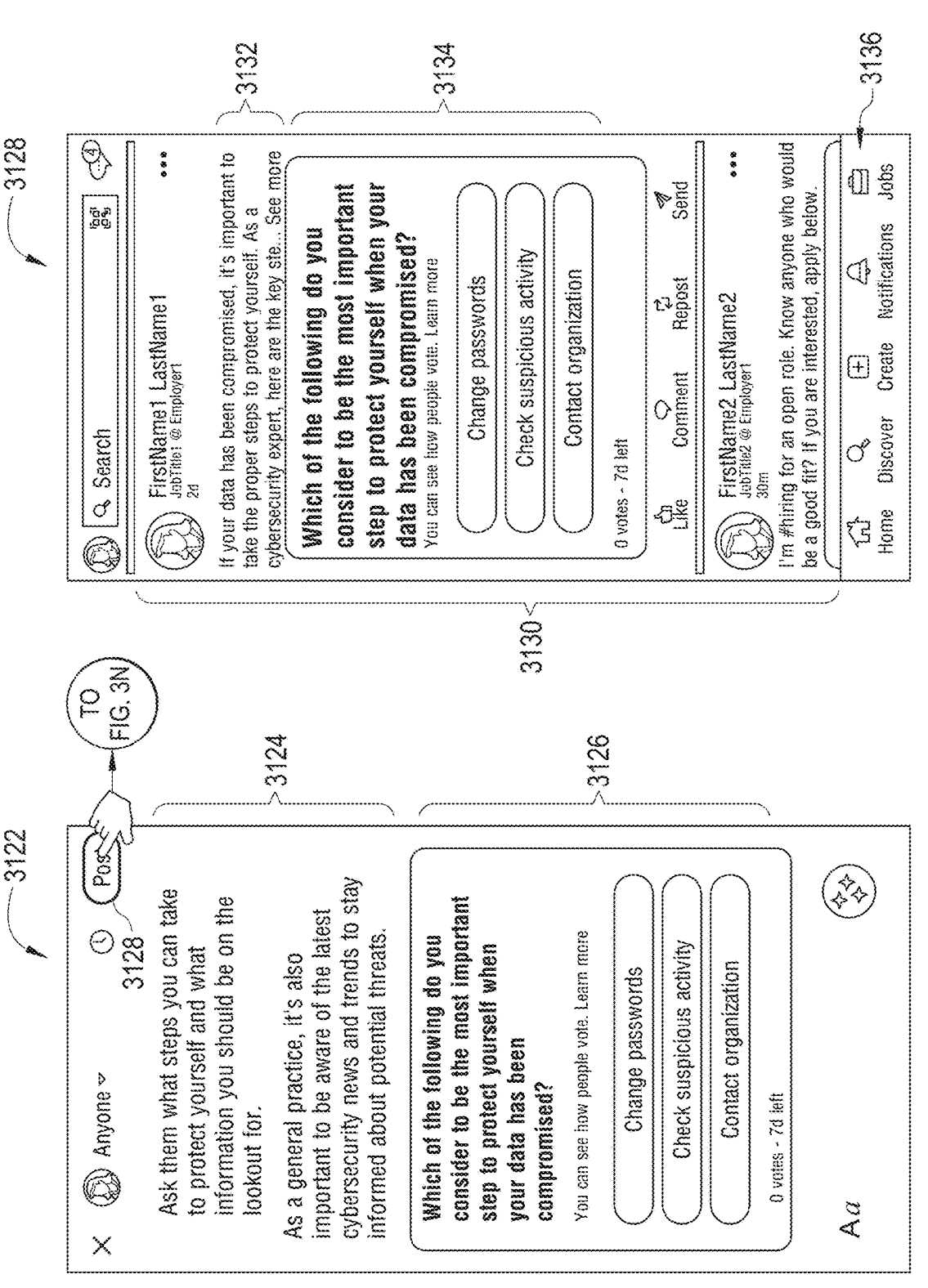

In FIG. 3M, user interface 3122 generates and presents a post that includes GLM-generated and/or GLM-suggested content such as text 3124 and poll 3126, which the user has accepted for inclusion in the post. After reviewing the post, the user can select the post mechanism 3128 to cause the post, including the GLM-suggested content 3124, 3126, to be distributed to one or more other users of the application software system or user network. Alternatively the user could select the auto magic enhance mechanism to generate another iteration of GLM-produced suggestions. Selection of the post mechanism 3128 causes the application software system to transition to user interface 3129 of FIG. 3N.

In FIG. 3N, user interface 3129 shows a feed 3130 including the post created by the user using the GLM-suggested subparts. e.g., text 3132 and poll 3134, described GLM-based thought starter generation technologies. User interface 3129 also includes mechanisms 3136, each of which is selectable to invoke other functionality of the application software system, such as viewing a home page, executing a search query, creating a piece of content, viewing notifications, and viewing job postings. User interface 3129 shows one example of functionality that the application software system can provide. Other implementations can include other functionality alternatively or in addition to the functionality shown in user interface 3129.

The examples shown in FIG. 3A, FIG. 3B, FIG. 3C, FIG. 3D, FIG. 3E, FIG. 3F. FIG. 3G, FIG. 3H, FIG. 3I, FIG. 3J, FIG. 3K, FIG. 3L, FIG. 3M, and FIG. 3N and the accompanying description, above, are provided for illustration purposes. For example, while the examples are illustrated as user interface screens for a small form factor device such as a smart phone, the user interfaces can be configured for other forms of electronic devices, such as laptops, monitors, and wearable devices. This disclosure is not limited to the described examples. Additional or alternative details and implementations are described herein.

FIG. 4A, FIG. 4B, FIG. 4C, FIG. 4D, FIG. 4E, FIG. 4F, FIG. 4G, FIG. 4H, and FIG. 4I illustrate an example of at least one flow including screen captures of user interface screens configured to convert digital content from one form of content to another form of content. e.g., from a post to an article, based on at least one AI-generated thought starter in accordance with some embodiments of the present disclosure.

In the user interfaces shown in FIG. 4A, FIG. 4B, FIG. 4C, FIG. 4D, FIG. 4E, FIG. 4F, FIG. 4G, FIG. 4H, and FIG. 4I, certain data that normally would be displayed may be anonymized for the purpose of this disclosure. For instance, in a live example, the actual data and not the anonymized version would be displayed. For instance, in a live example, the text "JobTitle" would be replaced with an actual job title (e.g., software engineer) and "FirstName LastName" would be replaced with a user's actual name.

The user interfaces shown in FIG. 4A, FIG. 4B, FIG. 4C, FIG. 4D, FIG. 4E, FIG. 4F, FIG. 4G, FIG. 4H, and FIG. 4I are presented by an application software system, such as a user network and/or content distribution system, to a user who wants to create a digital content item for distribution via a user network. In some implementations, the user interfaces are each implemented as a web page that is stored. e.g., at a server or in a cache of a user device, and then loaded into a display of a user device via the user device sending a page load request to the server. The icons and the selection and arrangement of elements shown in the user interfaces are copyright 2023 LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language audio received via a microphone embedded in a computing device.

Figure 4A:
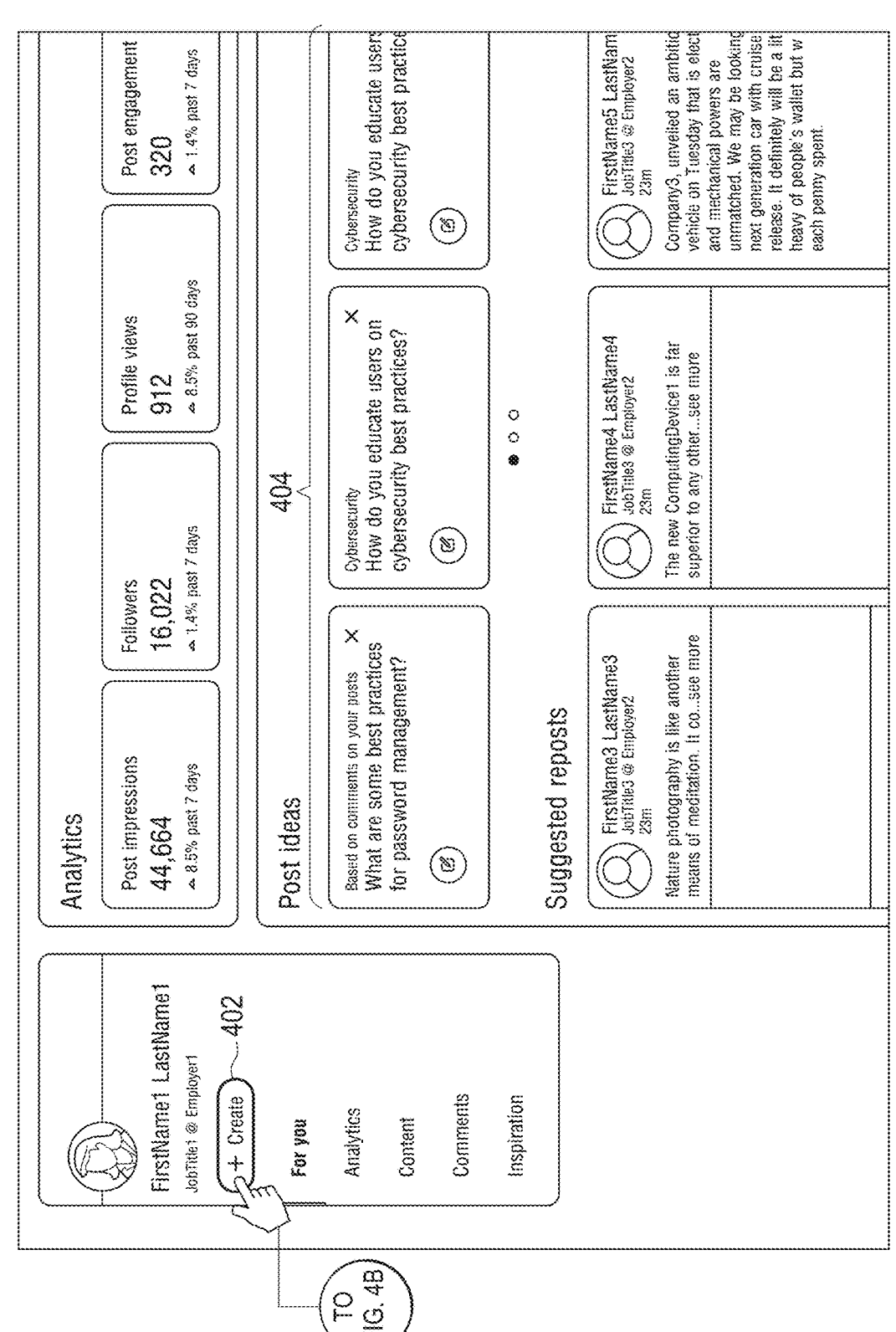
FIG. 4A, FIG. 4B, FIG. 4C, FIG. 4D, FIG. 4E, FIG. 4F, FIG. 4G, FIG. 4H, and FIG. 4I illustrate an example of at least one flow including screen captures of user interface screens configured to convert digital content from one form of content to another form of content based on at least one AI-generated thought starter in accordance with some embodiments of the present disclosure.

In FIG. 4A, user interface 400 shows an example of a user's home page in an application software system. The user interface 400 includes a create button 402 and a set of post ideas 404. The post ideas 404 are auto-generated using one or more generative models. For example, one or more AI signals and/or one or more input signals are selected for inclusion in a prompt, the prompt is input to a generative model, and the generative model outputs the post ideas 404 in response to the prompt that has been configured based on the one or more AI signals and/or one or more input signals. As described herein, use of the AI signals and/or input signals causes the generative model to personalize the post ideas to the user. User selection of the create mechanism 402 causes the application software system to transition to user interface 406 of FIG. 4B.

Figure 4B:
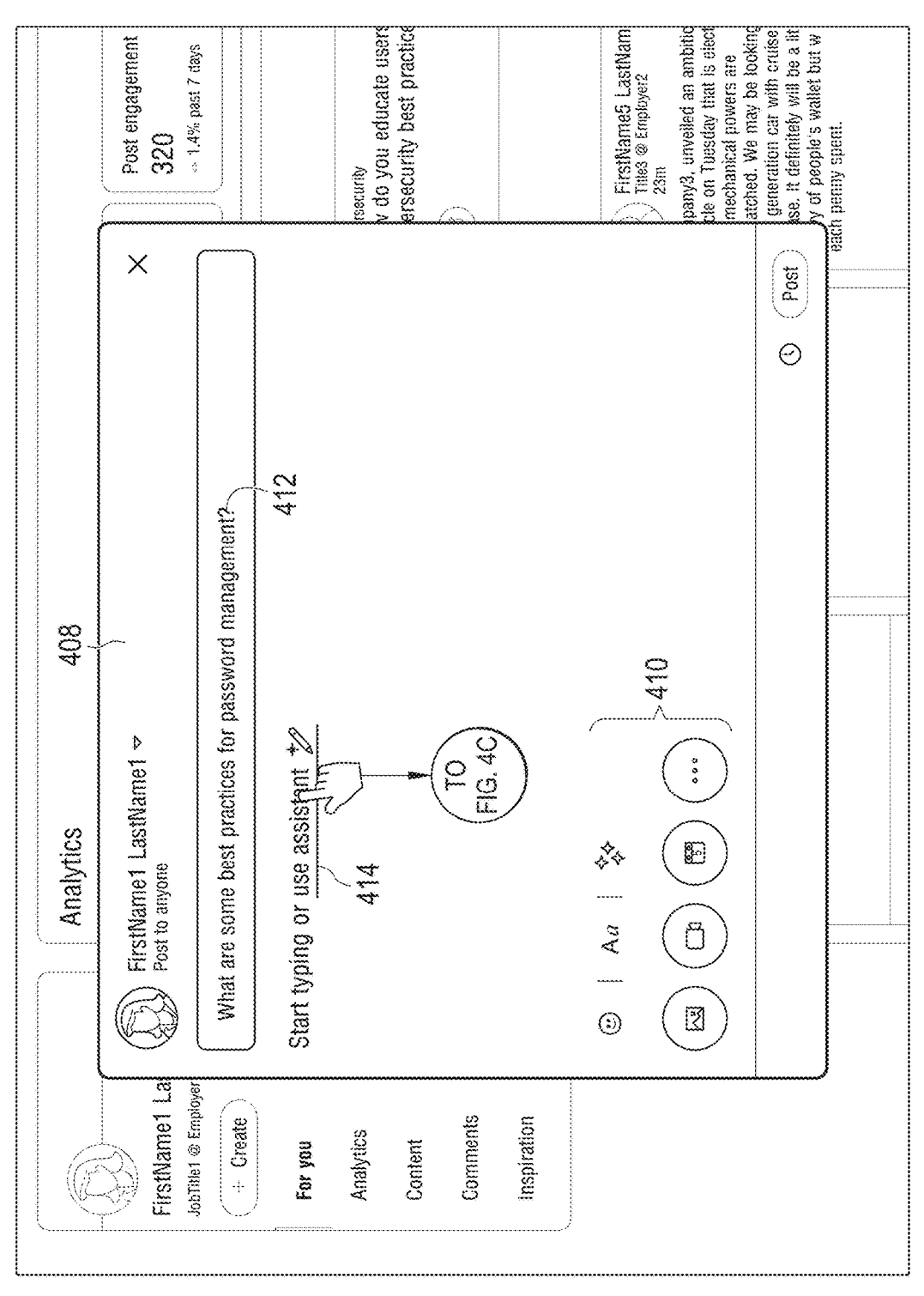

In FIG. 4B, user interface 406 presents an input window 408. The input window 408 contains a system-generated message 412, which requests input from the user. A use assistant mechanism 414 is selectable to launch a GLM-based thought starter generation system. The input window 408 also includes a set of tools 401. The set of tools 401 includes a mechanism that the user can employ to add content to the input window 408. For example, the set of tools 401 enables the user to add multi-modal content such as digital images, digital video, calendar events, hyperlinks, etc. Selection of use assistant mechanism 414 causes the thought starter generation system to generate one or more thought starters by generating one or more prompts based on one or more AI signals and/or one or more input signals and inputting the one or more prompts to one or more generative models, which generate and output one or more thought starters as described herein. Selection of use assistant mechanism 414 causes application software system to transition to user interface 416 of FIG. 4C.

Figure 4C:
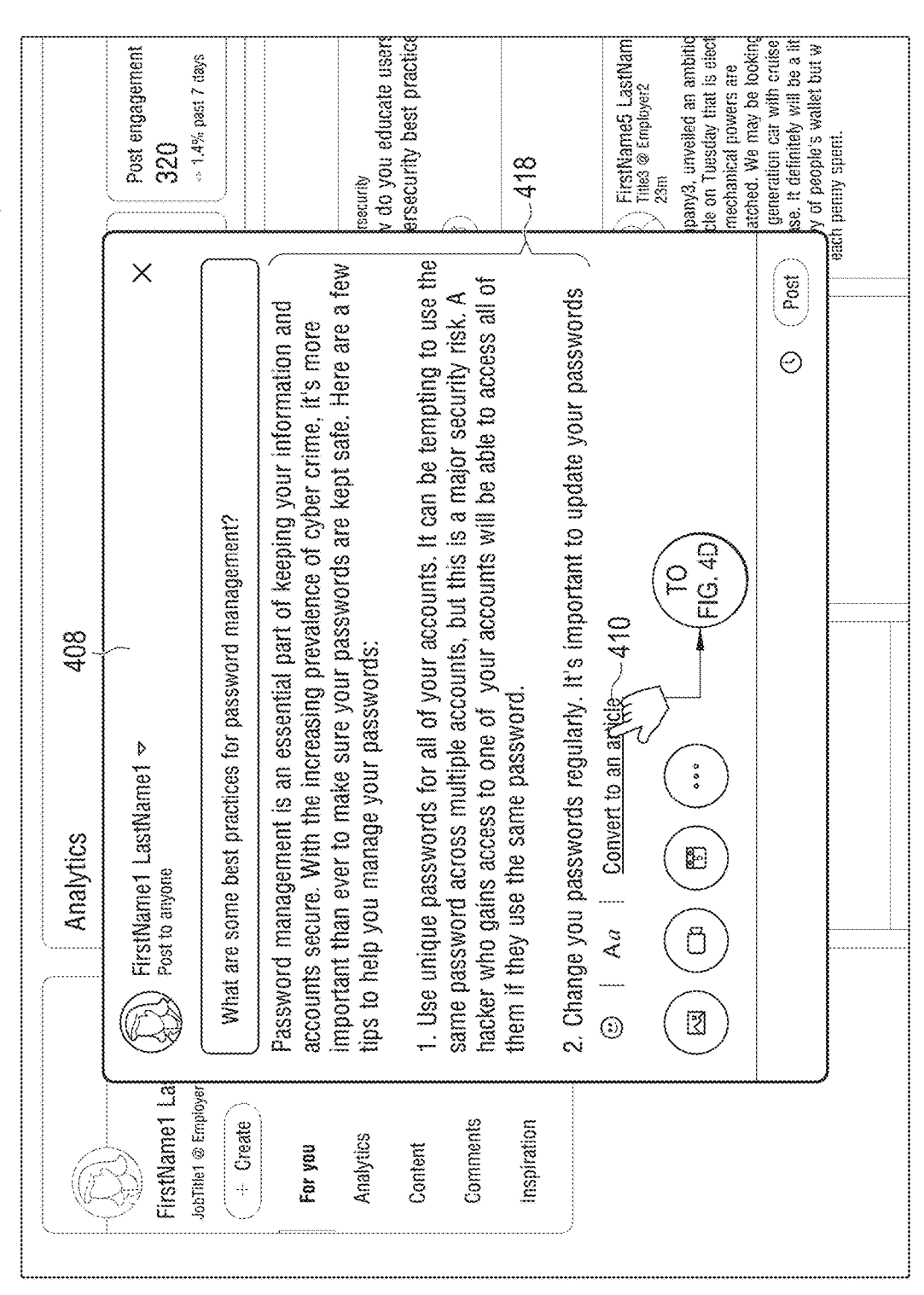

In FIG. 4C, in response to selection of use assistant mechanism 414, user interface 416 presents a thought starter 418 that has been auto-generated by a thought starter generation system as described herein. The thought starter 418 is personalized to the user (e.g., Jane) based on a prompt configured according to one or more AI signals and/or one or more input signals as described herein. A convert to article mechanism 420, if selected by the user, causes the thought starter generation system to convert the thought starter 418 from a post form, which is generally shorter in length and less detailed than an article) to an article form (which is generally longer in length and more detailed than a post). Selection of convert to article mechanism 420 causes a transition to user interface 422 of FIG. 4D.

Figure 4D:
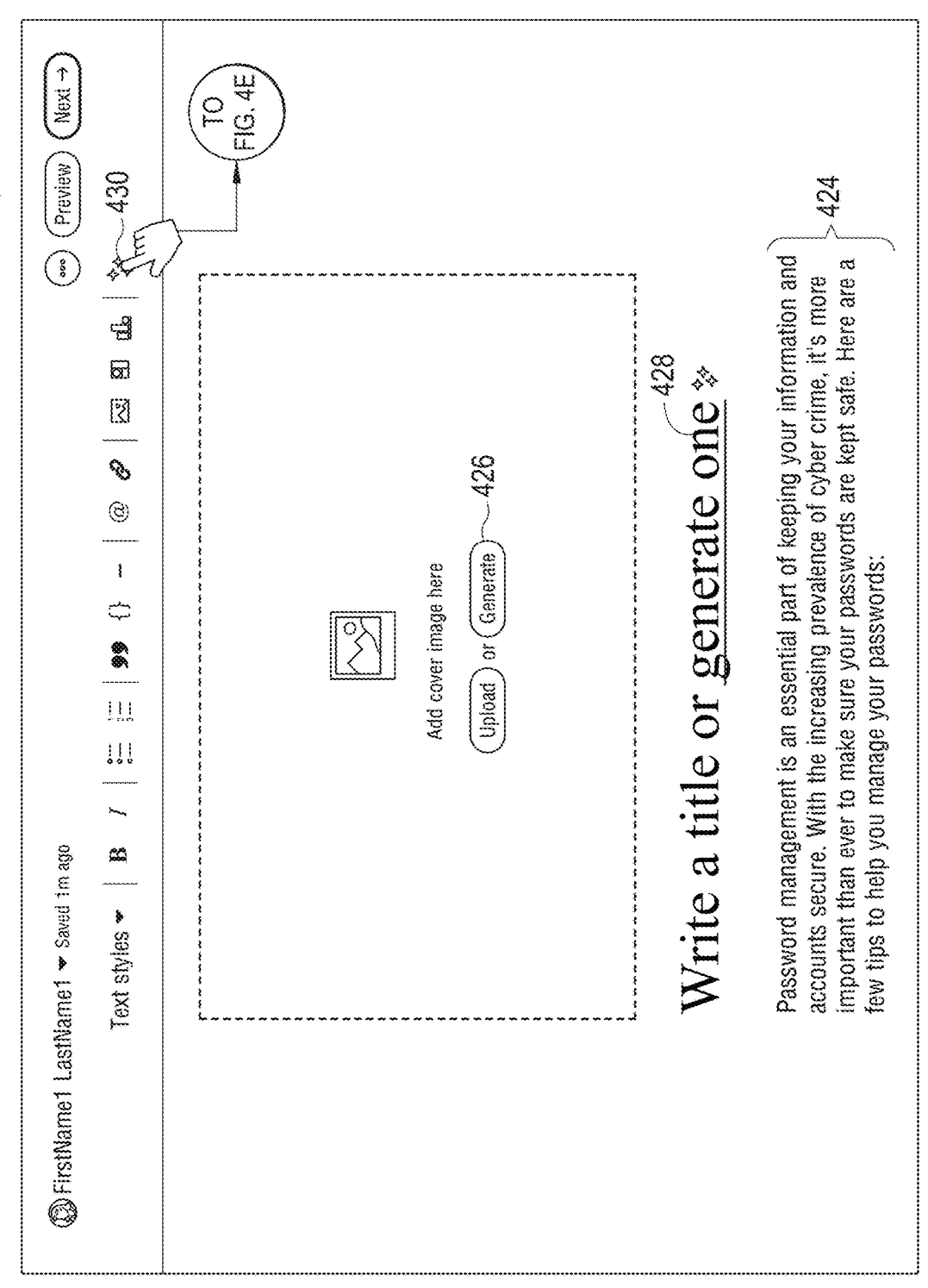

In FIG. 4D, user interface 422 presents a second thought starter 424 in the form of a draft of an article, where the second thought starter is generated by the thought starter generation system formulating a prompt based on the thought starter 418 with instructions for the generative model to output an article rather than a post, inputting the prompt to the generative model, and receiving output of the generative model in response to the prompt. The user interface 422 includes a generate image mechanism 426 and a generate title mechanism 428. If selected, generate image mechanism 426 applies a generative model to a prompt that is formulated based on thought starter 424 and includes an instruction to generate an image, the generative model outputs a machine-generated image, and the machine-generated image is added to the thought starter 424. If selected, the generate title mechanism 428 applies a generative model to a prompt that is formulated based on thought starter 424 and includes an instruction to generate a title for an article, the generative model outputs a machine-generated title, and the machine-generated title is added to the thought starter 424. User interface 422 also includes an auto magic enhance mechanism 430. Selection of auto magic enhance mechanism 430 causes the thought starter generation system to auto-generate a revised version of the thought starter 424 by formulating a prompt based on all of the inputs received via user interface 422, inputting the prompt into a generative model, and receiving output of the generative model in response to the prompt. Selection of auto magic enhance mechanism 430 causes a transition to user interface 432 of FIG. 4E.

Figure 4E:
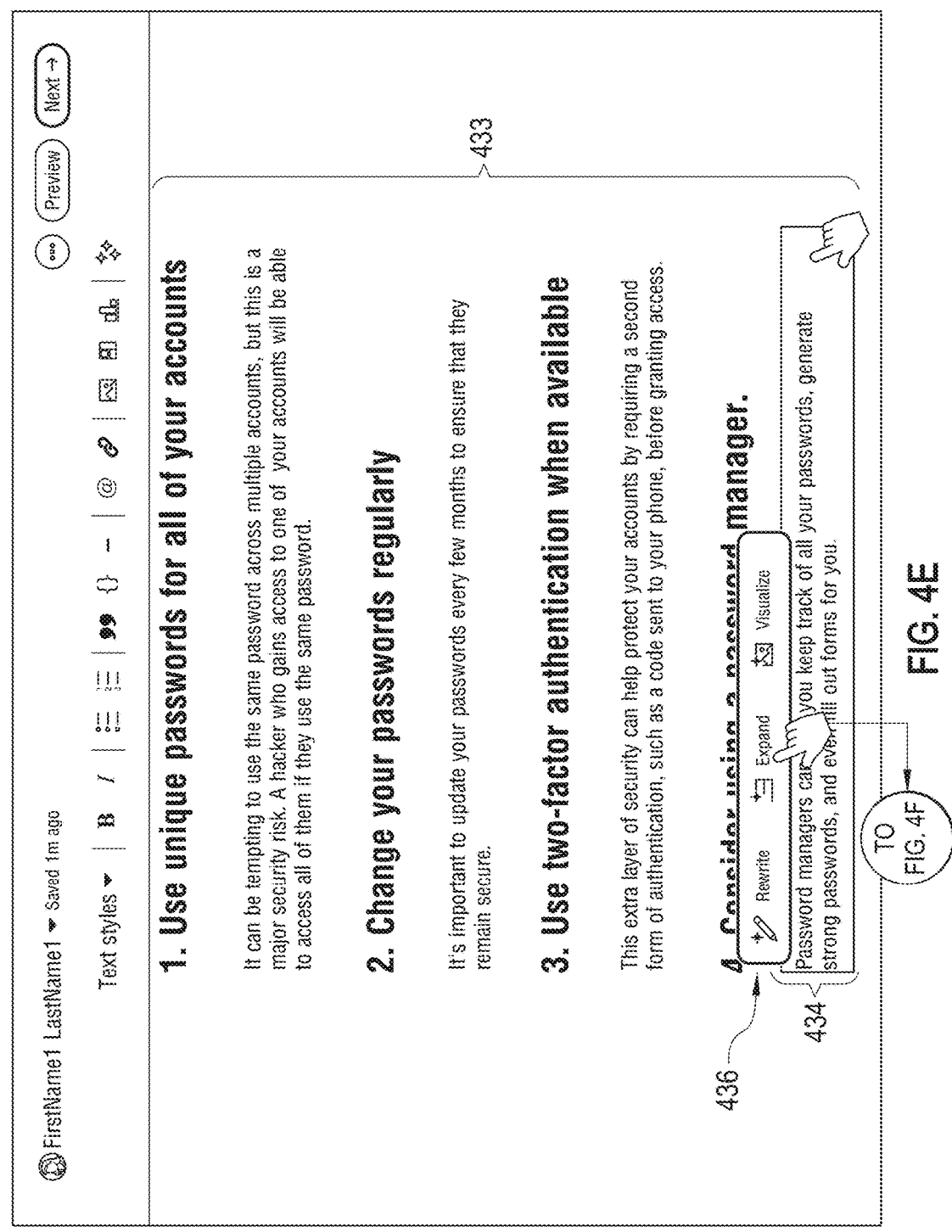

In FIG. 4E, user interface 432 presents the revised version 433 of the thought starter 424, which in this case includes an outline or draft of an article, which has been auto-generated by a generative model. In the example of FIG. 4E, the user selects a particular subpart 434 of the revised version of the thought starter 433, e.g., by tapping on a portion of the display screen at which the subpart 434 is displayed. Selection of the subpart 434 causes presentation of a submenu 436. The submenu 436 includes auto magic enhance options of the thought starter generation system that can be applied specifically to the selected subpart 434, including a rewrite option, an expand option, and a visualize option. The rewrite option if selected causes the thought starter generation system to formulate a prompt based on subpart 434 that includes instructions to the generative model to machine-generate a rewrite of the subpart 434. The expand option if selected causes the thought starter generation system to formulate a prompt based on subpart 434 that includes instructions to the generative model to machine-generate an expanded version of the subpart 434. The visualize option if selected causes the thought starter generation system to formulate a prompt based on subpart 434 that includes instructions to the generative model to machine-generate an image or video based on the subpart 434. Selection of the expand option of submenu 436 causes a transition to user interface 438 of FIG. 4F.

Figure 4F:
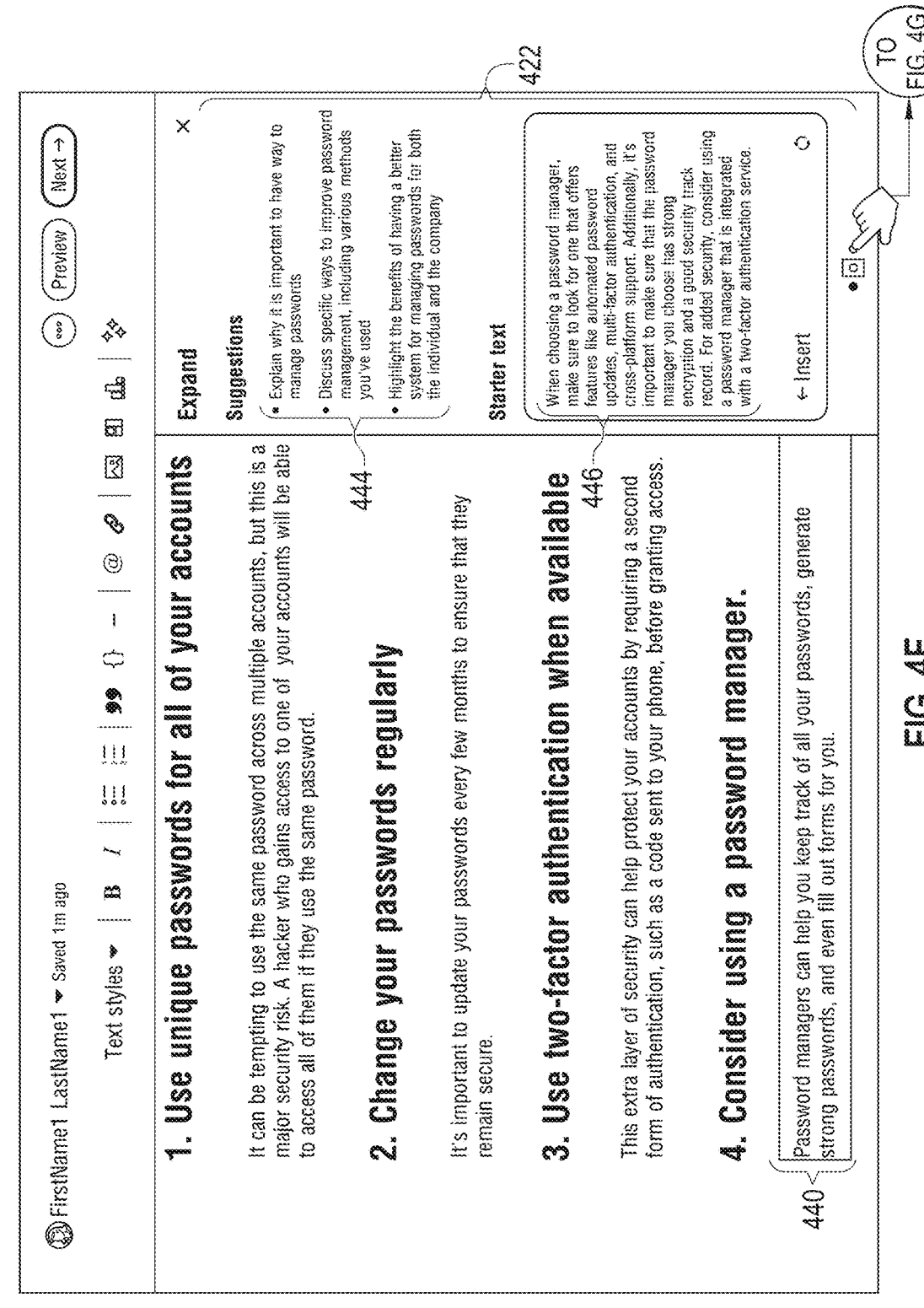

In FIG. 4F, user interface 438 presents an expand suggestions pane 442 adjacent to the revised version 433 of the thought starter 424. The expand suggestions pane 442 include text suggestions 444 and suggested starter text 446. The expand suggestions pane 442 are each auto-generated by the thought starter generation system formulating a prompt based on the revised version 433 of the thought starter 424, inputting the prompt to a generative model, and receiving output that is machine-generated by the generative model based on the prompt. For example, the thought starter generation system includes an instruction to generate text suggestions in the prompt to generate the text suggestions 444 and the thought starter generation system includes an instruction to write starter text in the prompt to generate the starter text 446. The expand suggestions pane 442 can include additional suggestions which the user can view, for example, by scrolling. Selection of the scroll mechanism of expand suggestions pane 442 causes a transition to user interface 448 of FIG. 4G.

Figure 4G:
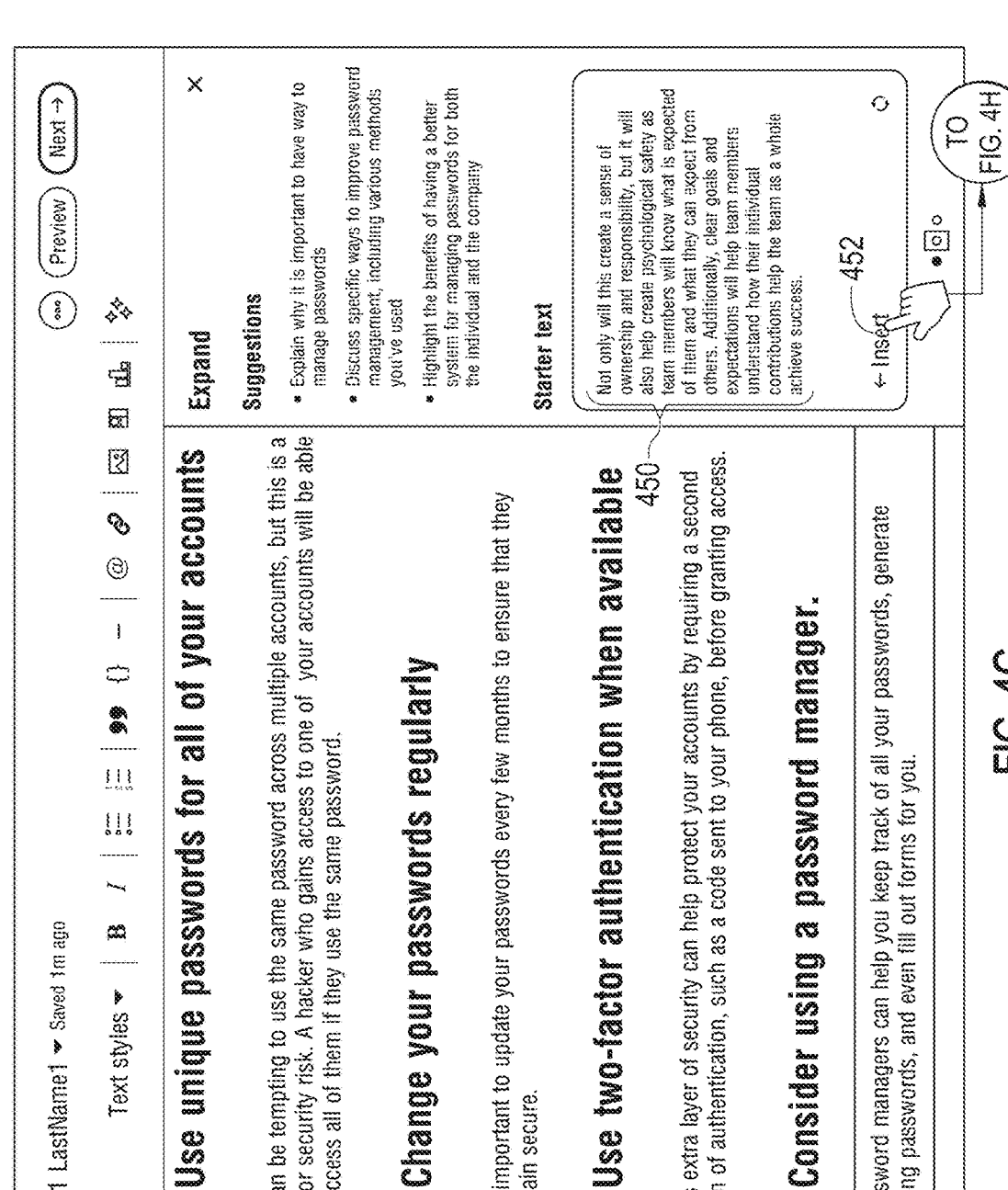

In FIG. 4G, user interface 448 shows that the user has scrolled the expand suggestions pane 442 to view additional expand suggestions that have been auto-generated by the thought starter generation system using one or more generative models, including a different starter text 450. The different starter text 450 is generated by the thought starter generation system formulating a new or revised prompt by, e.g., adjusting an instruction or an example, inputting the new or revised prompt into a generative model, and receiving the output of the generative model that the generative model has machine-generated based on the new or revised prompt. For example, the new or revised prompt could include an instruction to cause the generative model to generate output in a different tone or style. User interface 448 also includes an insert mechanism 452. Selection of the insert mechanism 452 causes the thought starter system to insert the selected starter text 450 into the draft article. For example, the thought starter system replaces a particular subpart of the draft article with the selected starter text 450. Selection of the insert mechanism 452 causes the application software system to transition to user interface 454 of FIG. 4H.

Figure 4H:
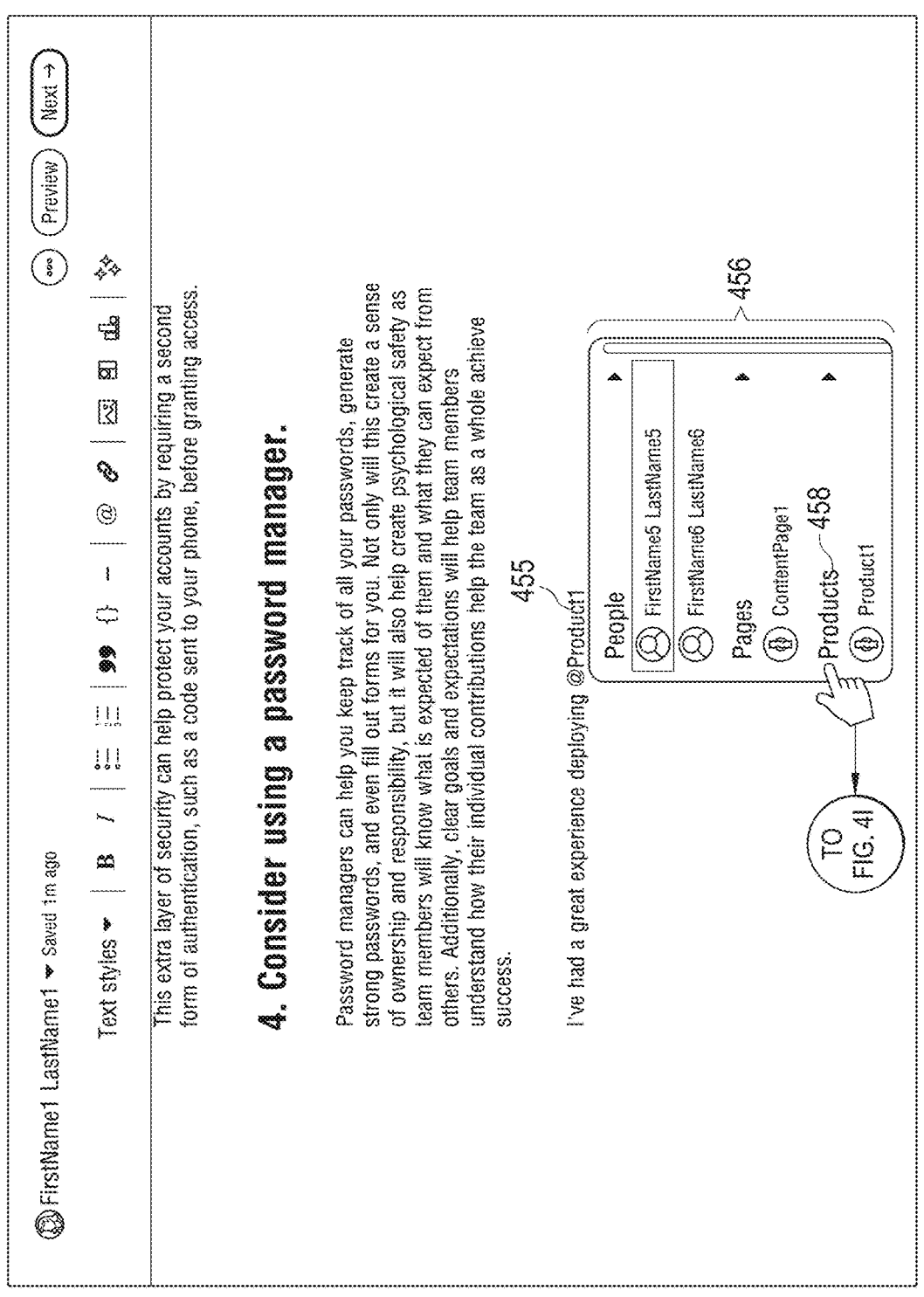

In FIG. 4H, the draft article as modified via user interface 448 is presented in user interface 454. The thought starter generation system detects a link or reference in the body of the draft article and automatically presents a set of link options 456 from which the user can chose a link to embed in the article. In the example of FIG. 4H, the user selects the products link option 458 which corresponds to the link or reference 455 in the draft article. The set of link options 456 is generated by, for example, the thought starter generation system querying an entity graph and/or knowledge graph as described herein. Selection of the product option 458 causes the application software system to transition to user interface 460 of FIG. DI.

Figure 4I:
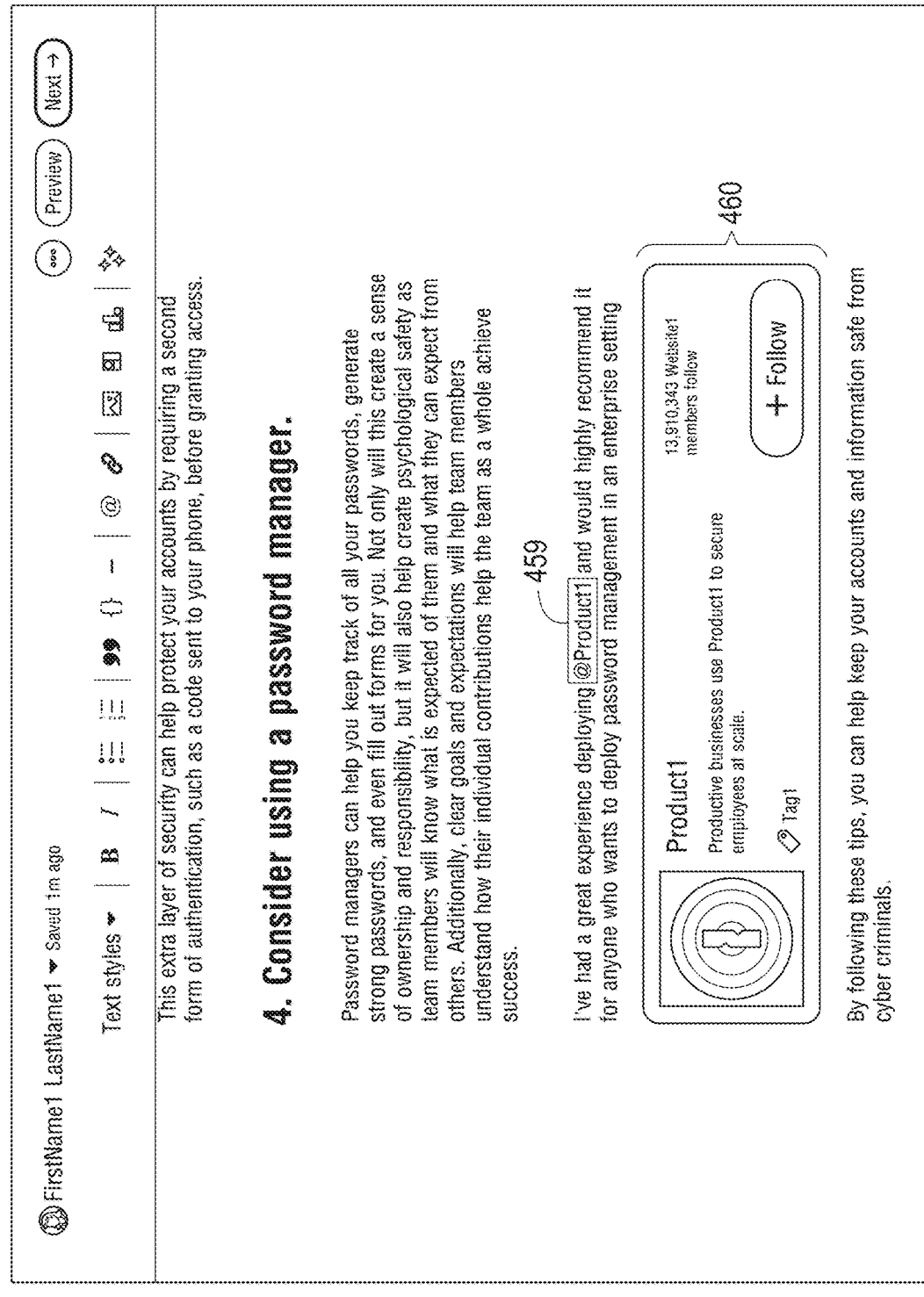

In FIG. 4I, user interface 459 presents the draft article with the link 460 added to the draft article. The embedded link 460 relates to the reference 459, which is embedded in the text of the draft article.

The examples shown in FIG. 4A, FIG. 4B, FIG. 4C, FIG. 4D, FIG. 4E, FIG. 4F, FIG. 4G, FIG. 4H, and FIG. 4I and the accompanying description, above, are provided for illustration purposes. For example, while the examples are illustrated as user interface screens for a computing device such as a laptop or monitor, the user interfaces can be configured for other forms of electronic devices, such as smart phones, tablet computers, and wearable devices. This disclosure is not limited to the described examples. Additional or alternative details and implementations are described herein.

FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 5L, FIG. 5M, FIG. 5N, FIG. 5O, FIG. 5P, FIG. 5Q, FIG. 5R, FIG. 5S, FIG. 5T, FIG. 5U, FIG. 5V, and FIG. 5W illustrate an example of at least one flow including screen captures of user interface screens configured to use feedback received in response to digital content created and posted based on at least one AI-generated thought starter to AI-generate at least one subsequent thought starter in accordance with some embodiments of the present disclosure.

In the user interfaces shown in FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 5L, FIG. 5M, FIG. 5N, FIG. 5O, FIG. 5P, FIG. 5Q, FIG. 5R, FIG. 5S, FIG. 5T, FIG. 5U, FIG. 5V, and FIG. 5W, certain data that normally would be displayed may be anonymized for the purpose of this disclosure. For instance, in a live example, the actual data and not the anonymized version would be displayed. For instance, in a live example, the text "JobTitle" would be replaced with an actual job title (e.g., software engineer) and "FirstName LastName" would be replaced with a user's actual name.

The user interfaces shown in FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 5L, FIG. 5M, FIG. 5N, FIG. 5O, FIG. 5P, FIG. 5Q, FIG. 5R, FIG. 5S, FIG. 5T, FIG. 5U, FIG. 5V, and FIG. 5W are presented by an application software system, such as a user network and/or content distribution system, to a user who wants to create a digital content item for distribution via a user network. In some implementations, the user interfaces are each implemented as a web page that is stored, e.g., at a server or in a cache of a user device, and then loaded into a display of a user device via the user device sending a page load request to the server. The icons and the selection and arrangement of elements shown in the user interfaces are copyright 2023 LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language audio received via a microphone embedded in a computing device.

In FIG. 5A, a summary of a hypothetical (not real) user, Arnold, is presented in screen 500. Screen 500 is not an actual capture of a screen that would be presented to a user during operation of the application software system, but rather is a screen that is generated for testing purposes. The screen 500 summarizes background and interests of the hypothetical user. In other words, the screen 500 shows examples of AI signals and/or input signals that can be used by the thought starter generation system to generate personalized prompts for generative models. For example, the screen 500 includes attribute data such as job title and other user profile data such as job responsibilities and industry. The screen 500 also includes activity data such as information about the hypothetical user's use of the application software system. The screen 500 includes an example of a topic, cybersecurity, which can be an AI signal derived based on the hypothetical user's recent content views, for example.

Figures 5C, 5D:
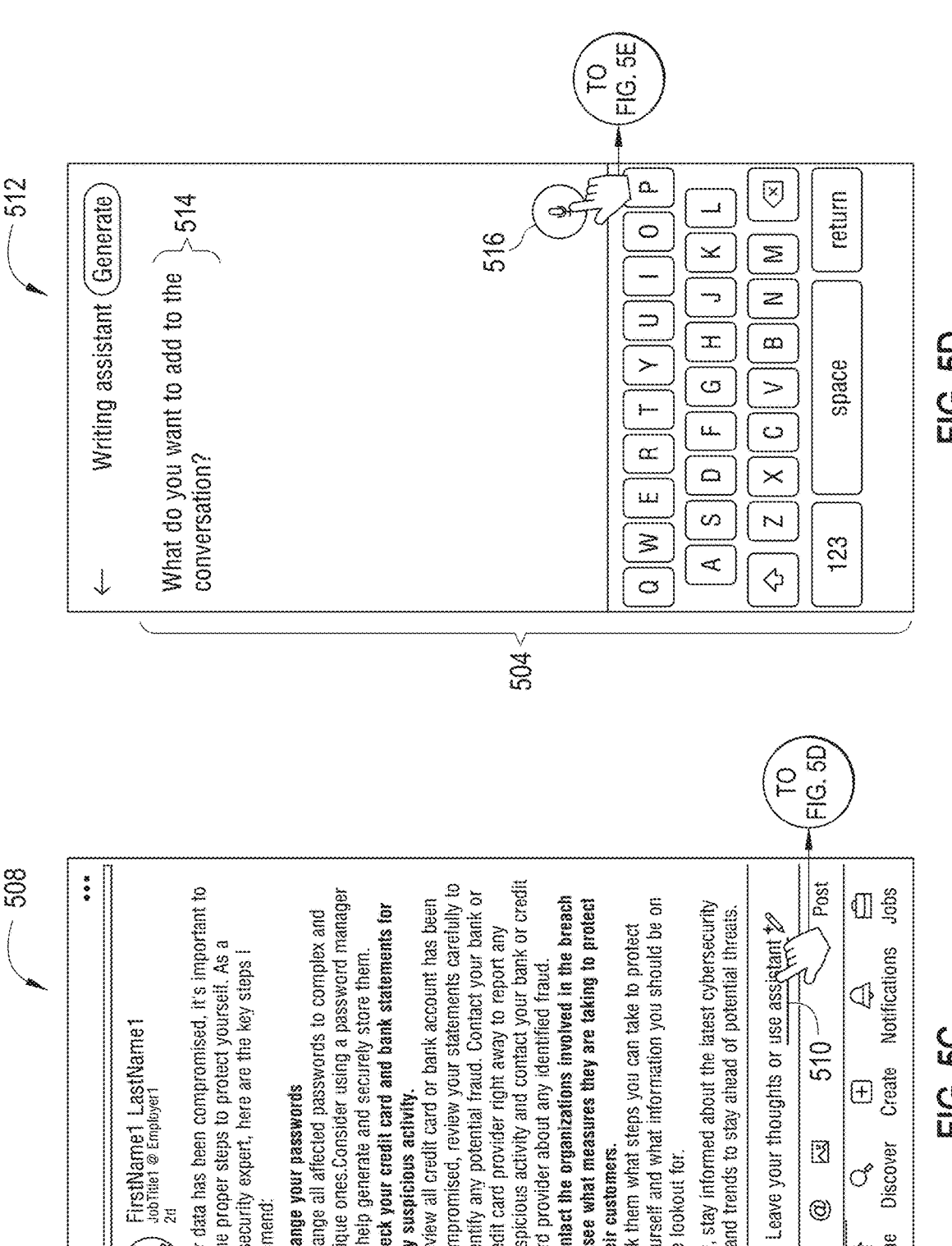

In FIG. 5B, user interface 502 shows an example of the hypothetical user's (Arnold's) news feed in an application software system. The news feed 504 includes a post 506. The post 506 is a post that the hypothetical user Jane created with the help of the writing assistant in the first user interface flow example starting with FIG. 3A, described herein. The post 506 is relevant to Arnold because Arnold has an interest in cybersecurity. Arnold would like to comment on the post 506. Selection of the comment mechanism causes a transition to user interface 508 of FIG. 5C.

In FIG. 5C, in response to selection of the comment mechanism, the thought starter generation system is invoked and a use assistant mechanism 510 is presented within the comment box of user interface 508. Selection of the use assistant mechanism 510 causes a transition to user interface 512 of FIG. 5D.

In FIG. 5D, in response to selection of use assistant mechanism 510, user interface 512 presents a request message 514, which requests user input using a question that is specific to the usage context (e.g., since Arnold wants to write a comment on another user's post, the message asks Arnold what to add to the conversation instead of asking Arnold what they would like to write about). User interface 512 includes input mechanisms such as a keypad and a microphone mechanism 516. Selection of the microphone mechanism 516 causes the application software system to receive voice input from the user and transcribe the user's voice input using a speech-to-text mechanism. Selection of the microphone mechanism 516 causes a transition to user interface 518 of FIG. 5E.

Figures 5E, 5F:
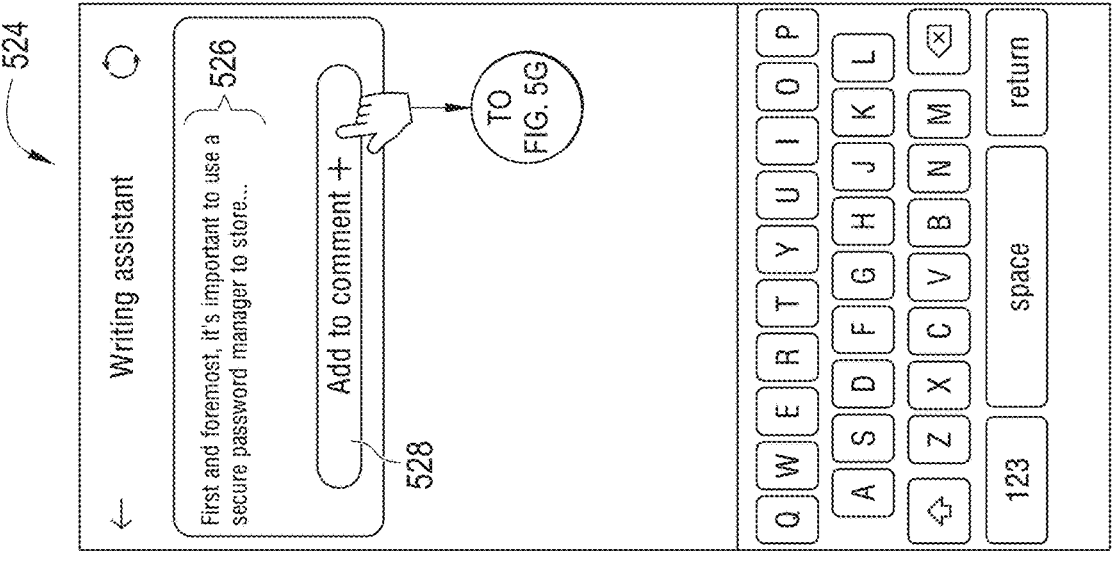

In FIG. 5E, user interface 518 presents the text transcription of the user's speech 520 and a generate mechanism 522. Selection of the generate mechanism 522 causes the thought starter generation system to formulate a prompt based on the text 520 as well as one or more of the AI signals and/or input signals related to Arnold, input the prompt to a generative model, and receive a thought starter output from the generative model based on the prompt. Selection of the generate mechanism 522 causes a transition to user interface 524 of FIG. 5F.

In FIG. 5F, user interface 524 presents the thought starter 526 output by the generative model based on the personalized prompt, and an add to comment mechanism 528. Selection of the add to comment mechanism 528 formulates the thought starter 526 into a distributable comment 532 that can be added to the post. Selection of the add to comment mechanism 528 causes a transition to user interface 530 of FIG. 5G.

Figures 5G, 5H:
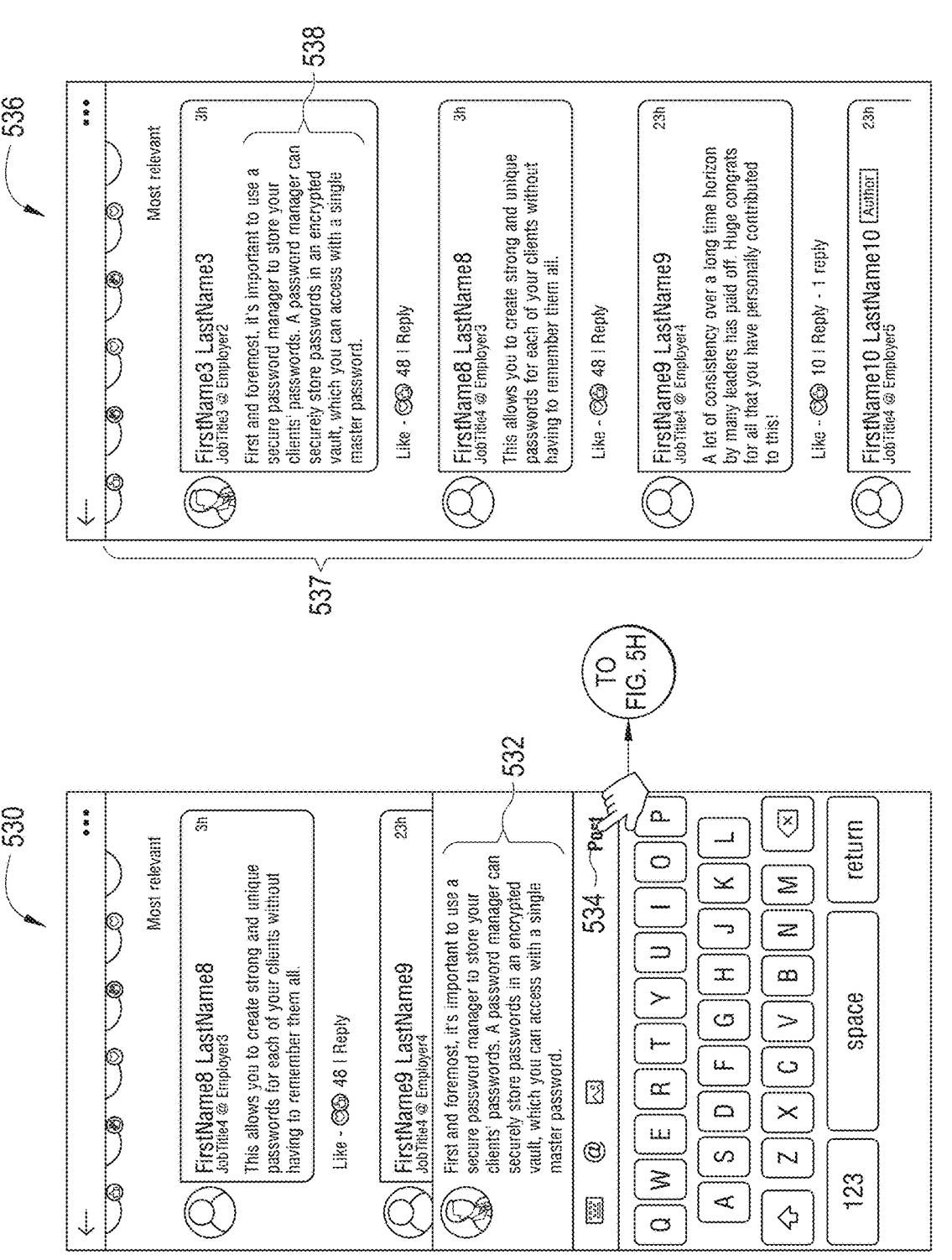

In FIG. 5G, user interface 530 formulates the thought starter 526 into a distributable comment 532 that can be added to Jane's post. Selection of the post mechanism 522 causes a transition to user interface 536 of FIG. 5H.

In FIG. 5H, user interface 536 shows that Arnold's comment 538 has been presented to the other users of the application software system among the set of comments 537 that are linked with Jane's post. User interface 536 shows that Arnold's comment 538 has received reactions from other users (e.g., 48 likes).

Figures 5I, 5J:
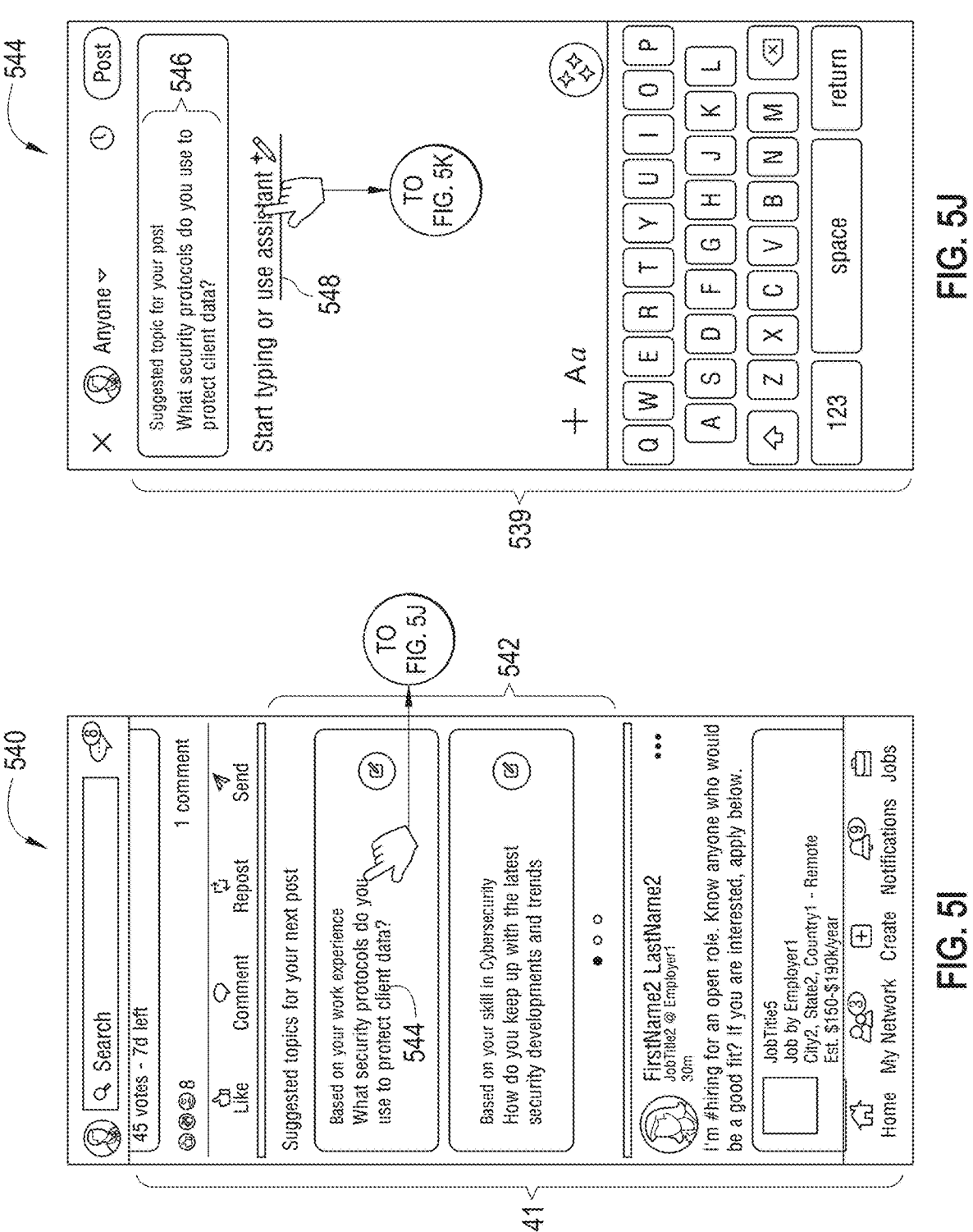

In FIG. 5I, user interface 540 shows an example of Arnold's feed 541 after Arnold's comment 538 was posted and interacted with by other users. The feed 541 includes a set of thought starters 542, including a thought starter 543, which include suggested topics for Arnold's next post. The thought starters 542 is based on Arnold's work experience and skills, as determined based on one or more AI signals and/or one or more real-time input signals, as well as Arnold's recent network activity history including the comment 538 and the other-user reactions to the comment 538. These signals, including the real-time signals relating to Arnold's online activity and the online activity of other users in his ecosystem, are used by the thought generation system to generate a new or modified personalized prompt, which is input to a generative model. The generative model generates and outputs the thought starter 543 based on the new or modified personalized prompt. Selection of the thought starter 543 causes a transition to user interface 544 of FIG. 5J.

In FIG. 5J, user interface 544 presents an input screen 537 in response to selection of the thought starter 543. The input screen 537 includes a display 546 of the thought starter 543, e.g., a suggested topic, and a message requesting user input. The message requesting user input includes a use assistant mechanism 548. Use assistant mechanism 548 operates similarly to use assistant mechanisms described elsewhere herein. Selection of the use assistant mechanism 548 causes a transition to user interface 550 of FIG. 5K.

Figure 5L:
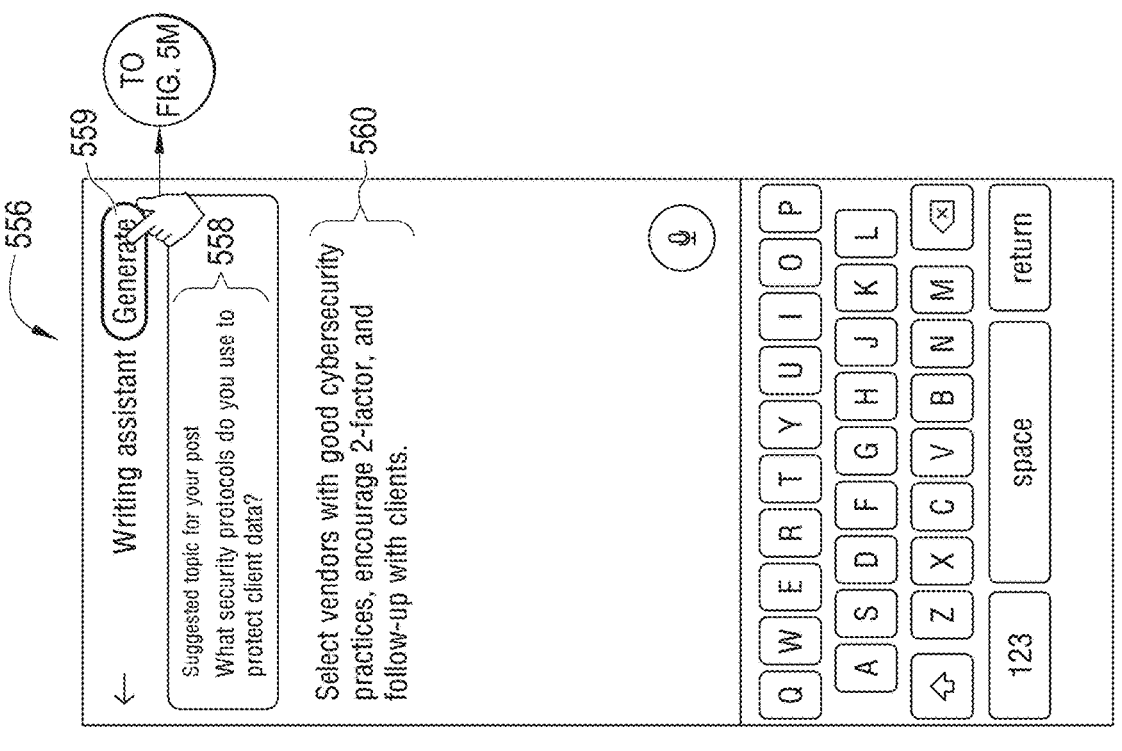
Figure 5K:
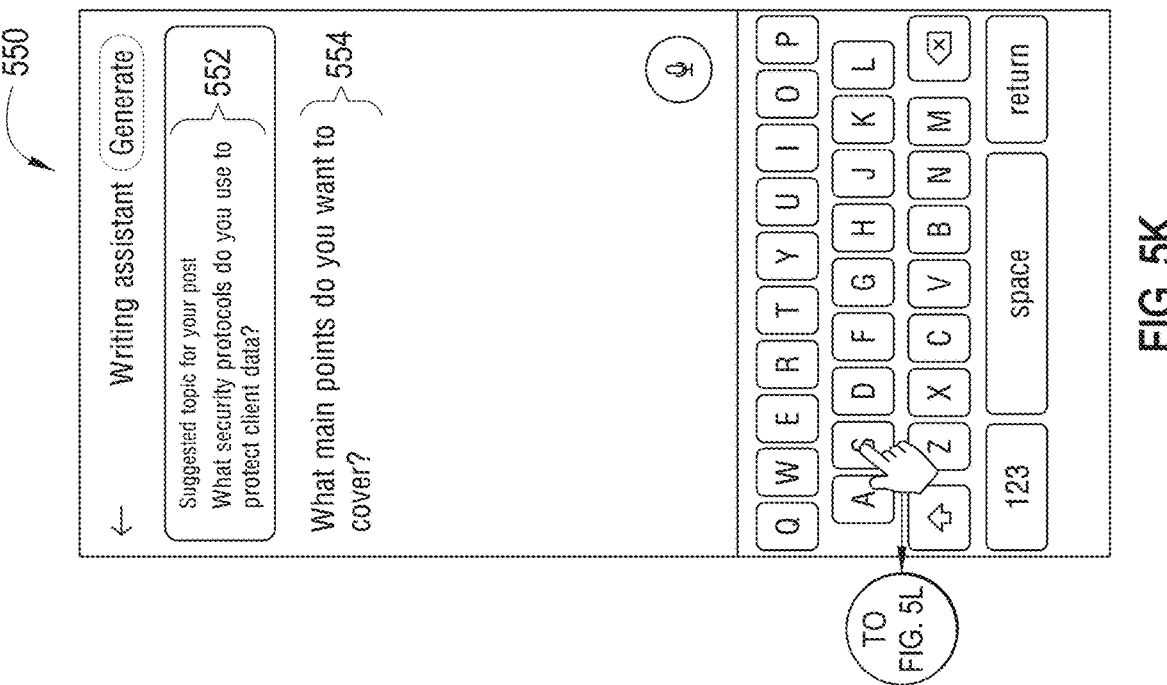

In FIG. 5K, user interface 550 includes a thought starter 552. The thought starter 552 is auto-generated by the thought starter generation system using the prompt generation and generative model technologies described herein, based on one or more of the thought starter 543, one or more input signals related to Arnold, and/or one or more AI signals related to Arnold. User interface 550 also includes a message requesting user input 554 configured to stimulate the user's thinking about what to include in the new post. In the example of FIG. 5K, the user responds to the message 554 by entering text via the keypad. The input of text via the keypad and tapping the return key causes a transition to user interface 556 of FIG. 5L.

In FIG. 5L, user interface 556 presents the thought starter 558 as well as the text entered by the user via the keypad, i.e., text 560. The user interface 556 also presents a generate mechanism 559. Selection of the generate mechanism 559 causes the thought starter generation system to formulate a personalized prompt based on the text 560 and potentially including other information such as the thought starter 558, AI signals, and/or input signals. The personalized prompt is input to a generative model and output based on the personalized prompt is received from the generative model. Selection of the generate mechanism 559 causes a transition to user interface 562 of FIG. 5M.

In FIG. 5M, user interface 562 presents output 564 produced by the generative model of the thought starter system in response to the personalized prompt. User interface 562 includes an insert mechanism 566. Selection of the insert mechanism 522 causes the application software system to formulate a draft post based on the generative model output 564. Selection of the insert mechanism 522 causes a transition to user interface 568 of FIG. 5N.

In FIG. 5N, user interface 568 presents the draft post formulated based on the generative model output 564 and a post mechanism 569. Selection of the post mechanism 569 causes a transition to user interface 570 of FIG. 5O.

In FIG. 5O user interface 570 presents a feed 574 that contains Arnold's new, AI-assisted post 572 including the generative model output 564.

In FIG. 5P, user interface 576 presents a view of an article provided by another software application other than the application software system. In the example of FIG. 5P, Arnold has opened the other application and viewed the article 578.

Figure 5R:
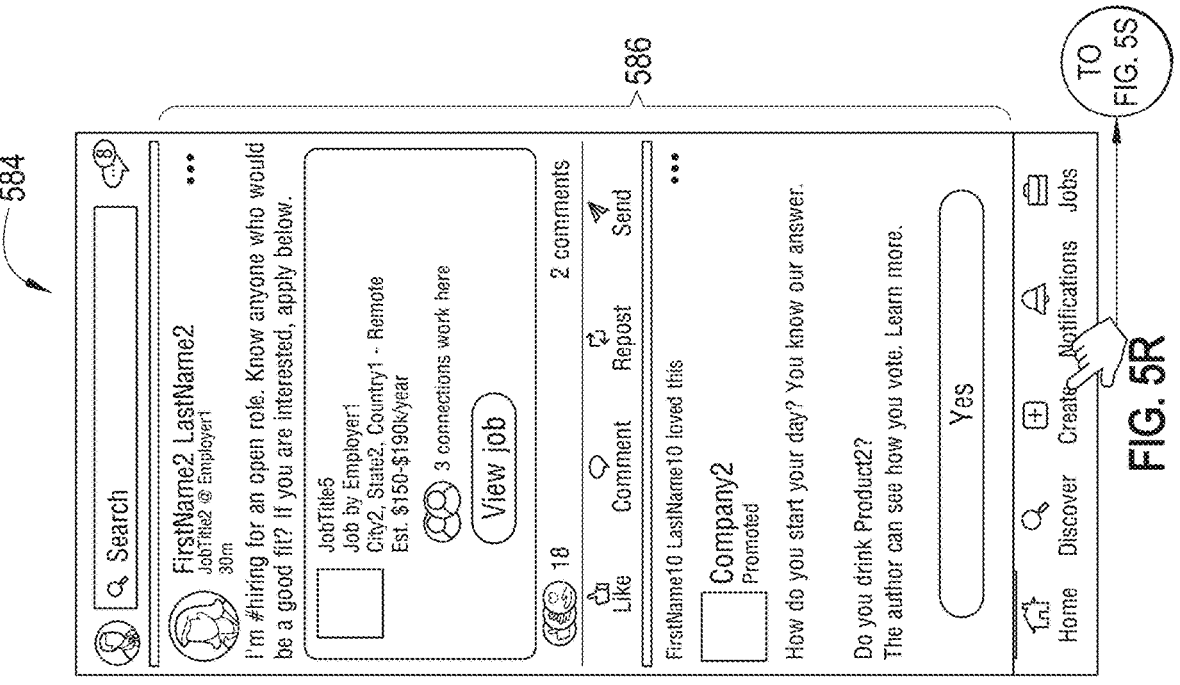
Figure 5Q:
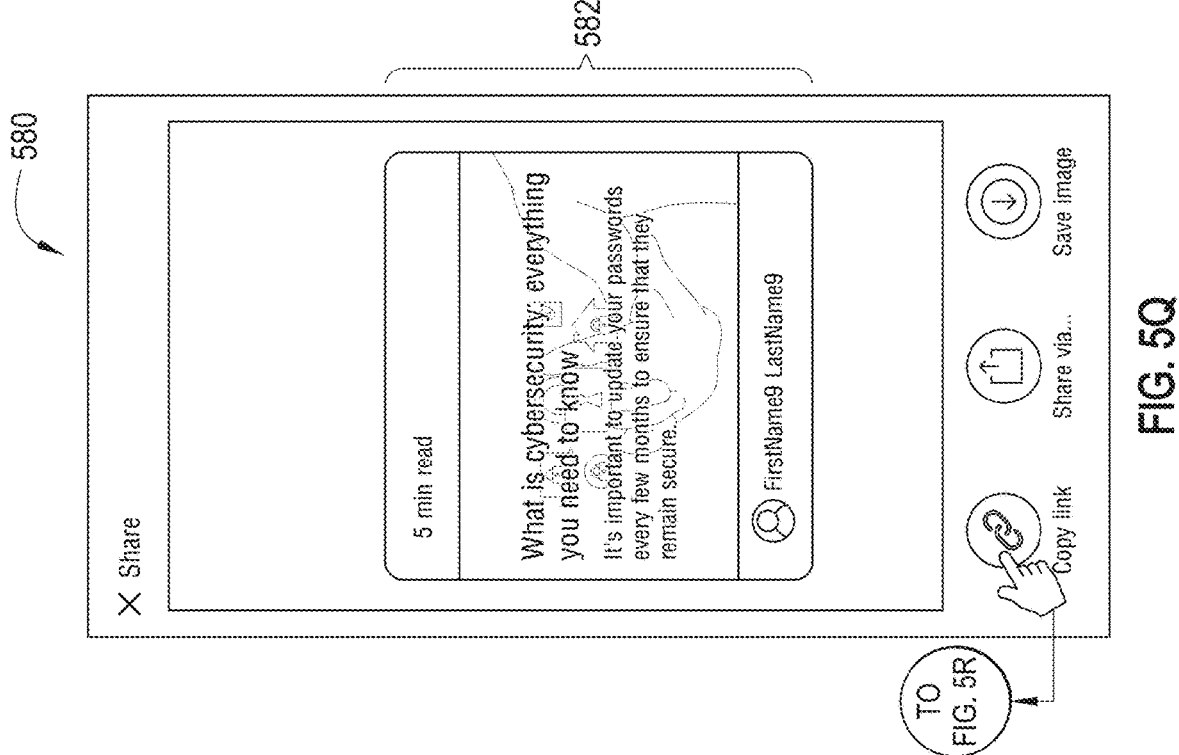

In FIG. 5Q, user interface 580 presents a share of the article 578 performed by Arnold in the other application. Selection of the copy link mechanism in the other application makes a copy of the URL (uniform resource locator) of the article 578. After selection of the copy link mechanism, a transition to user interface 584 of FIG. 5R occurs.

In FIG. 5R, user interface 584 presents a feed 586. While viewing the feed 586, Arnold selects the create mechanism to create a new post. Selection of the create mechanism causes a transition to user interface 588 of FIG. 5S.

In FIG. 5S, user interface 588 presents an input box and inserts the link that Arnold copied from the other application for the article 592 published by the other application. User interface 588 also includes an input request message 590 which is contextual in the sense that it contains a specific reference to "this article" as a result of the insertion of the article link. The message 590 includes a number of rotating mechanisms including a generate introduction mechanism 594 and an excited points mechanism 598 shown in the user interface 596 of FIG. 5T. In other words, the display of the request input message 590 can alternate between showing the generate introduction mechanism 594, the excited points mechanism 598, and potentially other mechanisms configured to cause the thought starter generation system to auto-generate a particular type of output, such as a generate compelling summary mechanism (not shown). The thought starter generation mechanism formulates a prompt for the generative model that includes an instruction or example that is based on whichever of the mechanisms 594 or 598 is selected. Selection of the generate introduction mechanism 522 causes a transition to user interface 5104 of FIG. 5V.

In FIG. 5U, user interface 5100 presents generative model output 5102 produced by the thought starter generation system in response to a prompt containing an instruction to the generative model to machine-generate and output a compelling summary. The output 5102 is based on the input provided in user interface 588, including the link from the other application. As shown in these and other examples, the thought starter generation system can assist the user with the creation of a compelling post while minimizing the need for the user to manually provide input. For instance, in this case, the user simply copied a link from another application, inserted the copied link into the post creation box, and selected a generate compelling summary mechanism, and the thought starter generation system auto-generated the content 5102.

In FIG. 5V, user interface 5104 presents generative model output 5106 produced by the thought starter generation system in response to a prompt containing an instruction to the generative model to machine-generate and output an introduction. e.g. in response to user selection of the generate introduction mechanism 522. The output 5106 is based on the input provided in user interface 588, including the link from the other application.

Figure 5W:
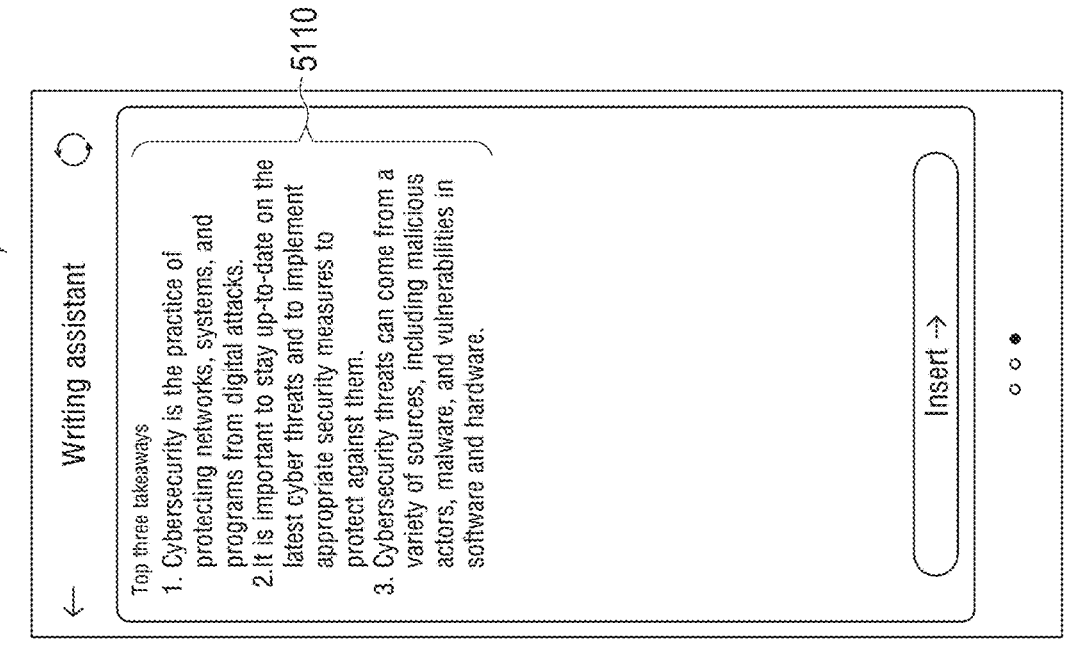

In FIG. 5W, user interface 5108 presents generative model output 5110 produced by the thought starter generation system in response to a prompt containing an instruction to the generative model to machine-generate and output top three takeaways, e.g. in response to user selection of a top three takeaways mechanism (not shown). The output 5110 is based on the input provided in user interface 588, including the link from the other application.

Taken together, the examples shown in FIG. 5U, FIG. 5V, and FIG. 5W illustrate how the thought starter generation system can configure multiple alternative prompts for a generative model to generate different types of output based on the same topic (here, cybersecurity) on the fly, in real time based on the user's specific content type selection. For instance, all three examples of generative model output 5102, 5106, and 5110 are generated by the generative model based on a prompt that included a seed of "cybersecurity." However, the output 5102 is generated based on a prompt that included an instruction or example for a compelling summary while the output 5106 is generated based on a prompt that included an instruction or example for an introduction and the output 5110 is generated based on a prompt that included an instruction or example for top three takeaways.

The examples shown in FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 5L, FIG. 5M, FIG. 5N, FIG. 5O. FIG. 5P, FIG. 5Q, FIG. 5R, FIG. 5S, FIG. 5T, FIG. 5U, FIG. 5V, and FIG. 5W and the accompanying description, above, are provided for illustration purposes. For example, while the examples are illustrated as user interface screens for a computing device such as a smart phone, the user interfaces can be configured for other forms of electronic devices, such as laptops, monitor, tablet computers, and wearable devices. This disclosure is not limited to the described examples. Additional or alternative details and implementations are described herein.

Figure 6:
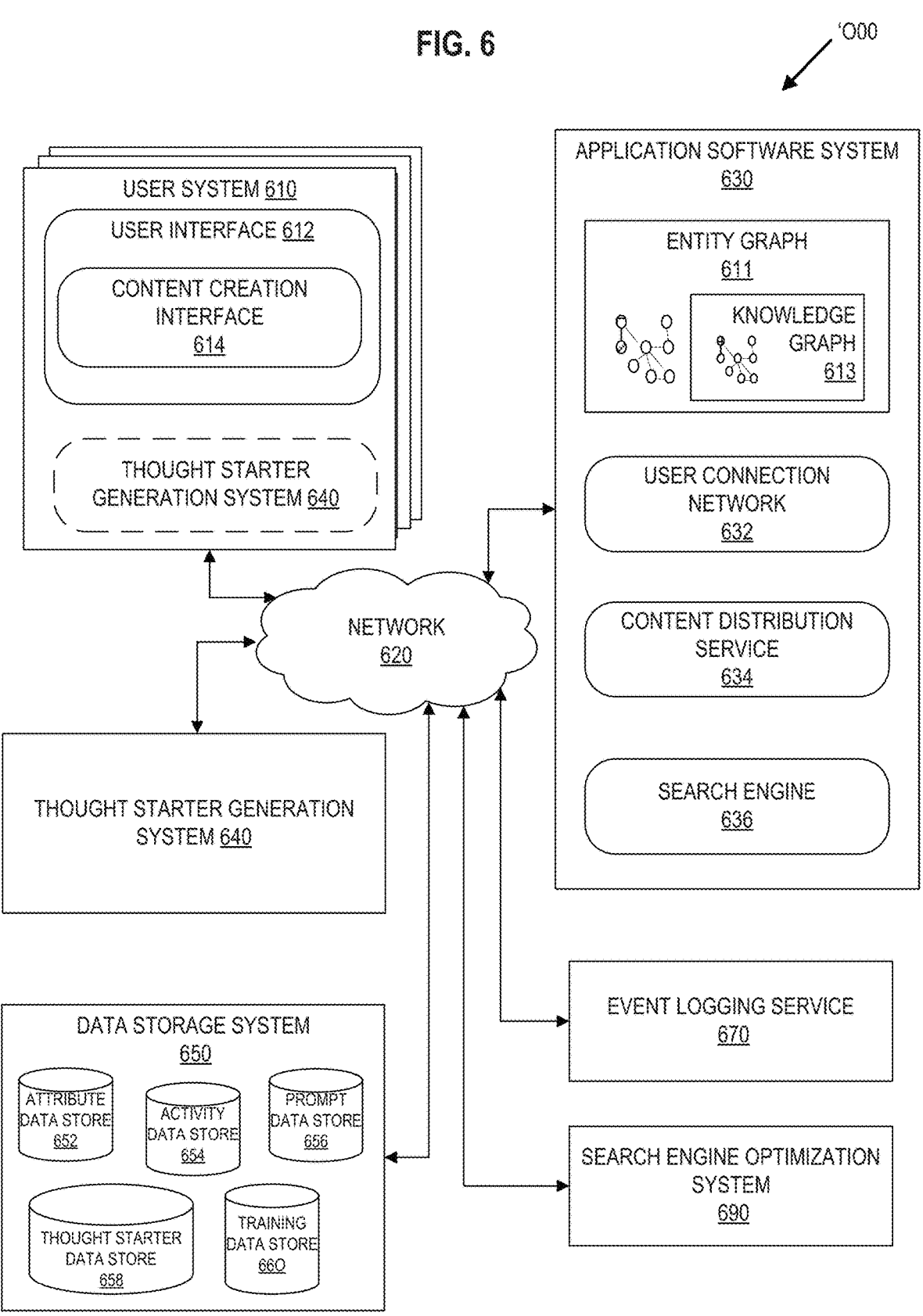
FIG. 6 is a block diagram of a computing system that includes a thought starter generation system in accordance with some embodiments of the present disclosure.

FIG. 6 is a block diagram of a computing system that includes a thought starter generation system in accordance with some embodiments of the present disclosure.

In the embodiment of FIG. 6, a computing system 600 includes one or more user systems 610, a network 620, an application software system 630, a thought starter generation system 640, a data storage system 650, an event logging service 670, and a search engine optimization system '090. Components of the computing system 600 including the thought starter generation system 640 are described in more detail below.

In FIG. 6, dashed lines are used to indicate that all or at least some components of thought starter generation system 640 are implemented at the user system 610, in some implementations. For example, both content creation interface 614 and thought starter generation system 640 are implemented directly upon a single client device such that communications between content creation interface 614 and thought starter generation system 640 occur on-device without the need to communicate with, e.g., one or more servers, over the Internet.

A user system 610 includes at least one computing device, such as a personal computing device, a server, a mobile computing device, or a smart appliance, and at least one software application that the at least one computing device is capable of executing, such as an operating system or a front end of an online system. Many different user systems 610 can be connected to network 620 at the same time or at different times. Different user systems 610 can contain similar components as described in connection with the illustrated user system 610. For example, many different end users of computing system 600 can be interacting with many different instances of application software system 630 through their respective user systems 610, at the same time or at different times.

User system 610 includes a user interface 612. User interface 612 is installed on or accessible to user system 610 by network 620. For example, embodiments of user interface 612 include a content creation interface 614. Content creation interface 614 includes, for example, a graphical display screen that includes at least one input box or other input mechanism and at least one slot. A slot as used herein refers to a space on a graphical display such as a web page or mobile device screen, into which digital content items such as articles and posts can be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system. Examples of user interface screens that can be included in content creation interface 614 are shown in the screen capture figures shown in the drawings and described herein.

User interface 612 can be used to input data, upload, download, receive, send, or share content items, including posts, articles, comments, and shares, to initiate user interface events, and to view or otherwise perceive output such as data and/or digital content produced by application software system 630, thought starter generation system 640, and/or content serving system 660. For example, user interface 612 can include a graphical user interface (GUI), a conversational voice/speech interface, a virtual reality, augmented reality, or mixed reality interface, and/or a haptic interface. User interface 612 includes a mechanism for logging in to application software system 630, clicking or tapping on GUI user input control elements, and interacting with content creation interface 614 and digital content items such as machine-generated thought starters. Examples of user interface 612 include web browsers, command line interfaces, and mobile app front ends. User interface 612 as used herein can include application programming interfaces (APIs).

In the example of FIG. 6, user interface 612 includes content creation interface 614. Content creation interface 614 includes a front end user interface component of thought starter generation system 640 or application software system 630. Content creation interface 614 is shown as a component of user interface 612 for ease of discussion, but access to content creation interface 614 can be limited to specific user systems 610. For example, in some implementations, access to content creation interface 614 is limited to registered users of thought starter generation system 640 or application software system 630 or users who have been designated as content creators by the thought starter generation system 640 or application software system 630.

Network 620 is an electronic communications network. Network 620 can be implemented on any medium or mechanism that provides for the exchange of digital data, signals, and/or instructions between the various components of computing system 600. Examples of network 620 include, without limitation, a Local Area Network (LAN), a Wide Area Network (WAN), an Ethernet network or the Internet, or at least one terrestrial, satellite or wireless link, or a combination of any number of different networks and/or communication links.

Application software system 630 is any type of application software system that provides or enables the creation, upload, and/or distribution of at least one form of digital content, including machine-generated content items, such as articles, posts, comments, and shares, between or among user systems, such as user system 610, through user interface 612. In some implementations, portions of thought starter generation system 640 are components of application software system 630. Examples of application software system 630 include a user connection network 632, a content distribution service 634, and a search engine 636. User connection network 632 includes, for instance, professional social network software and/or other social graph-based applications. Content distribution service 634 includes, for example, a content serving system, described herein. Search engine 636 includes a search engine that enables users of application software system 630 to input and execute search queries on user connection network 632. Application software system 630 can include online systems that do not provide social network services, general-purpose search engines, specific-purpose search engines, messaging systems, content distribution platforms, e-commerce software, enterprise software, or any combination of any of the foregoing or other types of software.

A front end portion of application software system 630 can operate in user system 610, for example as a plugin or widget in a graphical user interface of a web application, mobile software application, or as a web browser executing user interface 612. In an embodiment, a mobile app or a web browser of a user system 610 can transmit a network communication such as an HTTP request over network 620 in response to user input that is received through a user interface provided by the web application, mobile app, or web browser, such as user interface 612. A server running application software system 630 can receive the input from the web application, mobile app, or browser executing user interface 612, perform at least one operation using the input, and return output to the user interface 612 using a network communication such as an HTTP response, which the web application, mobile app, or browser receives and processes at the user system 610.

In the example of FIG. 6, application software system 630 includes an entity graph 631, e.g., a knowledge graph 613. As described in more detail with reference to FIG. 7, entity graph 631 and/or knowledge graph 613 can be used to compute various types of affinity scores, similarity measurements, and/or statistics between, among, or relating to entities. Entity graph 631, 612 is a graph-based representation of data stored in data storage system 660, described herein. For example, entity graph 631, 612 represents entities, such as users, organizations, and content items, such as posts, articles, comments, and shares, as nodes of a graph. Entity graph 631, 612 represents relationships, also referred to as mappings or links, between or among entities as edges, or combinations of edges, between the nodes of the graph. In some implementations, mappings between different pieces of data used by application software system 630 are represented by one or more entity graphs.

Portions of entity graph 631, 612 can be re-generated or updated from time to time based on changes and updates to the stored data. Also, entity graph 631, 612 can refer to an entire system-wide entity graph or to only a portion of a system-wide graph. For instance, entity graph 631, 612 can refer to a subset of a system-wide graph, where the subset pertains to a particular user or group of users of application software system 630, or to a particular content item or group of content items distributed by application software system 630. An example of an entity graph is shown in FIG. 7, described herein.

In some implementations, knowledge graph 613 is a subset or a superset of entity graph 631. For example, in some implementations, knowledge graph 613 includes multiple different entity graphs 610 that are joined by edges. For instance, knowledge graph 613 can join entity graphs 610 that have been created across multiple different databases or software products. In some implementations, the entity nodes of the knowledge graph 613 represent concepts, such as product surfaces, verticals, or application domains. In some implementations, knowledge graph 613 includes a platform that extracts and stores different concepts across multiple different software applications. Examples of concepts include topics, industries, and skills. The knowledge graph 613 can be used to generate and export content and entity-level embeddings that can be used to discover or infer new interrelationships between entities and/or concepts, which then can be used to identify related entities. As with other portions of entity graph 631, knowledge graph 613 can be used to compute various types of affinity scores, similarity measurements, and/or statistical correlations between or among entities and/or concepts.

Knowledge graph 613 is a graph-based representation of data stored in data storage system 650, described herein. Knowledge graph 613 represents relationships, also referred to as links or mappings, between entities or concepts as edges, or combinations of edges, between the nodes of the graph. In some implementations, mappings between different pieces of data used by application software system 630 or across multiple different application software systems are represented by the knowledge graph 613.

In the example of FIG. 6, application software system 630 includes a content distribution service 634. The content distribution service 634 includes a content serving system. The content serving system includes a data storage service, such as a web server, which stores digital content items, including content items based on thought starters generated by generative language models, and distributes the digital content items that have been created based on thought starters generated by generative models, to, for example, web sites and mobile apps or to particular slots of web sites or mobile app user interface display screens, using network 620. For instance, content serving system 660 scores and ranks digital content items, including content items based on AI-generated thought starters, for placement in user feeds.

In some embodiments, content serving system processes requests from, for example, application software system 630, and distributes digital content items, including content items created based on thought starters generated by generative models, to user systems 610 or other destinations, in response to requests. A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click or a page load. In some implementations, content serving system is part of application software system 630 or thought starter generation system 640. In other implementations, content serving system interfaces with content distribution service 634. For example, once the content distribution service 634 has distributed content item created based on a machine-generated thought starter to a network, e.g., a network of users of application software system 630, content serving system determines the target destinations and timing for delivery of the content item to various end user devices on the network.

In the example of FIG. 6, application software system 630 includes a search engine 636. Search engine 636 is a software system designed to search for and retrieve information by executing queries on data stores, such as databases, connection networks, and/or graphs. The queries are designed to find information that matches specified criteria, such as keywords and phrases. For example, search engine 636 is used to retrieve data by executing queries on various data stores of data storage system 650 or by traversing entity graph 631, 612.

The thought starter generation system 640 auto-generates user-specific and/or group-specific thought starters, using one or more generative models, based on input received via content creation interface 614 and other data sources. In some implementations, thought starter generation system 640 generates AI-derived signals based on raw input signals, including real-time signals, and formulates one or more user-specific prompts for a generative model (also referred to as a generative artificial intelligence (GAI) model or generative language model) based on a combination of one or more of the AI-derived signals and/or one or more of the raw input signals including real-time signals. The generative model outputs one or more thought starters based on the one or more prompts. The thought starter generation system 640 sends one or more of the machine-generated thought starters to content creation interface 614 for display to a prospective content creator user. Additional or alternative features and functionality of thought starter generation systems described herein are included in thought starter generation system 640 in various embodiments.

Event logging service 670 captures and records network activity data generated during operation of application software system 630, including user interface events generated at user systems 610 via user interface 612, in real time, and formulates the user interface events into a data stream that can be consumed by, for example, a stream processing system. Examples of network activity data include page loads, clicks on content items or graphical user interface control elements, creations, posts, and views of content items, contributions, posts, and social action data such as likes, shares, comments, and social reactions (e.g., "insightful," "curious," etc.). For instance, when a user of application software system 630 via a user system 610 clicks on a user interface element, such as a content item, a link, or a control such as a view, comment, share, or reaction button, or uploads a file, or creates an article or a post, loads a web page, or scrolls through a feed, etc., event logging service 670 fires an event to capture an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile.

For instance, when a user creates a content item based on a generative artificial intelligence (GAI)-generated thought starter, or inputs a social action on a post, event logging service 670 stores the corresponding event data in a log. Event logging service 670 generates a data stream that includes one record of real-time event data for each user interface event that has occurred. Event data logged by event logging service 670 can be used, for example, to generate affinity scores, similarity measurements, and/or to train artificial intelligence models.

Search engine optimization system 690 includes an online service that processes network traffic data relating to search engine results pages. Search engine optimization system 690 generates and publishes search optimization data, such as data about the frequency of use of various search terms over time. Search optimization data can be used, for example, to identify currently upwardly or downwardly trending topics and search terms. In some implementations, the thought starter generation system interfaces with search engine optimization system 690 in the process of generating prompts. For example, search engine optimization system 690 can be used as a filter for prompts. As an example, based on search optimization data produced by search engine optimization system 690 for a particular topic, the topic may or may not be used to formulate a prompt for the generative model to generate a thought starter. In some implementations, search optimization data produced by search engine optimization system 690 is included in a prompt to a generative model. For example, search engine optimization data can be included in a prompt as part of an instruction or as an example of the type of output the generative language model is to produce, such that, in effect, the generative model generates a thought starter that is based on or mimics the output of the search engine optimization system 690.

Data storage system 650 includes data stores and/or data services that store digital data received, used, manipulated, and produced by application software system 630 and/or thought starter generation system 640, including thought starters, content items, and other content, metadata, prompts, attribute data, network activity data, machine learning model training data, machine learning model parameters, and machine learning model inputs and outputs.

In the example of FIG. 6, data storage system 650 includes an attribute data store 652, an activity data store 654, a prompt data store 656, a thought starter data store 656, and a training data store 660. Attribute data store 652 stores data relating to users, and other entities, such as profile data, which is used by the thought starter generation system to, for example, generate AI signals, prompts, and/or thought starters, and compute statistics, similarity measurements, and affinity scores. Activity data store 654 stores data relating to network activity, e.g., user interface event data extracted from application software system 630 by event logging service 670, which is used by the thought starter generation system 640 to, for example, generate AI signals, prompts, and/or thought starters and compute statistics, similarity measurements, and affinity scores.

Prompt data store 656 stores prompt templates and related metadata, which are generated and used be the thought starter generation system 640 to generate thought starters using a generative model. Thought starter data store 658 stores thought starters generated by generative models, related metadata, and related data, such as human-edited versions of machine-generated thought starters. Training data store 660 stores data generated by the thought starter generation system 640 that can be used to train or fine tune generative models and/or other AI models, such as pre-distribution feedback data and/or post-distribution feedback data.

In some embodiments, data storage system 650 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 650 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 650 resides on at least one persistent and/or volatile storage device that can reside within the same local network as at least one other device of computing system 600 and/or in a network that is remote relative to at least one other device of computing system 600. Thus, although depicted as being included in computing system 600, portions of data storage system 650 can be part of computing system 600 or accessed by computing system 600 over a network, such as network 620.

While not specifically shown, it should be understood that any of user system 610, application software system 630, thought starter generation system 640, data storage system 650, event logging service 670, and search engine optimization system 690 includes an interface embodied as computer programming code stored in computer memory that when executed causes a computing device to enable bidirectional communication with any other user system 610, application software system 630, thought starter generation system 640, data storage system 650, event logging service 670, or search engine optimization system 690 using a communicative coupling mechanism. Examples of communicative coupling mechanisms include network interfaces, inter-process communication (IPC) interfaces and application program interfaces (APIs).

Each of user system 610, application software system 630, thought starter generation system 640, data storage system 650, event logging service 670, and search engine optimization system 690 is implemented using at least one computing device that is communicatively coupled to electronic communications network 620. Any of user system 610, application software system 630, thought starter generation system 640, data storage system 650, event logging service 670, and search engine optimization system 690 can be bidirectionally communicatively coupled by network 620. User system 610 as well as other different user systems (not shown) can be bidirectionally communicatively coupled to application software system 630 and/or thought starter generation system 640.

A typical user of user system 610 can be an administrator or end user of application software system 630 or thought starter generation system 640. User system 610 is configured to communicate bidirectionally with any of application software system 630, thought starter generation system 640, data storage system 650, event logging service 670, and search engine optimization system 690 over network 620.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 610, application software system 630, thought starter generation system 640, data storage system 650, event logging service 670, and search engine optimization system 690 are implemented using computer software, hardware, or software and hardware, and can include combinations of automated functionality, data structures, and digital data, which are represented schematically in the figures. User system 610, application software system 630, thought starter generation system 640, data storage system 650, event logging service 670, and search engine optimization system 690 are shown as separate elements in FIG. 6 for ease of discussion but, except as otherwise described, the illustration is not meant to imply that separation of these elements is required. The illustrated systems, services, and data stores (or their functionality) of each of user system 610, application software system 630, thought starter generation system 640, data storage system 650, event logging service 670, and search engine optimization system 690 can be divided over any number of physical systems, including a single physical computer system, and can communicate with each other in any appropriate manner.

Figure 14:
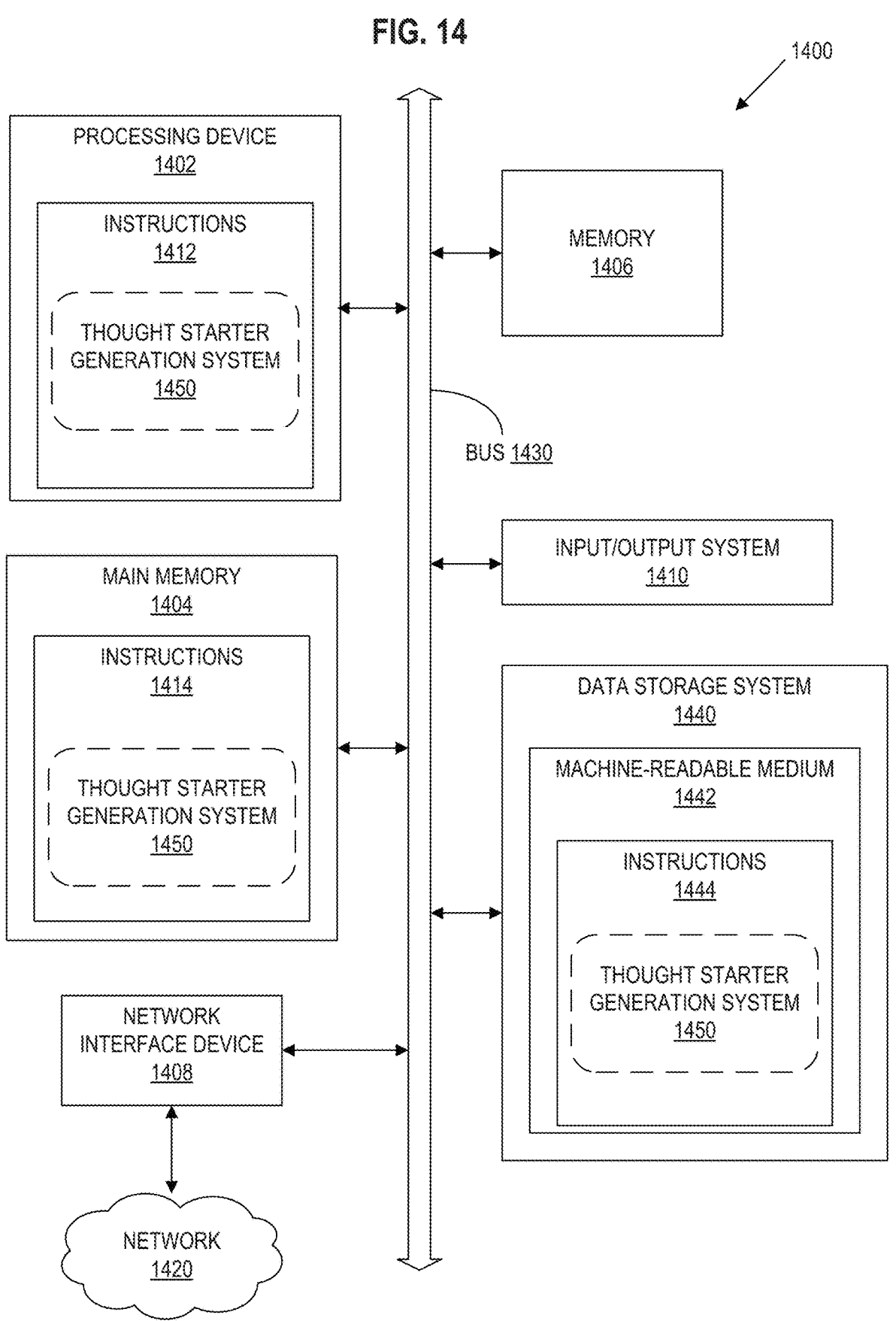
FIG. 14 is a block diagram of an example computer system including components of a thought starter generation system in accordance with some embodiments of the present disclosure.

In FIG. 14, the combination of content creation interface 614 and thought starter generation system 640 is collectively represented as thought starter generation system 1450 for case of discussion only. Content creation interface 614 and thought starter generation system 640 are not required to be implemented all on the same computing device, in the same memory, or loaded into the same memory at the same time. For example, access to either or both of content creation interface 614 and thought starter generation system 640 can be limited to different, mutually exclusive sets of user systems. Additionally, while content creation interface 614 typically may be implemented on user systems, thought starter generation system 640 typically may be implemented on a server computer or group of servers. Further details with regard to the operations of thought starter generation system 1450 are described herein.

FIG. 7 is an example of an entity graph in accordance with some embodiments of the present disclosure. The entity graph 700 can be used by an application software system, e.g., to support a user connection network, in accordance with some embodiments of the present disclosure. The entity graph 700 can be used (e.g., queried or traversed) to obtain or generate input signals and/or AI signals, including real-time signals, which are used to formulate a prompt for a generative model.

An entity graph includes nodes, edges, and data (such as labels, weights, or scores) associated with nodes and/or edges. Nodes can be weighted based on, for example, edge counts or other types of computations, and edges can be weighted based on, for example, affinities or commonalities between the nodes connected by the edges, such as common attribute values (e.g., two users have the same job title or employer, or two users are n-degree connections in a user connection network).

A graphing mechanism is used to create, update and maintain the entity graph. In some implementations, the graphing mechanism is a component of the database architecture used to implement the entity graph 700. For instance, the graphing mechanism can be a component of data storage system 650 and/or application software system 630, shown in FIG. 6, and the entity graphs created by the graphing mechanism can be stored in one or more of the data stores of data storage system 650.

The entity graph 700 is dynamic (e.g., continuously updated) in that it is updated in response to occurrences of interactions between entities in an online system (e.g., a user connection network) and/or computations of new relationships between nodes of the graph. These updates are accomplished by real-time data ingestion and storage technologies, or by offline data extraction, computation, and storage technologies, or a combination of real-time and offline technologies. For example, the entity graph 700 is updated in response to user updates of user profiles, user views of content items, user connections with other users, and user creations of new content items, such as posts, articles, comments, and shares. As another example, the entity graph 700 is updated as new computations are computed, for example, as new relationships between nodes are inferred based on statistical correlations, machine learning-based classifier output, or graph neural network output.

The entity graph 700 includes a knowledge graph that contains cross-application links. For example, search engine optimization data obtained from a search engine can be linked with content items and/or other entities of the entity graph.

In the example of FIG. 7, entity graph 700 includes entity nodes, which represent entities, such as content item nodes (e.g., Post U21, Article 1), user nodes (e.g., User 1, User 2, User 3, User 4), and job nodes (e.g., Job 1). Entity graph 700 also includes attribute nodes, which represent attributes (e.g., profile data, topic data) of entities. Examples of attribute nodes include title nodes (e.g., Title U1, Title A1), company nodes (e.g., Company 1), topic nodes (Topic 1, Topic 2), and skill nodes (e.g., Skill A1, Skill U11, Skill U31, Skill U41).

Entity graph 700 also includes edges. The edges individually and/or collectively represent various different types of relationships between or among the nodes. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 700, edges between user nodes can represent online social connections between the users represented by the nodes, such as 'friend' or 'follower' connections between the connected nodes. As an example, in the entity graph 700, User 3 is a first-degree connection of User 1 by virtue of the CONNECTED edge between the User 3 node and the User 1 node, while User 2 is a second-degree connection of User 3, although User 1 has a different type of connection, FOLLOWS, with User 2 than with User 3.

Match or matching as used herein may refer to an exact match or an approximate match, e.g., a match based on a computation of similarity between two pieces of data. An example of a similarity computation is cosine similarity. Other approaches that can be used to determine similarity between or among pieces of data include clustering algorithms (e.g., k means clustering), binary classifiers trained to determine whether two items in a pair are similar or not similar, and neural network-based vectorization techniques such as WORD2VEC. In some implementations, generative language models are used to determine similarity of pieces of data. For example, a prompt is formulated that instructs a generative model to find a topic related to a particular content item, and the generative model returns a set of one or more topics based on the input content item.

In the entity graph 700, edges can represent activities involving the entities represented by the nodes connected by the edges. For example, a POSTED edge between the User 2 node and the Post U21 node indicates that the user represented by the User 2 node posted the digital content item represented by the PostU21 node to the application software system (e.g., as an article posted to a user connection network). As another example, a SHARED edge between the User 1 node and the Post U21 node indicates that the user represented by the User 1 node shared the content item represented by the Post U21 node. Similarly the CLICKED edge between the User 3 node and the Article 1 node indicates that the user represented by the User 3 node clicked on the article represented by the Article 1 node, and the LIKED edge between the User 3 node and the Comment U1 node indicates that the user represented by the User 3 node liked the content item represented by the Comment U1 node.

In some implementations, combinations of nodes and edges are used to compute various scores, and those scores are used by various components of the thought starter generation system 640 to, for example, generate prompts, generate thought starters, and rank feedback. For example, a score that measures the affinity of the user represented by the User 1 node to the topic represented by the Topic 1 node can be computed using a path p1 that includes a sequence of edges between the nodes User 1, Post U21, and Topic 2 and/or a path p2 that includes a sequence of edges between the nodes User 1, Comment U1, and Topic 2 and/or a path p3 that includes a sequence of edges between the nodes User 1, User 2, Post U21, Topic 2, and/or a path p4 that includes a sequence of edges between the nodes User 1, User 3, Comment U1, Topic 2. Any one or more of the paths p1, p2, p3, p4 and/or other paths through the graph 700 can be used to compute scores that represent affinities, relationships, or statistical correlations between different nodes. For instance, based on relative edge counts, a user-topic affinity score computed between User U1 and Topic 2 might be higher than the user-topic affinity score computed between User U4 and Topic 2.

The examples shown in FIG. 7 and the accompanying description, above are provided for illustration purposes. This disclosure is not limited to the described examples.

Figure 8:
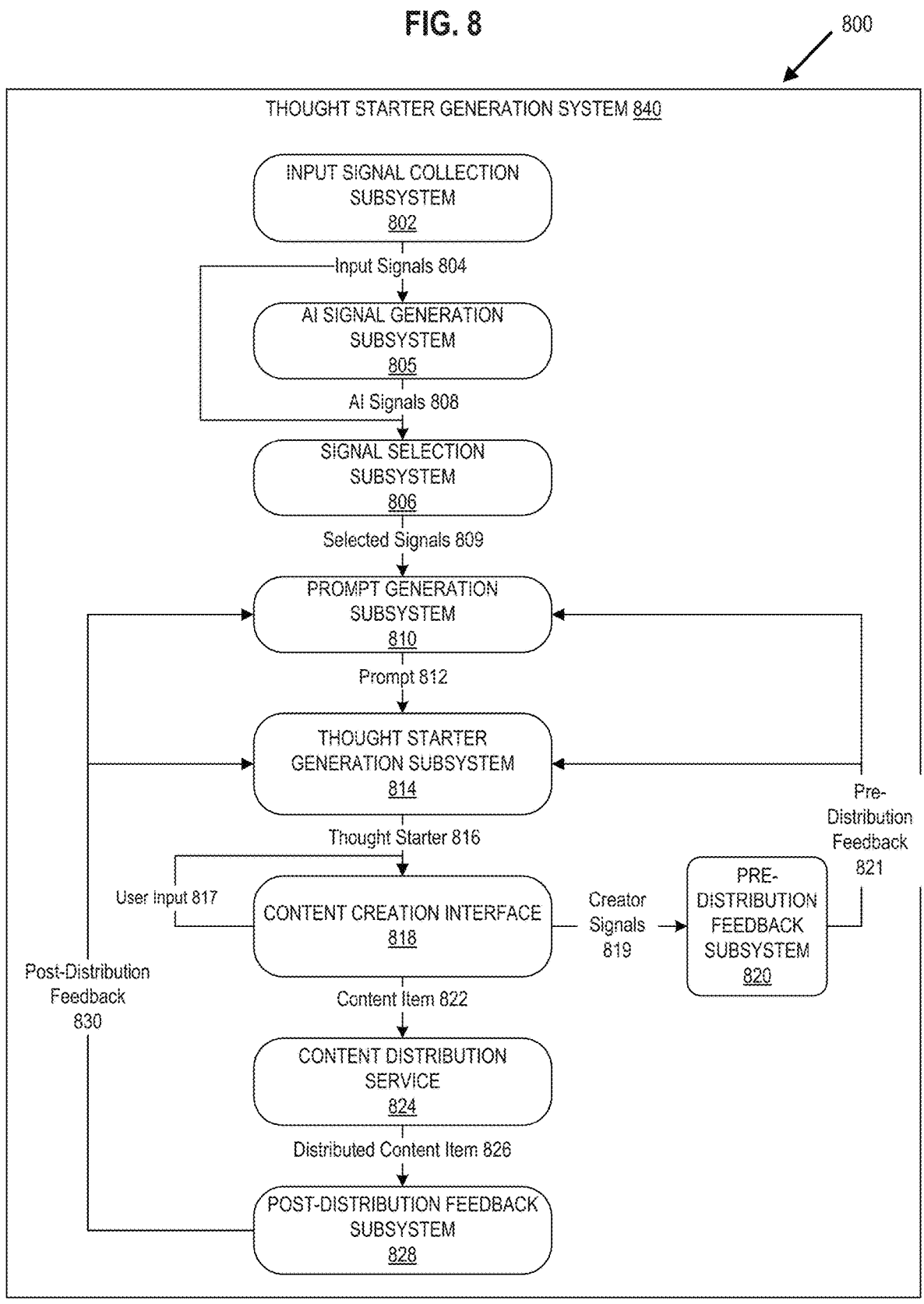
FIG. 8 is a flow diagram of an example method for automated thought starter generation using components of a thought starter generation system in accordance with some embodiments of the present disclosure.

FIG. 8 is a flow diagram of an example method for automated thought starter generation using components of a thought starter generation system in accordance with some embodiments of the present disclosure.

The method 800 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by components of thought starter generation system 100 of FIG. 1 or thought starter generation system 640 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 8, thought starter generation system 840 includes an input signal collection subsystem 802, an AI signal generation subsystem 805, a signal selection subsystem 806, a prompt generation subsystem 810, a thought starter generation subsystem 814, a content creation interface 818, a pre-distribution feedback subsystem 820, a content distribution service 824, and a post-distribution feedback subsystem 828. Other implementations of thought starter generation system 840 include some or all of the components shown in FIG. 8 and/or other components.

Input signal collection subsystem 802 includes one or more computer programs or routines that collect input signals related to a particular prospective content creator user of an application software system or user network. Examples of input signals are described herein, for example with reference to FIG. 1 and FIG. 2. To collect input signals, input signal collection subsystem 802 executes queries on one or more databases or data stores, including real-time data stores and/or interfaces with a stream processing or event logging services such as logging service 670 to obtain real-time signals. Input signal collection subsystem 802 outputs input signals 804 for use by AI signal generation subsystem 805 and/or signal selection subsystem 806.

AI signal generation subsystem 805 includes one or more computer programs or routines that generate AI signals related to a particular prospective content creator user of an application software system or user network. Examples of AI signals are described herein, for example with reference to FIG. 1 and FIG. 2. To generate AI signals, Ai signal generation subsystem 805 applies one or more AI models of an intermediary layer of AI models to input signals 804, for example as described with reference to FIG. 1 and FIG. 2. Ai signal generation subsystem 805 outputs AI signals 808 for use by signal selection subsystem 806.

Signal selection subsystem 806 includes one or more computer programs or routines that select from among input signals 804 and/or AI signals 806 and output selected signals 806. In some instances, signal selection subsystem 806 applies one or more weighting schemes and/or ranking algorithms to various combinations of input signals 804 and/or AI signals 806 and selects the top weighted or top ranked signals or combinations of signals. Signal selection subsystem 806 outputs selected signals 809, for example as described with reference to FIG. 1 and FIG. 2.

Prompt generation subsystem 810 includes one or more computer programs or routines that generate and output one or more prompts for one or more generative models, such as prompt 812, based on selected signals 809, e.g., combinations of raw input signals and/or AI signals. In some instances, the prompts 812 are personalized for specific prospective content creator users or groups of users. In some implementations, the execution of prompt generation subsystem 810 is initiated by an API call from thought starter generation system 640 or application software system 630. The process of auto-generating a prompt for a generative model includes prompt generation subsystem 810 applying a prompt template to the selected signals 809, in some instances. Prompt generation subsystem 810 outputs the prompt 812.

Thought starter generation subsystem 814 includes one or more computer programs or routines that obtain one or more prompts 812 produced by prompt generation subsystem 810 and apply one or more generative models to each prompt 812. Examples of generative models are described herein. In some implementations, the execution of thought starter generation subsystem 814 is initiated by an API call from thought starter generation system 640 or application software system 630. In response to input of prompt 812 into a generative model, the generative model of thought starter generation subsystem 814 produces and outputs one or more thought starters 816, which are based on the prompt 812. A thought starter 816 includes, for example, a piece of content, e.g., a question, an outline, or a summary that a prospective content creator user can use to create a content item such as a post, an article, a comment, a share. The thought starter 816 can include one or multiple different forms of content, for example text, audio, video, a combination of text and an image or video, etc.

Thought starter generation subsystem 814 outputs thought starter 816 to content creation interface 818. Content creation interface 818 presents the thought starter 816 to the prospective content creator user. In response to the thought starter 816, content creation interface 816 can receive user input 817 and use user input 817 to generate a new or modified version of the thought starter 816. Examples of user input 817 include text, audio, video, a combination of text and an image or video, etc. Content creation interface 818 can receive creator signals 819 and forward creator signals 819 to pre-distribution feedback subsystem 820. Examples of creator signals 819 include user interactions with thought starters 819, for example, selections of thought starters, requests to regenerate thought starters, and edits to thought starters. After one or more iterations of user interaction with thought starters, content creation interface 818 outputs a content item 822. Examples of content items 822 include articles, comments, posts, and shares.

In some implementations, prompt-content pairs, such as a prompt 812 and a corresponding machine-generated thought starter 816 generated by the generative model of thought starter generation subsystem 814 based on the prompt 812, are returned to either or both of prompt generation subsystem 810 and thought starter generation subsystem 814 as pre-distribution feedback 820. For example, prompt generation subsystem 810 uses prompt 812—thought starter 816 pairs to score and select prompt templates for future prompts. As another example, thought starter generation subsystem 814 formulates training data based on generated prompt 812—thought starter 816 pairs and uses the training data to train or fine tune the generative model of thought starter generation subsystem 814 or a generative model used by prompt generation subsystem 810 (which may be the same as the generative model used by thought starter generation subsystem 814 or one or more different generative models).

Pre-distribution feedback subsystem 820 includes one or more computer programs or routines that obtain creator signals 819 related to a thought starter 816 produced by thought starter generation subsystem 814 and formulate pre-distribution feedback 821, for example by mapping creator signals 819 to corresponding prompt-content pairs and retuning the creator signals 819 to thought starter generation subsystem 814 and/or prompt generation subsystem 810 along with the corresponding prompt-content pairs.

Content distribution service 824 includes one or more computer programs or routines that formulate a distributable version of the content item 822 created based on a thought starter 816, e.g., a post, an article, a comment, or a share, and causes the distributable item to be distributed to a network, such as a user connection network, for example. In some implementations, the execution of content distribution service 824 is initiated by an API call from thought starter generation system 840 or application software system 630. Distributing a distributable content item as described herein includes distributing a content item to one or more user accounts of an online system such as application software system 630, over a network. In some implementations, content distribution service 824 includes or interfaces with a content serving system. For example, content distribution service 824 identifies content items to a content serving system and the content serving system serves the content items to various user accounts on a user connection network via, for example, assignments of the content items to slots of user feeds.

Post-distribution feedback subsystem 828 includes one or more computer programs or routines that receive and track post-distribution feedback 830 relating to distributed content item 826. Examples of post-distribution feedback 830 include social action data linked with distributed content item 826, including views, likes, comments, and shares by other users of the application software system as well as subsequent user activity data of the content creator user. In some implementations, the execution of post-distribution feedback subsystem 828 is initiated by an API call from thought starter generation system 640 or application software system 630.

In some implementations, post-distribution feedback subsystem 828 returns post-distribution feedback 830 to one or more of thought starter generation subsystem 814 or prompt generation subsystem 810. For example, post-distribution feedback 830 is used by prompt generation subsystem 810 to create a new prompt, modify a prompt, select a subsequent prompt template or to modify an existing prompt template.

As another example, post-distribution feedback 830 is joined with the prompt 812 used to generate the machine-generated content of the distributed content item 826 to create training data for the generative language model of thought starter generation subsystem 814, and the generative language model is trained or fine-tuned using the training data. As an additional example, post-distribution feedback 830 includes social action data that is used to train one or more scoring models and/or classification models of, e.g., a filtering mechanism of pre-distribution feedback subsystem 818.

The examples shown in FIG. 8 and the accompanying description, above are provided for illustration purposes. This disclosure is not limited to the described examples.

Figure 9:
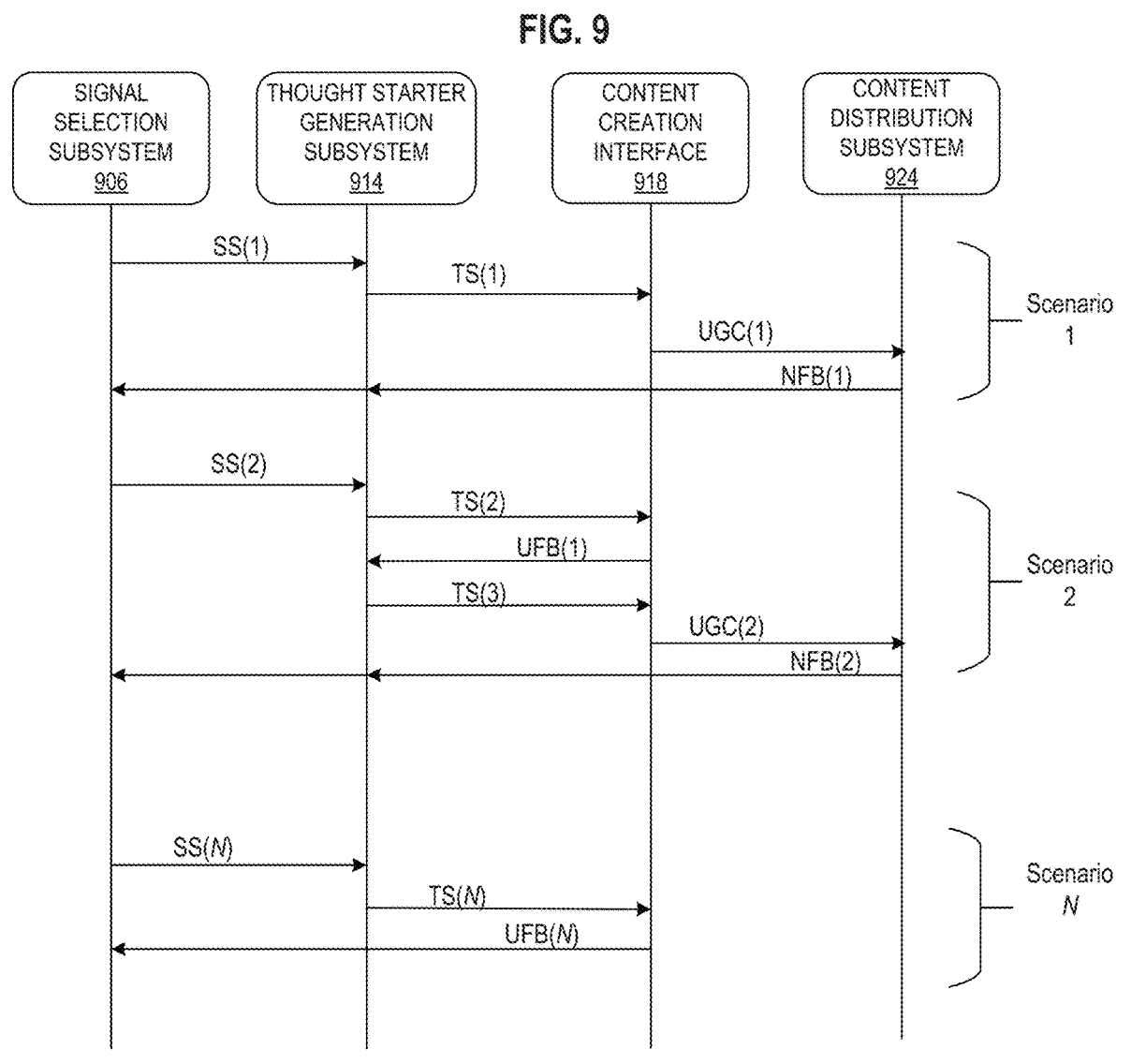

FIG. 9 is a timing diagram showing examples of scenarios in which feedback is incorporated into an automated thought starter generation system in accordance with some embodiments of the present disclosure. The communications between components shown in FIG. 9 include, for example, network communications and/or on-device communications. For example, all or portions of the signal selection subsystem 906, thought starter generation system 914, content creation interface4 918, and content distribution subsystem 924 can be implemented on a single device or across multiple devices.

In a first scenario, post-distribution feedback is received from a user network and returned to the thought starter generation system. In Scenario 1, signal selection subsystem 906 generates and sends or passes a first set of selected signals SS(1) to thought starter generation subsystem 914. Thought starter generation subsystem 914 generates and sends or passes a first set of thought starters TS(1) to content creation interface 918. Content creation interface 918 generates and passes or sends a first set of user-generated content UGC(1), created based on one or more of the thought starters TS(1), to content distribution subsystem 924. Content distribution subsystem 924 receives network feedback NFB(1), e.g., social reactions to the distribution of the UGC(1) on a user network, and passes or sends the NFB(1) to signal selection subsystem 908 and/or thought starter generation subsystem 914. In response to the feedback NFB(1), signal selection subsystem 906 can modify, filter, or re-weight the selected signals, e.g., the AI signals and/or input signals used by thought starter generation subsystem to generate thought starters, and/or thought starter generation system 914 can modify prompts or prompt templates or create or select new prompts or prompt templates or fine tune one or more generative models e.g., by adjusting one or more model parameters, such as model hyperparameters.

In a second scenario, both pre-distribution feedback and post-distribution feedback are returned to the thought starter generation system. In Scenario 2, signal selection subsystem 906 generates and sends or passes a second set of selected signals SS(2) to thought starter generation subsystem 914. Thought starter generation subsystem 914 generates and sends or passes a second set of thought starters TS(2) to content creation interface 918. Content creation interface 918 generates and passes or sends a first set of user-generated feedback UFB(1), created in response to one or more of the thought starters TS(2), to thought starter generation subsystem 914. In response to UFB(1), thought starter generation subsystem 914 generates and sends or passes a third set of thought starters TS(3) to content creation interface 918. Content creation interface 918 generates and passes or sends a second set of user-generated content UGC(2), created based on one or more of the thought starters TS(3), to content distribution subsystem 924. Content distribution subsystem 924 receives a second set of network feedback NFB(2), e.g., social reactions to the distribution of the UGC(2) on a user network, and passes or sends the NFB(2) to signal selection subsystem 908 and/or thought starter generation subsystem 914. In response to the feedback UFB(1) and/or the feedback NFB(2), signal selection subsystem 906 can modify, filter, or re-weight the selected signals, e.g., the AI signals and/or input signals used by thought starter generation subsystem to generate thought starters, and/or thought starter generation system 914 can modify prompts or prompt templates or create or select new prompts or prompt templates or fine tune one or more generative models e.g., by adjusting one or more model parameters, such as model hyperparameters.

In an Nth third scenario, where N is a positive integer, pre-distribution feedback is returned to signal selection subsystem 908 and/or thought starter generation subsystem 914. In Scenario N, signal selection subsystem 906 generates and sends or passes an Nth set of selected signals SS(N) to thought starter generation subsystem 914. Thought starter generation subsystem 914 generates and sends or passes an Nth set of thought starters TS(N) to content creation interface 918. Content creation interface 918 generates and passes or sends an Nth set of user-generated feedback UFB(N), created in response to one or more of the thought starters TS(N), to signal selection subsystem 908 and/or thought starter generation subsystem 914. In scenario N, the prospective content creator user has not created any content items based on any of the thought starters, and this lack of usage of the thought starters TS(N) by the user is formulated as UFB(N) and returned to signal selection subsystem 906. In response to the feedback UFB(N), signal selection subsystem 906 can modify, filter, or re-weight the selected signals, e.g., the AI signals and/or input signals used by thought starter generation subsystem to generate thought starters.

Figure 10:
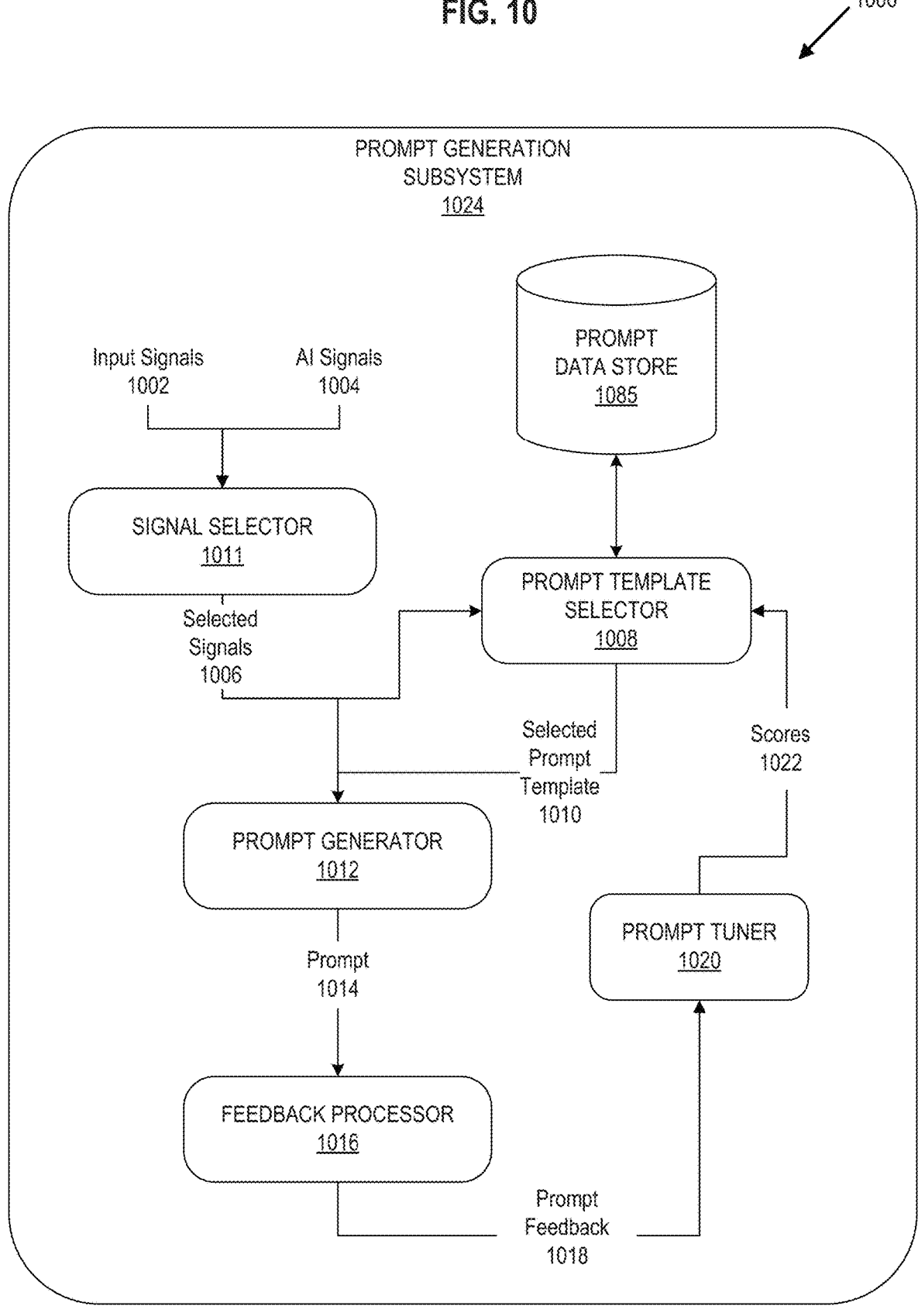
FIG. 10 is a flow diagram of an example method for automated prompt generation using components of a prompt generation subsystem in accordance with some embodiments of the present disclosure.
Figure 11:
FIG. 11 is a graphical representation of an example of components of a prompt in accordance with some embodiments of the present disclosure.

FIG. 10 is a flow diagram of an example method for automated prompt generation using components of a prompt generation subsystem in accordance with some embodiments of the present disclosure.

The method 1000 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by one or more components of thought starter generation system 100 of FIG. 1 or thought starter generation system 640 of FIG. 6, such as prompt generation subsystem 810 shown in FIG. 8, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 10, prompt generation subsystem 1024 includes one or more computer programs or routines that generate prompts that are configured to cause a generative model to machine-generate and output a one or more thought starters. In some implementations, the execution of prompt generation subsystem 1024 is initiated by an API call from thought starter generation system 640 or application software system 630.

In the example of FIG. 10, prompt generation subsystem 1024 includes a signal selector 1011, a prompt data store 1085, a prompt template selector 1008, a prompt generator 1012, a feedback processor 1016, and a prompt tuner 1020.

Signal selector 1011 receives input signals 1002 and/or AI signals 1004 and selects from among the received input signals 1002 and/or AI signals 1004 to produce and output selected signals 1006. For example, signal selector 1011 generates various combinations of input signals 1002 and/or AI signals 1004 and weights or ranks the various input signals 1002 and/or AI signals 1004 and/or combinations thereof. Signal selector 1011 generates the selected signals 1006 based on the weightings and/or rankings, in some instances. In some instances, signal selector 1011 modifies or adjusts weight values or rankings of various input signals 1002 and/or AI signals 1004 based on user feedback and/or network feedback, e.g., pre-distribution feedback and/or post-distribution feedback.

Prompt template selector 1008 selects a prompt template 1010 from prompt data store 1085 based on one or more of selected signals 1006 and scores 1022. Prompt templates stored in prompt data store 1085 can include initial templates and/or engineered templates. An initial template includes a template that is created manually, or in a semi-automated or automated way by, for example, prompt engineers or users of the online system, without any system-generated feedback. An engineered template includes an initial template that has been created or modified, either manually or in a semi-automated or automated way, based on feedback such as prompt feedback 1018. Initial templates and engineered templates are stored in prompt data store 1085. The prompt templates stored in prompt data store 1085 are indexed by a unique prompt template identifier and one or more keywords, in some implementations.

In some implementations, prompt template selector 1008 randomly selects an initial prompt template 1010 from a set of stored prompt templates. Prompt template selector 1008 uses random selection, for example, on an initial iteration of a generative language model, in cases where no engineered prompts are available, or in cases where all of the prompt templates in the set of stored prompt templates have the same template scores 1022 (e.g., at initialization). When template scores 1022 are available, prompt template selector 1008 ranks the set of stored prompt templates based on the template scores 1022 and selects the highest-ranking prompt template, in some implementations.

Selected signals 1006 are inputs to prompt generator 1012. Prompt generator 1012 generates and outputs generated prompt 1014 based on selected signals 1006 and selected template 1010. Prompt generator 1012 generates a different prompt 1014 for each set of selected signals 1006. Prompt generator 1012 can use a different template or the same template for different sets of selected signals 1006. Prompt generator 1012 includes the identifier of the set of selected signals 1006 used to create the prompt 1014 and the prompt template identifier of the prompt template 1010 used to create the prompt 1014, or references to the respective identifier of the selected signals 1006 and prompt identifier, in the generated prompt 1014, in some implementations. Prompt generator 1012 assigns a unique prompt identifier to each prompt 1014. The prompt identifier can include, for example, the identifier for a given set of selected signals 1006 and the prompt template identifier for a given prompt template 1010.

In some implementations, the generated prompt 1014 is processed by feedback processor 1016 to generate prompt feedback 1018. Feedback processor 1016 obtains feedback related to generated prompt 1014. Examples of feedback that can be obtained by feedback processor 1016 include pre-distribution feedback and/or post-distribution feedback, described herein.

Feedback processor 1016 formulates prompt feedback 1018 based on, for example, various combinations of pre-distribution feedback and/or post-distribution feedback. An example of prompt feedback is a score, a label, or a rating, where the score, label or rating is applied to a prompt pair by a scoring model, a classification model, or a human reviewer. As an example, if a generative model uses a generated prompt 1014 to machine-generate a thought starter that a filter mechanism classifies as containing inappropriate or irrelevant content, the inappropriate or irrelevant content label can be returned by the filter mechanism to feedback processor 1016. In some implementations, feedback processor 1016 uses the prompt template identifier to map the content label to the corresponding prompt template 1010 that generated the inappropriate or irrelevant content-producing prompt, and sends the labeled prompt to prompt tuner 1020 as prompt feedback 1018.

Prompt tuner 1020 uses prompt feedback 1018 to generate template scores 1022 for prompt templates stored in prompt data store 1085. To compute template scores 1022, prompt tuner 1020 computes a measure of similarity or relevance between each available prompt template and a set of selected signals, for example. For instance, prompt templates can be scored and ranked based on similarity or relevance to particular topics, such that prompt data store 1085 can store and maintain prompt templates that are customized by topic, or based on sets of selected signals, input signals, or AI signals. Thus, each prompt template can have a set of template scores 1022, where each set of template scores is specific to a particular set of selected signals. For instance, the same prompt template could have a template score of 100 for the topic of "cybersecurity" and a template score of 10 for the topic of "cooking healthy breakfasts," where a higher score indicates higher relevance. In some implementations, prompt template selector 1008 periodically sorts or reranks prompt templates in the prompt data store 1085 for each prospective content creator user based on, e.g., selected signals 1006. For example, the sets of sets of selected signals, input signals, or AI signals used to rank or score prompt templates can be specific to particular prospective content creator users.

In some implementations, the template scores 1022 are initialized to the same value for all of the prompt templates in the prompt data store 1085 and then the template scores 1022 are recomputed by prompt tuner 1020 for individual prompt templates when prompt feedback 1018 is received for those templates. For example, the template score for a particular prompt template may decrease after prompt tuner 1020 receives prompt feedback 1018 that indicates that the prompt template produced a machine-generated thought starter that was classified as containing inappropriate or irrelevant content by a filter mechanism.

Prompt generation subsystem 1024 outputs a prompt 1014, where the prompt is based on the input signals 1002 and the AI signals 1004 selected by signal selector 1011, e.g., selected signals 1006. For example, the prompt 1014 is created by prompt generation subsystem 1024 merging selected signals 1006 with a selected prompt template 1010, e.g., by populating placeholders or parameters in the selected prompt template 1010 with corresponding elements of selected signals 1006. Prompt generation subsystem 1024 sends the prompt output 1014 to a downstream component, process, system or service, such as a generative language model or thought starter generation subsystem.

The examples shown in FIG. 10 and the accompanying description, above are provided for illustration purposes. This disclosure is not limited to the described examples.

FIG. 11 is a graphical representation of an example of components of a prompt in accordance with some embodiments of the present disclosure.

In the example of FIG. 11, a prompt is structured according to a prompt template 1102. The prompt template 1102 includes one or more placeholders for first selected signals, one or more placeholders for second selected signals, one or more placeholders for third selected signals, and instructions and/or examples. Each of the sets of placeholders in the prompt template 1102 are associated with a different category or type of selected signals. For instance, in FIG. 11, the placeholder(s) for first selected signals are placeholders for classification data, e.g., output of one or more classification models; the placeholder(s) for second selected signals are placeholders for embedding data, e.g., output of one or more embedding generators; the placeholder(s) for third selected signals are placeholders for score data, e.g., output of one or more inference models, etc. In some implementations, when the prompt template 1102 is applied to a set of selected signals, the respective selected signals are mapped to, merged with, or inserted into the respective placeholder. For example, the classification data is mapped to, merged with, inserted into the placeholder for first selected signals, embedding data are mapped to, merged with, or inserted into the placeholders for second selected signals, and the score data is mapped to, merged with, or inserted into the third selected signals.

In some implementations, the prompt includes a prefix. A prefix is a parameter that can be filled with context data, such as data that includes previous output produced by a generative model. The previous output can include, for instance, a thought starter that was previously generated by the generative model.

In some implementations, instructions, examples, and/or questions are included in a portion of the prompt template known as a suffix. The suffix is a parameter that can be filled with data that describes one or more instructions, questions, and/or examples related to the current task for the generative model. For instance, instructions, questions, and/or examples can indicate that the output of the generative model should be a piece of writing that is written in a particular tone or style, e.g., enthusiastic, motivational, etc., or that the output should be of a certain length, e.g., a length suitable for a post, a comment a share, or an article, such as a minimum length in the range of about 100 words or less and a maximum length in the range of about 600 words or less.

In some implementations, the instructions and/or examples include filter criteria. Filter criteria include, for instance, output of one or more of the AI models and/or filters described herein. For instance, if an AI model classified a recent user post as having a post intent of "knowledge" then the category, "knowledge" can be used as filter criteria to filter out thought starters output by the generative model that do not match the "knowledge" category.

The examples shown in FIG. 11 and the accompanying description, above, are provided for illustration purposes. This disclosure is not limited to the described examples. For example, prompt templates that do not include a prefix or do not include a suffix can be used, in other implementations.

A prompt template includes a format and/or specification for arranging data and/or instructions for input to a generative model so that the generative model can read and process the inputs and machine-generate corresponding output. An example of a format for a prompt template is: [data placeholder] [instructions or examples] [model parameters], where [data placeholder] is a placeholder for an input (e.g., selected signals), [instructions or examples] are placeholders for instructions for the generative model (e.g., write a thought starter) or examples of the kind of output the generative model is to produce (e.g., an example of a content item previously created by the user), and [model parameters] are placeholders for required or optional parameter values used by the generative language model to generate output (e.g., output length, tone, style, etc.). The examples shown in FIG. 11, and the accompanying description are provided for illustration purposes. This disclosure is not limited to the described examples.

Figure 12:
FIG. 12 is a flow diagram of an example method for automated thought starter generation using components of a thought starter generation subsystem in accordance with some embodiments of the present disclosure.

FIG. 12 is a flow diagram of an example method for automated thought starter generation using components of a thought starter generation subsystem in accordance with some embodiments of the present disclosure.

The method 1200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by one or more components of thought starter generation system 640 of FIG. 6, such as thought starter generation subsystem 814, shown in FIG. 8, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 12, thought starter generation subsystem 1216 includes one or more computer programs or routines that train or fine tune a generative model 1206 for thought starter generation tasks, e.g., to configure the generative model 1206 to machine-generate and output thought starters. In some implementations, the execution of thought starter generation subsystem 1216 or more specifically the generative model 1206 is initiated by an API call from, e.g., thought starter generation system 640 or application software system 630.

In the example of FIG. 12, thought starter generation subsystem 1216 includes a model trainer 1202, a generative model 1206, and a feedback processor 1210 operatively coupled together in a closed loop. Model trainer 1202 receives feedback data from a previous iteration of generative model 1206. The feedback data is generated by feedback processor 1210 in response to the output of the previous iteration of the generative model. The feedback data generated by feedback processor 1210 includes prompt-feedback pairs 1212 and/or output-feedback pairs 1214.

To create a prompt-feedback pair 1212, in some implementations, feedback processor 1210 computes a score, such as a reward score, based on feedback related to a particular prompt. Feedback related to a particular prompt can include feedback directly related to the prompt, such as a rating, a score, or label that is assigned to the prompt by a human reviewer or an automated process, such as a scoring model or a classification model of a feedback subsystem. The feedback related to a particular prompt also or alternatively can include feedback related to output produced by the generative model 1206 based on the prompt. For instance, given a prompt-output pair 1208, feedback processor 1210 computes a score for the prompt-output pair 1208 by applying a reinforcement learning model to the feedback associated with the prompt-output pair.

To create an output-feedback pair 1214, in some implementations, feedback processor 1210 computes a score, such as a reward score, based on feedback related to a particular output of the generative model 1206. Feedback related to a particular output can include feedback directly related to the output, such as a rating, a score, or label that is assigned to the output by a human reviewer or an automated process, such as a scoring model or a classification model of a feedback subsystem. The feedback related to a particular output also or alternatively can include feedback related to the prompt that was used by the generative model 1206 to create the output. For instance, given a prompt-output pair 1208, feedback processor 1210 computes a score for the prompt-output pair by applying a reinforcement learning model to the feedback associated with the prompt-output pair.

In some implementations, the generative model 1206 is pre-trained on a large corpus (e.g., millions of training examples) and can be re-trained or fine-tuned for particular applications or domains. Model trainer 1202 creates training data based on the prompt-feedback pairs 1212 and/or output-feedback pairs 1214 received from feedback processor 1210. The training data created by model trainer 1202, e.g., training prompt-output pairs 1204, is used to train or fine tune the generative model 1206 using, for example, supervised machine learning or semi-supervised machine learning. An instance of training data includes ground-truth data for a given prompt-output pair, where the ground-truth data includes, for example, a reward score, a classification, or a label generated by feedback processor 1210 in communication with one or more feedback subsystems such as pre-distribution feedback subsystem 1218 or post-distribution feedback subsystem 1228. In a training or fine tuning mode, the generative model 1206 is applied to the training prompt-output pairs 1204 and one or more model parameters of the generative model 1206 are updated based on the training or fine tuning. Alternatively or in addition, the architecture of the generative model 1206 can be re-engineered based on new instances of training data or based on a new application or domain. In an operational mode, the generative model 1206 generates output in response to prompts. The prompt-output pairs 1208 generated by the generative model 1206 are processed by feedback processor 1210 to create prompt-feedback pairs 1212 and/or output-feedback pairs 1214 when the feedback processor 1210 receives feedback related to the respective prompt-output pairs 1208.

In some implementations, feedback processor 1210 includes a reinforcement learning component such as a reinforcement learning model that machine-learns a reward function based on feedback associated with prompt-output pairs. For example, given a prompt-output pair 1208, feedback processor 1210 receives or identifies feedback that pertains to the prompt-output pair 1208. The feedback can include pre-distribution feedback and/or post-distribution feedback received from one or more other components of the thought starter generation system. The feedback processor 1210 applies the reward function to the received or identified feedback to generate a reward score for the corresponding prompt-output pair based on the feedback associated with the prompt-output pair. The reward scores are incorporated into the prompt-feedback pairs 1212 and/or output-feedback pairs 1214, which are then used to train or fine tune the generative model 1206 using, for example, supervised or semi-supervised machine learning. The examples shown in FIG. 12 and the accompanying description, above are provided for illustration purposes. This disclosure is not limited to the described examples.

FIG. 13 is a flow diagram of an example method for automated thought starter generation in accordance with some embodiments of the present disclosure.

The method 1300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by one or more components of thought starter generation system 640 of FIG. 6. For example, in some implementations, portions of the method 1300 are performed by one or more components of a thought starter generation system shown in FIG. 1, FIG. 2, and/or FIG. 6, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 1302, the processing device determines a first set of input signals based on at least one of entity data, activity data, or links among the entity data and the activity data, where the first set of input signals is specific to a user of a user network. At operation 1304, the processing device inputs the first set of input signals to a first set of artificial intelligence (AI) models. At operation 1306, the processing device, in response to the first set of input signals, outputs, by the first set of AI models, a first set of AI-derived signals relating to the first set of input signals. At operation 1308, the processing device applies at least one prompt template to the first set of AI-derived signals to create at least one prompt. At operation 1310, the processing device inputs the at least one prompt to at least one generative AI model. At operation 1312, the processing device, in response to the at least one prompt, outputs, by the at least one generative AI model, at least one thought starter machine-generated by the at least one generative AI model, where the at least one thought starter includes digital content configured to be distributed via the user network.

In some implementations, the method 1300 includes determining the first set of input signals based on at least one graph of the user network, where the at least one graph includes a plurality of nodes that represent entities or activities, one or more taxonomies including standardized entity data or standardized activity data, and a plurality of links among the plurality of nodes. In some implementations, the first set of AI-derived signals include at least one of: a prediction, an embedding, a classification, or a score. In some implementations, the method 1300 includes: including at least some of the first set of AI-derived signals in one or more of: an instruction contained in the at least one prompt, a question contained in the at least one prompt, or an example contained in the at least one prompt. In some implementations, the method 1300 includes: using at least some of the first set of AI-derived signals to determine whether to include in the at least one prompt or exclude from the at least one prompt, at least one of a question, an instruction, or an example. In some implementations, the method 1300 includes: modifying the at least one thought starter based on at least some of the first set of AI-derived signals. In some implementations, the at least one thought starter includes at least a portion of at least one of a post, a section of a post, an article, a share text, a comment, or a reaction to a content item on the user network, or the at least one thought starter includes at least one of a poll, a hyperlink, an image, audio, or video. In some implementations, the method 1300 includes: in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

In some implementations, the method 1300 includes: determining a first set of input signals based on at least one of entity data, activity data, or links among the entity data and the activity data, wherein the first set of input signals is specific to a user of a user network; inputting the first set of input signals to a first set of artificial intelligence (AI) models; in response to the first set of input signals, outputting, by the first set of AI models, a first set of AI-derived signals relating to the first set of input signals; applying at least one prompt template to the first set of AI-derived signals to create at least one prompt; inputting the at least one prompt to at least one generative AI model; and in response to the at least one prompt, outputting, by the at least one generative AI model, at least one thought starter machine-generated by the at least one generative AI model, wherein the at least one thought starter comprises digital content configured to be distributed via the user network; wherein the digital content comprises any of video, audio, images. In some embodiments, the prompt includes video, audio and/or images.

In some implementations, the method 1300 includes presenting the thought starter to a user at a content generation assistant and receiving user input in response to the thought starter, where the user input includes any of: modification of the thought starter, requesting a new thought starter, incorporating the thought starter into a new piece of the digital content and causing the new piece of the digital content to be distributed in the user network.

In some implementations, the method 1300 includes a prompt template that is selected from a library of prompt templates, where the library of prompt templates contains one or more orders of magnitude fewer templates than there are users in the user network.

In some implementations, the method 1300 includes a prompt that is configured to convert the content from a first size to components of a second size, where the second size is more efficient for distribution in the user network than the first size. An example 401 includes example 400 and further includes digital content that is distributed in the user network in dependence on interaction between users and the digital content, where the prompt is configured to trigger the generative AI model to generate content suitable for rendering at end user devices with different screen resolutions so as to facilitate interaction between users and the digital content resulting in improved content distribution.

In some implementations, the method 1300 includes detecting an increase in latency during outputting the thought starter, and in response to detecting the increase in latency, at least one of: reducing a number of the input signals; or using a first set of AI models with reduced size; or using a more compact prompt template; or reducing a size of the content.

In some implementations, a system includes at least one processor; and at least one memory coupled to the at least one processor, where the at least one memory includes instructions that, when executed by the at least one processor, cause the at least one processor to perform at least one operation of the method 1300. In some implementations, at least one non-transitory machine-readable storage medium includes instructions that, when executed by at least one processor, cause the at least one processor to perform at least one operation of the method 1300.

The examples shown in FIG. 13 and the accompanying description, above, are provided for illustration purposes. This disclosure is not limited to the described examples.

FIG. 14 is a block diagram of an example computer system including components of a thought starter generation system in accordance with some embodiments of the present disclosure. In FIG. 14, an example machine of a computer system 1400 is shown, within which a set of instructions, for causing the machine to perform any of the methodologies discussed herein, can be executed. In some embodiments, the computer system 1400 can correspond to a component of a networked computer system (e.g., as a component of the computer system 600 of FIG. 6) that includes, is coupled to, or utilizes a machine to execute an operating system to perform operations corresponding to one or more components of the thought starter generation system 100 of FIG. 1 or thought starter generation system 640 of FIG. 6. For example, computer system 1400 corresponds to a portion of computing system when the computing system is executing a portion of thought starter generation system 640.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or Rambus DRAM (RDRAM), etc.), a memory 1403 (e.g., flash memory, static random access memory (SRAM), etc.), an input/output system 1410, and a data storage system 1440, which communicate with each other via a bus 1430.

Processing device 1402 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 can also be at least one special-purpose processing device such as an application specific integrated circuit (ASIC), a field programmable gate array (FPGA), a digital signal processor (DSP), network processor, or the like. The processing device 1402 is configured to execute instructions 1412 for performing the operations and steps discussed herein.

In FIG. 14, thought starter generation system 1450 represents portions of thought starter generation system 640 when the computer system 1400 is executing those portions of thought starter generation system 640. Instructions 1412 include portions of thought starter generation system 1450 when those portions of the thought starter generation system 1450 are being executed by processing device 1402. Thus, the thought starter generation system 1450 is shown in dashed lines as part of instructions 1412 to illustrate that, at times, portions of the thought starter generation system 1450 are executed by processing device 1402. For example, when at least some portion of the thought starter generation system 1450 is embodied in instructions to cause processing device 1402 to perform the method(s) described herein, some of those instructions can be read into processing device 1402 (e.g., into an internal cache or other memory) from main memory 1404 and/or data storage system 1440. However, it is not required that all of the thought starter generation system 1450 be included in instructions 1412 at the same time and portions of the thought starter generation system 1450 are stored in at least one other component of computer system 1400 at other times, e.g., when at least one portion of the thought starter generation system 1450 are not being executed by processing device 1402.

The computer system 1400 further includes a network interface device 1408 to communicate over the network 1420. Network interface device 1408 provides a two-way data communication coupling to a network. For example, network interface device 1408 can be an integrated-services digital network (ISDN) card, cable modem, satellite modem, or a modem to provide a data communication connection to a corresponding type of telephone line. As another example, network interface device 1408 can be a local area network (LAN) card to provide a data communication connection to a compatible LAN. Wireless links can also be implemented. In any such implementation network interface device 1408 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1400.

Computer system 1400 can send messages and receive data, including program code, through the network(s) and network interface device 1408. In the Internet example, a server can transmit a requested code for an application program through the Internet and network interface device 1408. The received code can be executed by processing device 1402 as it is received, and/or stored in data storage system 1440, or other non-volatile storage for later execution.

The input/output system 1410 includes an output device, such as a display, for example a liquid crystal display (LCD) or a touchscreen display, for displaying information to a computer user, or a speaker, a haptic device, or another form of output device. The input/output system 1410 can include an input device, for example, alphanumeric keys and other keys configured for communicating information and command selections to processing device 1402. An input device can, alternatively or in addition, include a cursor control, such as a mouse, a trackball, or cursor direction keys for communicating direction information and command selections to processing device 1402 and for controlling cursor movement on a display. An input device can, alternatively or in addition, include a microphone, a sensor, or an array of sensors, for communicating sensed information to processing device 1402. Sensed information can include voice commands, audio signals, geographic location information, and/or digital imagery, for example.

The data storage system 1440 includes a machine-readable storage medium 1442 (also known as a computer-readable medium) on which is stored at least one set of instructions 1444 or software embodying any of the methodologies or functions described herein. The instructions 1444 can also reside, completely or at least partially, within the main memory 1404 and/or within the processing device 1402 during execution thereof by the computer system 1400, the main memory 1404 and the processing device 1402 also constituting machine-readable storage media.

In one embodiment, the instructions 1444 include instructions to implement functionality corresponding to a thought starter generation system (e.g., the thought starter generation system 100 of FIG. 1 or thought starter generation system 640 of FIG. 6).

Dashed lines are used in FIG. 14 to indicate that it is not required that the thought starter generation system be embodied entirely in instructions 1412, 1414, and 1444 at the same time. In one example, portions of the thought starter generation system are embodied in instructions 1444, which are read into main memory 1404 as instructions 1414, and portions of instructions 1414 are read into processing device 1402 as instructions 1412 for execution. In another example, some portions of the thought starter generation system are embodied in instructions 1444 while other portions are embodied in instructions 1414 and still other portions are embodied in instructions 1412.

While the machine-readable storage medium 1442 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 14 and the accompanying description, above, are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 600, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples described herein, or any combination of any of the examples described herein, or any combination of any portions of the examples described herein.

In an example 1, a method includes determining a first set of input signals based on at least one of entity data, activity data, or links among the entity data and the activity data, where the first set of input signals is specific to a user of the user network; inputting the first set of input signals to a first set of artificial intelligence (AI) models; in response to the first set of input signals, outputting, by the first set of AI models, a first set of AI-derived signals relating to the first set of input signals; applying at least one prompt template to the first set of AI-derived signals to create at least one prompt; inputting the at least one prompt to at least one generative AI model; and in response to the at least one prompt, outputting, by the at least one generative AI model, at least one thought starter machine-generated by the at least one generative AI model, where the at least one thought starter comprises digital content configured to be distributed via the user network.

An example 2 includes the subject matter of example 1, further including determining the first set of input signals based on at least one graph of the user network, where the at least one graph includes a plurality of nodes that represent entities or activities, one or more taxonomies including standardized entity data or standardized activity data, and a plurality of links among the plurality of nodes. An example 3 includes the subject matter of example 1 or example 2, where the first set of AI-derived signals include at least one of: a prediction, an embedding, a classification, or a score. An example 4 includes the subject matter of any of examples 1-3, further including: including at least some of the first set of AI-derived signals in one or more of: an instruction contained in the at least one prompt, a question contained in the at least one prompt, or an example contained in the at least one prompt. An example 5 includes the subject matter of any of examples 1-4, further including: using at least some of the first set of AI-derived signals to determine whether to include in the at least one prompt or exclude from the at least one prompt, at least one of a question, an instruction, or an example. An example 6 includes the subject matter of any of examples 1-5, further including: modifying the at least one thought starter based on at least some of the first set of AI-derived signals. An example 7 includes the subject matter of any of examples 1-6, where the at least one thought starter includes at least a portion of at least one of a post, a section of a post, an article, a share text, a comment, or a reaction to a content item on the user network, or the at least one thought starter includes at least one of a poll, a hyperlink, an image, audio, or video. An example 8 includes the subject matter of any of examples 1-7, further including: in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

In an example 9, a system includes: at least one processor; and at least one memory coupled to the at least one processor, where the at least one memory includes instructions that, when executed by the at least one processor, cause the at least one processor to perform at least one operation including: determining a first set of input signals based on at least one of entity data, activity data, or links among the entity data and the activity data, where the first set of input signals is specific to a user of a user network; inputting the first set of input signals to a first set of artificial intelligence (AI) models; in response to the first set of input signals, outputting, by the first set of AI models, a first set of AI-derived signals relating to the first set of input signals; applying at least one prompt template to the first set of AI-derived signals to create at least one prompt; inputting the at least one prompt to at least one generative AI model; and in response to the at least one prompt, outputting, by the at least one generative AI model, at least one thought starter machine-generated by the at least one generative AI model, where the at least one thought starter includes digital content configured to be distributed via the user network.

An example 10 includes the subject matter of example 9, where the instructions, when executed by the at least one processor, cause the at least one processor to perform at least one operation further including: determining the first set of input signals based on at least one graph of the user network, where the at least one graph includes a plurality of nodes that represent entities or activities, one or more taxonomies including standardized entity data or standardized activity data, and a plurality of links among the plurality of nodes. An example 11 includes the subject matter of example 9 or example 10, where the instructions, when executed by the at least one processor, cause the at least one processor to perform at least one operation further including: including at least some of the first set of AI-derived signals in one or more of: an instruction contained in the at least one prompt, a question contained in the at least one prompt, or an example contained in the at least one prompt. An example 12 includes the subject matter of any of examples 9-11, where the instructions, when executed by the at least one processor, cause the at least one processor to perform at least one operation further including: using at least some of the first set of AI-derived signals to determine whether to include in the at least one prompt or exclude from the at least one prompt, at least one of a question, an instruction, or an example. An example 13 includes the subject matter of any of examples 9-12, where the instructions, when executed by the at least one processor, cause the at least one processor to perform at least one operation further including: modifying the at least one thought starter based on at least some of the first set of AI-derived signals. An example 14 includes the subject matter of any of examples 9-13, where the instructions, when executed by the at least one processor, cause the at least one processor to perform at least one operation further including: in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

In an example 15, at least one non-transitory machine-readable storage medium, including instructions that, when executed by at least one processor, cause the at least one processor to perform at least one operation including: determining a first set of input signals based on at least one of entity data, activity data, or links among the entity data and the activity data, where the first set of input signals is specific to a user of a user network; inputting the first set of input signals to a first set of artificial intelligence (AI) models; in response to the first set of input signals, outputting, by the first set of AI models, a first set of AI-derived signals relating to the first set of input signals; applying at least one prompt template to the first set of AI-derived signals to create at least one prompt; inputting the at least one prompt to at least one generative AI model; and in response to the at least one prompt, outputting, by the at least one generative AI model, at least one thought starter machine-generated by the at least one generative AI model, where the at least one thought starter includes digital content configured to be distributed via the user network.

An example 16 includes the subject matter of example 15, where the instructions, when executed by the at least one processor, cause the at least one processor to perform at least one operation further including: including at least some of the first set of AI-derived signals in one or more of: an instruction contained in the at least one prompt, a question contained in the at least one prompt, or an example contained in the at least one prompt. An example 17 includes the subject matter of example 15 or example 16, where the instructions, when executed by the at least one processor, cause the at least one processor to perform at least one operation further including: using at least some of the first set of AI-derived signals to determine whether to include in the at least one prompt or exclude from the at least one prompt, at least one of a question, an instruction, or an example. An example 18 includes the subject matter of any of examples 15-17, where the at least one thought starter includes at least a portion of at least one of a post, a section of a post, an article, a share text, a comment, or a reaction to a content item on the user network, or the at least one thought starter includes at least one of a poll, a hyperlink, an image, audio, or video. An example 19 includes the subject matter of any of examples 15-18, where the first set of AI-derived signals include at least one of: a prediction, an embedding, a classification, or a score. An example 20 includes the subject matter of any of examples 15-19, where the instructions, when executed by the at least one processor, cause the at least one processor to perform at least one operation further including: in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

An example 100, which addresses at least the technical problem of how to machine-generate digital images, digital videos, and/or digital audio, includes a method, including: determining a first set of input signals based on at least one of entity data, activity data, or links among the entity data and the activity data, wherein the first set of input signals is specific to a user of a user network; inputting the first set of input signals to a first set of artificial intelligence (AI) models; in response to the first set of input signals, outputting, by the first set of AI models, a first set of AI-derived signals relating to the first set of input signals; applying at least one prompt template to the first set of AI-derived signals to create at least one prompt; inputting the at least one prompt to at least one generative AI model; and in response to the at least one prompt, outputting, by the at least one generative AI model, at least one thought starter machine-generated by the at least one generative AI model, wherein the at least one thought starter comprises digital content configured to be distributed via the user network; wherein the digital content comprises any of video, audio, images. In some embodiments, the prompt includes video, audio and/or images.

An example 200, which addresses at least the technical problem of reducing the burden of user input when creating posts, includes the method 100 and further includes presenting the thought starter to a user at a content generation assistant and receiving user input in response to the thought starter, where the user input includes any of: modification of the thought starter, requesting a new thought starter, incorporating the thought starter into a new piece of the digital content and causing the new piece of the digital content to be distributed in the user network.

An example 300, which addresses at least the technical problem of scalability, includes the method of example 100 or example 200, and further includes a prompt template that is selected from a library of prompt templates, where the library of prompt templates contains one or more orders of magnitude fewer templates than there are users in the user network.

An example 400, which addresses at least the technical problem of efficient content distribution, includes the method of any of the above examples 100, 200, 300, and further includes a prompt that is configured to convert the content from a first size to components of a second size, where the second size is more efficient for distribution in the user network than the first size. An example 401 includes example 400 and further includes digital content that is distributed in the user network in dependence on interaction between users and the digital content, where the prompt is configured to trigger the generative AI model to generate content suitable for rendering at end user devices with different screen resolutions so as to facilitate interaction between users and the digital content resulting in improved content distribution.

An example 500, which addresses at least the technical problem of dealing with latency issues, includes the method of any of the above examples 100, 200, 300, 400, and further includes detecting an increase in latency during outputting the thought starter, and in response to detecting the increase in latency, at least one of: reducing a number of the input signals; or using a first set of AI models with reduced size; or using a more compact prompt template; or reducing a size of the content.

An example 600 includes the subject matter of any of the above examples, and further includes any one or more aspects, steps, elements, functions, or limitations that are at least one of described in the enclosed description or shown in the accompanying drawings.

An example 700 includes a system that includes: at least one processor; and at least one memory coupled to the at least one processor; where the at least one memory includes instructions that, when executed by the at least one processor, cause the at least one processor to perform operations including any one or more of the above examples. An example 300 includes a non-transitory computer readable medium that includes at least one memory capable of being coupled to at least one processor; where the at least one memory includes instructions that, when executed by the at least one processor, cause the at least one processor to perform operations including any one or more of the above examples.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining a first set of input signals based on at least one of entity data, activity data, or links among the entity data and the activity data, wherein the first set of input signals is specific to a user of a user network;
   inputting the first set of input signals to a first set of artificial intelligence (AI) models;
   in response to the first set of input signals, outputting, by the first set of AI models, a first set of AI-derived signals relating to the first set of input signals;
   modulating between the first set of input signals and the first set of AI-derived signals to produce selected signals comprising at least one input signal from the first set of input signals and at least one AI-derived signal from the first set of AI-derived signals;
   applying at least one prompt template to the selected signals to create at least one prompt;
   inputting the at least one prompt to at least one generative AI model; and in response to the at least one prompt, outputting, by the at least one generative AI model, at least one thought starter machine-generated by the at least one generative AI model, wherein the at least one thought starter comprises digital content configured to be distributed via the user network.

2. The method of claim 1, further comprising determining the first set of input signals based on at least one graph of the user network, wherein the at least one graph comprises a plurality of nodes that represent entities or activities, one or more taxonomies comprising standardized entity data or standardized activity data, and a plurality of links among the plurality of nodes.

3. The method of claim 1, wherein the first set of AI-derived signals comprise at least one of: a prediction, an embedding, a classification, or a score.

4. The method of claim 1, further comprising:
including at least some of the first set of AI-derived signals in one or more of: an instruction contained in the at least one prompt, a question contained in the at least one prompt, or an example contained in the at least one prompt.

5. The method of claim 1, further comprising:
using at least some of the first set of AI-derived signals to determine whether to include in the at least one prompt or exclude from the at least one prompt, at least one of a question, an instruction, or an example.

6. The method of claim 1, further comprising:
modifying the at least one thought starter based on at least some of the first set of AI-derived signals.

7. The method of claim 1, wherein the at least one thought starter comprises at least a portion of at least one of a post, a section of a post, an article, a share text, a comment, or a reaction to a content item on the user network, or the at least one thought starter comprises at least one of a poll, a hyperlink, an image, audio, or video.

8. The method of claim 1, further comprising:
in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

9. A system, comprising:
at least one processor; and
at least one memory coupled to the at least one processor, wherein the at least one memory comprises instructions that, when executed by the at least one processor, cause the at least one processor to perform at least one operation comprising:
determining a first set of input signals based on at least one of entity data, activity data, or links among the entity data and the activity data, wherein the first set of input signals is specific to a user of a user network;
inputting the first set of input signals to a first set of artificial intelligence (AI) models;
in response to the first set of input signals, outputting, by the first set of AI models, a first set of AI-derived signals relating to the first set of input signals;
modulating between the first set of input signals and the first set of AI-derived signals to produce selected signals comprising at least one input signal from the first set of input signals and at least one AI-derived signal from the first set of AI-derived signals;
applying at least one prompt template to the selected signals to create at least one prompt;

inputting the at least one prompt to at least one generative AI model; and
in response to the at least one prompt, outputting, by the at least one generative AI model, at least one thought starter machine-generated by the at least one generative AI model, wherein the at least one thought starter comprises digital content configured to be distributed via the user network.

10. The system of claim 9, wherein the instructions, when executed by the at least one processor, cause the at least one processor to perform at least one operation further comprising:
determining the first set of input signals based on at least one graph of the user network, wherein the at least one graph comprises a plurality of nodes that represent entities or activities, one or more taxonomies comprising standardized entity data or standardized activity data, and a plurality of links among the plurality of nodes.

11. The system of claim 9, wherein the instructions, when executed by the at least one processor, cause the at least one processor to perform at least one operation further comprising:
including at least some of the first set of AI-derived signals in one or more of: an instruction contained in the at least one prompt, a question contained in the at least one prompt, or an example contained in the at least one prompt.

12. The system of claim 9, wherein the instructions, when executed by the at least one processor, cause the at least one processor to perform at least one operation further comprising:
using at least some of the first set of AI-derived signals to determine whether to include in the at least one prompt or exclude from the at least one prompt, at least one of a question, an instruction, or an example.

13. The system of claim 9, wherein the instructions, when executed by the at least one processor, cause the at least one processor to perform at least one operation further comprising:
modifying the at least one thought starter based on at least some of the first set of AI-derived signals.

14. The system of claim 9, wherein the instructions, when executed by the at least one processor, cause the at least one processor to perform at least one operation further comprising:
in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

15. At least one non-transitory machine-readable storage medium, comprising instructions that, when executed by at least one processor, cause the at least one processor to perform at least one operation comprising:
determining a first set of input signals based on at least one of entity data, activity data, or links among the entity data and the activity data, wherein the first set of input signals is specific to a user of a user network;
inputting the first set of input signals to a first set of artificial intelligence (AI) models;
in response to the first set of input signals, outputting, by the first set of AI models, a first set of AI-derived signals relating to the first set of input signals;

modulating between the first set of input signals and the first set of AI-derived signals to produce selected signals comprising at least one input signal from the first set of input signals and at least one AI-derived signal from the first set of AI-derived signals;

applying at least one prompt template to the selected signals to create at least one prompt;

inputting the at least one prompt to at least one generative AI model; and in response to the at least one prompt, outputting, by the at least one generative AI model, at least one thought starter machine-generated by the at least one generative AI model, wherein the at least one thought starter comprises digital content configured to be distributed via the user network.

16. The at least one non-transitory machine-readable storage medium of claim 15, wherein the instructions, when executed by the at least one processor, cause the at least one processor to perform at least one operation further comprising:

including at least some of the first set of AI-derived signals in one or more of: an instruction contained in the at least one prompt, a question contained in the at least one prompt, or an example contained in the at least one prompt.

17. The at least one non-transitory machine-readable storage medium of claim 15, wherein the instructions, when executed by the at least one processor, cause the at least one processor to perform at least one operation further comprising:

using at least some of the first set of AI-derived signals to determine whether to include in the at least one prompt or exclude from the at least one prompt, at least one of a question, an instruction, or an example.

18. The at least one non-transitory machine-readable storage medium of claim 15, wherein the at least one thought starter comprises at least a portion of at least one of a post, a section of a post, an article, a share text, a comment, or a reaction to a content item on the user network, or the at least one thought starter comprises at least one of a poll, a hyperlink, an image, audio, or video.

19. The at least one non-transitory machine-readable storage medium of claim 15, wherein the first set of AI-derived signals comprise at least one of: a prediction, an embedding, a classification, or a score.

20. The at least one non-transitory machine-readable storage medium of claim 15, wherein the instructions, when executed by the at least one processor, cause the at least one processor to perform at least one operation further comprising:

in response to at least one second prompt, outputting, by the at least one generative AI model, at least one of: an expanded version of the at least one thought starter, a summarized version of the at least one thought starter, a re-formatted version of the at least one thought starter, or a subsequent version of the at least one thought starter re-written in a different tone or style.

* * * * *